(12) United States Patent
Borodow et al.

(10) Patent No.: US 10,181,106 B2
(45) Date of Patent: Jan. 15, 2019

(54) METHODS FOR PROCESSING INFORMATION ASSOCIATED WITH SALES FORCE MANAGEMENT, CUSTOMER RELATIONSHIP MANAGEMENT AND PROFESSIONAL SERVICES MANAGEMENT SYSTEMS

(71) Applicant: Ophio Software, Inc., Whistler (CA)

(72) Inventors: Eli Borodow, Whistler (CA); Imed Yahmadi, West Vancouver (CA); Ali Aljane, Whistler (CA); Eric Baranes, Whistler (CA); Andrew Borodow, Whistler (CA)

(*) Notice: Subject to any disclaimer, the term of this patent is extended or adjusted under 35 U.S.C. 154(b) by 755 days.

(21) Appl. No.: 14/559,887

(22) Filed: Dec. 3, 2014

(65) Prior Publication Data
US 2015/0154524 A1 Jun. 4, 2015

Related U.S. Application Data

(60) Provisional application No. 61/911,431, filed on Dec. 3, 2013.

(51) Int. Cl.
*G06Q 10/00* (2012.01)
*G06Q 10/06* (2012.01)
*H04W 4/029* (2018.01)

(52) U.S. Cl.
CPC ...... *G06Q 10/06313* (2013.01); *H04W 4/029* (2018.02)

(58) Field of Classification Search
CPC .. G06Q 10/06313; G06F 17/30; H04W 4/029
See application file for complete search history.

(56) References Cited

U.S. PATENT DOCUMENTS

| | | | | |
|---|---|---|---|---|
| 6,484,035 B2* | 11/2002 | Allen, Jr. | ............. | B60R 25/102 340/426.19 |
| 8,311,960 B1* | 11/2012 | Ginzburg | ............. | G06N 99/005 706/13 |
| 8,558,694 B2* | 10/2013 | Brandt | ................. | H04W 4/043 340/539.13 |

(Continued)

OTHER PUBLICATIONS

Integration of location based services for field support in CRM systemsP Álvarez, JA Banares, PR Muro-Medrano...—GeoInformatics, 2002—iaaa.es (Year: 2002).*

(Continued)

*Primary Examiner* — Jonathan G Sterrett
(74) *Attorney, Agent, or Firm* — Greenberg Traurig, LLP

(57) ABSTRACT

System and methods are disclosed associated with processing information and/or initiating workflow in a CRM, Sales Force Automation, time and expense reporting system or professional services provider management system, including aggregating, analyzing and/or otherwise processing data related to real world events. According to some embodiments, event data is classified and event data requiring user input is determined, notifications to provide user input for the event data may be transmitted, and/or various features of follow-on workflow or launching follow-on workflow may be initiated, facilitated or provided. Various implementations also relate to classification, splitting events, merging events, time extensions/exceptions for processing events, processing of corollary events and the provision of chronologically organized historical records of interactions between groups of users and individuals or companies.

19 Claims, 73 Drawing Sheets

(56) References Cited

U.S. PATENT DOCUMENTS

| | | | |
|---|---|---|---|
| 8,941,677 B1* | 1/2015 | Hallenbeck | G06T 11/00 345/502 |
| 2003/0125996 A1* | 7/2003 | Bush | G06Q 10/06 705/7.25 |
| 2004/0024629 A1* | 2/2004 | Kirby, Jr. | G06Q 10/06 705/7.17 |
| 2004/0077347 A1* | 4/2004 | Lauber | G08G 1/0962 455/428 |
| 2006/0123010 A1* | 6/2006 | Landry | G06F 17/30575 |
| 2006/0234641 A1* | 10/2006 | LaGrotta | G01S 19/02 455/67.13 |
| 2008/0121690 A1* | 5/2008 | Carani | G01S 5/0027 235/376 |
| 2008/0125964 A1* | 5/2008 | Carani | G06Q 10/08 701/408 |
| 2008/0174485 A1* | 7/2008 | Carani | G06Q 10/08 342/357.46 |
| 2009/0002188 A1* | 1/2009 | Greenberg | A01K 15/023 340/686.1 |
| 2011/0282622 A1* | 11/2011 | Canter | G06K 9/00691 702/150 |
| 2013/0036117 A1* | 2/2013 | Fisher | G06F 17/30029 707/736 |
| 2015/0365796 A1* | 12/2015 | Toni | H04W 4/022 701/522 |

OTHER PUBLICATIONS

Location based services using android mobile operating system a Kushwaha, V Kushwaha—... Journal of Advances in Engineering & ..., 2011—ijaet.org (Year: 2011).*

* cited by examiner

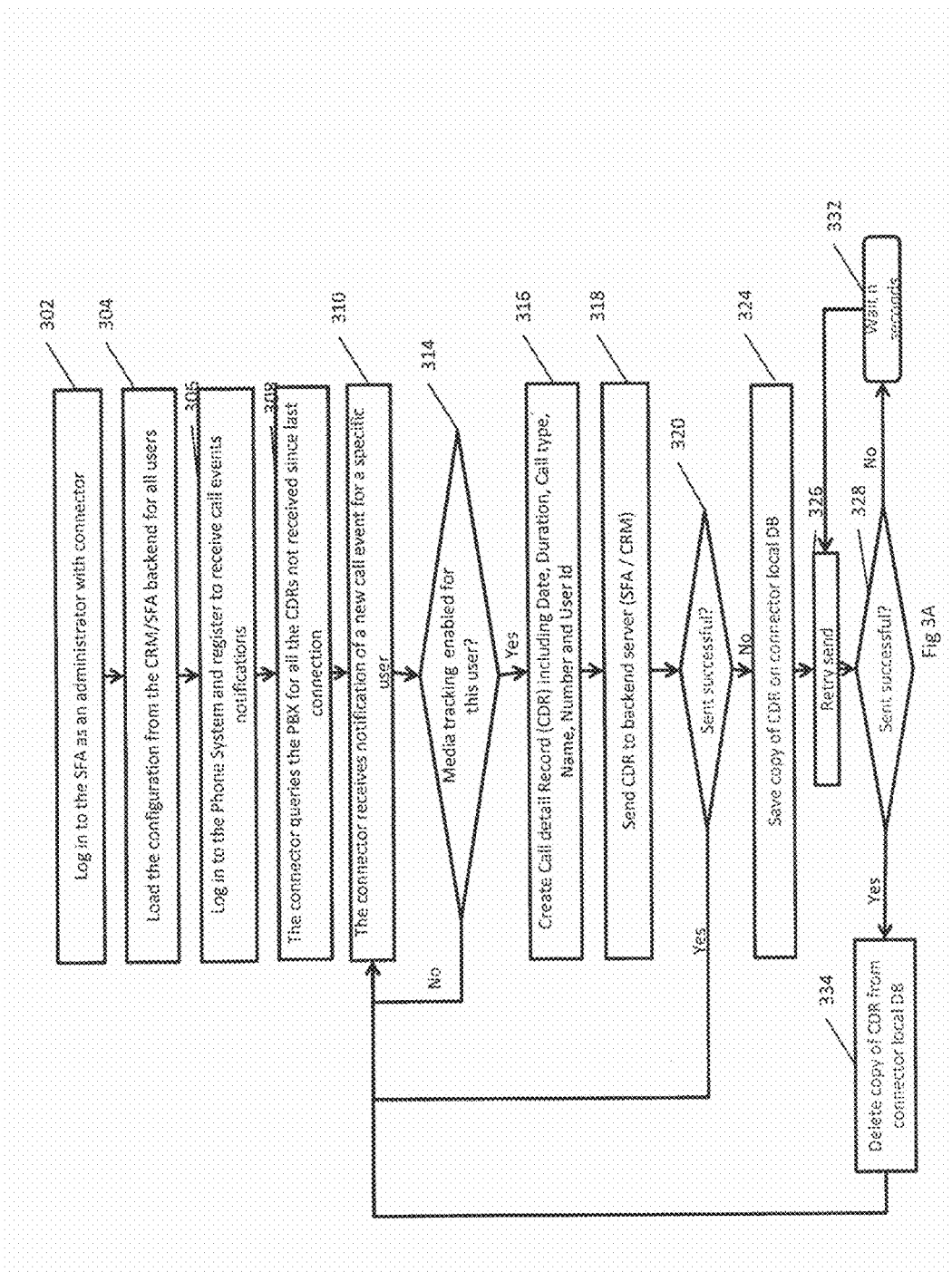

1002:
- Type: Incoming Call
- Time: 2013-05-27 14:48
- Phone: +3395408103
- Notes: spoke with Jean about next quarter purchase estimate

1004:
- ◉ Work Related | ○ Not Work Related
- ◉ Sales
- ○ Social
- ○ Internal Sales
- ○ Management
- ○ IT and Logistics
- ○ General Save

FIG. 10B

1006:
- Type: Offsite Geolocation
- Time: 2013-05-28 14:11
- Address: 565 17 St West Vancouver, BC V7V 3S8 Canada
- Notes: Enter your notes

1008:
- ○ Work Related | ◉ Not Work Related
- ○ Personal
- ○ Internal Social
- ○ Benefits and HR Save

- No Data Stream Record
  2013-05-21 11:53
- Data Stream Discrepancy
  2013-05-13 08:07
- No Data Stream Record
  2013-05-07 08:05
- No Data Stream Record
  2013-05-02 08:37
- No Data Stream Record
  2013-05-02 08:12
- No Data Stream Record
  2013-05-01 08:54
- Data Stream Discrepancy
  2013-04-30 09:25
- Data Stream Discrepancy
  2013-04-30 09:15

FIG. 13F

Type: No Data Stream Record
Time: 2013-05-07 08:05
Destination: No Matching Fact: Cannot find a recorded event that matches the reported activity
Notes: Enter your notes ○ Explain | ○ Delete Save

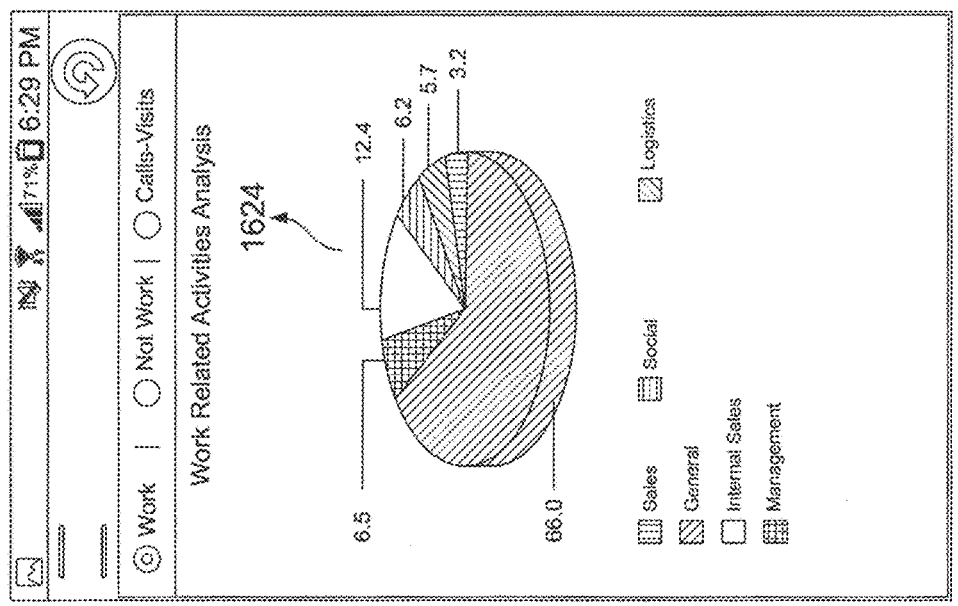
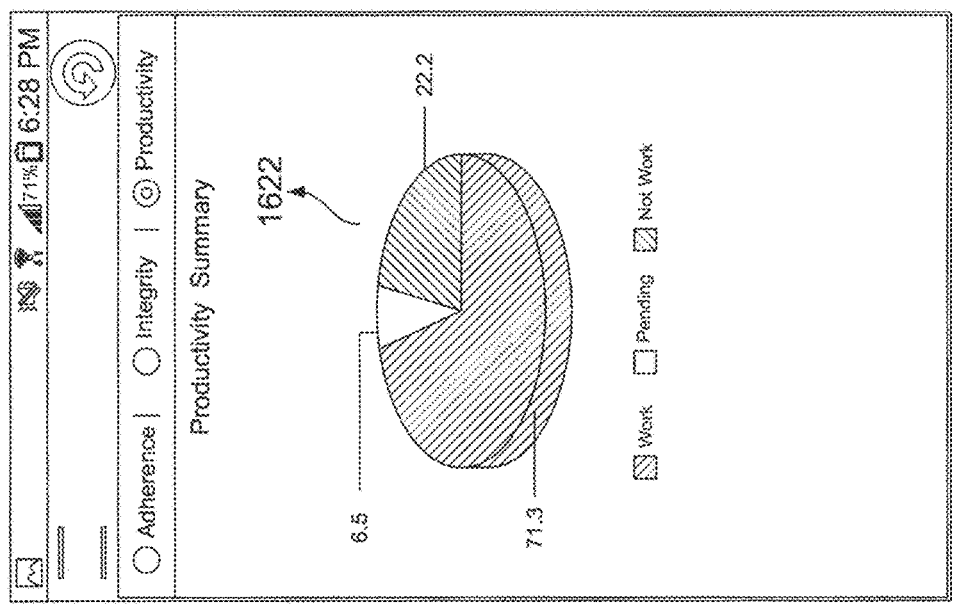
FIG. 16C

| Home | Accounts | Contacts | Opportunities | Leads | Configurations | Profiles | Auto Classifications + |
|---|---|---|---|---|---|---|---|

Create New... ▽

App. Go

My Work

Dashboard
My Activities

Data Entry Assistant

Settings

🗑 Recycle Bin

📦 Event Adherence Classes ← 1827
Default Class Library

Event Adherence Class Library: Default Class Library

Printable View|Help for this Page ⓘ

A|B|C|D|E|F|G|H|I|J|K|L|M|N|O|P|Q|R|S|T|U|V|W|X|Y|Z|Other|All

| Action | Class Name ↑ | Valve | Link to Activity | Order | Create An Activity [Not Used] | Allow Auto Classification |
|---|---|---|---|---|---|---|
| Edit\|Del | Sales Activity | Work Related | Always link to activity | 1 | ☐ | ☐ |
| Edit\|Del | Business Social | Work Related | Default link to activity | 1 | ☐ | ☐ |
| Edit\|Del | Internal Sales | Work Related | Default link to activity | 1 | ☐ | ☐ |
| Edit\|Del | Internal Management | Work Related | Default no link to activity | 2 | ☐ | ☐ |
| Edit\|Del | IT and Logistics | Work Related | Default no link to activity | 2 | ☐ | ☐ |
| Edit\|Del | General | Work Related | Default no link to activity | 3 | ☐ | ☐ |
| Edit\|Del | Personal | Not Work Related | Do not Link to activity | 3 | ☐ | ☒ ← 1831 |
| Edit\|Del | Internal Social | Not Work Related | Default no link to activity | 3 | ☐ | ☐ |
| Edit\|Del | Benefits and HR | Not Work Related | Default no link to activity | 4 | ☐ | ☐ |
| Edit\|Del | Do Not Remember | Other | Do not Link to activity | 4 | ☐ | ☐ |
| Edit\|Del | Not Me | Other | Do not Link to activity | 4 | ☐ | ☐ |
| Edit\|Del | Wrong Number | Other | Do not Link to activity | 4 | ☐ | ☐ |

Show me fewer △ records per list page

A|B|C|D|E|F|G|H|I|J|K|L|M|N|O|P|Q|R|S|T|U|V|W|X|Y|Z|Other|All

| Auto Classification | ⚙▽ |
|---|---|
| Account | Lookup(Account) |
| Class | Lookup(Event Adherence Class) |
| Contact | Lookup(Contact) |
| Created By | Lookup(User) |
| Event Type (Internal Use) | Text (20) |
| Last Modified By | Lookup(User) |
| Latitude | Number(5,7) |
| Lead | Lookup(lead) |
| Longitude | Number(5,7) |
| My Key | Formula (Text) |
| Name | Text (80) |
| Owner | Lookup(User+1) |
| Phone/Address | Text (225) |
| Value | Formula (Text) |

FIG. 18F

Data Entry Assistant
Offsite Geolocation
« Back to List: Data Entry Assistants Customize page | Printable View | Help for this Page ⑦

Data Entry Assistant Detail  [Work Related] [Not Work Related] [Other] [Split Event] [Show Activity]

▽ Facilitation

| | |
|---|---|
| value | Pending |
| time | 18/11/2013 10:35 PM |
| Auto Classified | ☐ |
| Type | Offsite Geolocation |
| Phone/Address | 1391 Richards Street, Vancouver, BC V6B 3G7, Canada |
| Contact Name | |
| subject | |
| duration | 135 |

| | |
|---|---|
| Class | 1903 |
| reported | Not Reported |
| Classified on | |
| Notes | |
| Owner | 👤 Chris Thompson [Change] |
| Contact | |
| Account | |
| Lead | |
| User | Chris Thompson |

▽ More Details

| A... | Type | time ↓ | User | value | duration | Phone/Address | Contact Name | Contact | Lead | Account |
|---|---|---|---|---|---|---|---|---|---|---|
| ☐ Edit | Incoming Call | 20/11/2013 11:09 AM | Chris Thompson | Pending | 1 | +15553068456 | John Doe | | | |
| ☐ Edit | SMS Conversation | 20/11/2013 10:30 AM | Chris Thompson | Pending | 1 | +15559772581 | Mary Rosen | | | |
| ☐ Edit | SMS Conversation | 20/11/2013 10:25 AM | Chris Thompson | Pending | 1 | +15553068456 | John Doe | | | |
| ☐ Edit | SMS Conversation | 20/11/2013 10:24 AM | Chris Thompson | Pending | 1 | 5553068456 | John Doe | | | |
| ☐ Edit | Outgoing Call | 20/11/2013 10:17 AM | Chris Thompson | Pending | 2 | 5553068456 | John Doe | | | |
| ☐ Edit | Outgoing Call | 20/11/2013 10:14 AM | Chris Thompson | Pending | 1 | +15559772581 | Mary Rosen | | | |
| ☐ Edit | SMS Conversation | 20/11/2013 9:25 AM | Chris Thompson | Pending | 4 | +15553068456 | John Doe | | | |
| ☐ Edit | Incoming Call | 20/11/2013 8:57 AM | Chris Thompson | Pending | 2 | +15553722972 | Susan Smith | | | |
| ☐ Edit | Outgoing Call | 20/11/2013 8:39 AM | Chris Thompson | Pending | 1 | +15556817296 | Alan Jones | | | |
| ☐ Edit | SMS Conversation | 19/11/2013 7:01 PM | Chris Thompson | Pending | 6 | +15556817296 | Alan Jones | | | |
| ☐ Edit | SMS Conversation | 19/11/2013 5:45 PM | Chris Thompson | Pending | 6 | +15553722972 | Susan Smith | | | |
| ☐ Edit | Outgoing Call | 19/11/2013 2:32 PM | Chris Thompson | Pending | 3 | +15553722972 | Susan Smith | | | |
| ☐ Edit | Incoming Call | 19/11/2013 12:42 PM | Chris Thompson | Pending | 12 | +16043967446 | John Doe | | | |
| ☐ Edit | Outgoing Call | 19/11/2013 12:37 PM | Chris Thompson | Pending | 11 | 5556938161 | | | | |
| ☐ Edit | Outgoing Call | 19/11/2013 10:58 AM | Chris Thompson | Pending | 1 | 15559342359 | Andrew Johnson | | | |
| ☐ Edit | Outgoing Call | 19/11/2013 10:30 AM | Chris Thompson | Pending | 9 | 15559342359 | Andrew Johnson | | | |
| ☐ Edit | Incoming Call | 19/11/2013 10:29 AM | Chris Thompson | Pending | 72 | +15553220652 | ACME | Sean Forbes | | Edge Communicat |
| ☐ Edit | Offsite Geolocation | 19/11/2013 9:51 AM | Chris Thompson | Pending | 131 | 501 Pacific Street,... | | | | |
| ☐ Edit | Offsite Geolocation | 19/11/2013 3:34 AM | Chris Thompson | Pending | | 501 Pacific Street,... | | | | |
| ☐ Edit | Offsite Geolocation | 19/11/2013 1:01... | Chris Thompson | Pending | | | | | | |

| Adherence ⚙ ▽ | |
|---|---|
| Account | Lookup(Account) |
| Activity Id | Text(80) |
| Activity Time | Date/Time |
| Address | Text(255) |
| ala | Picklist |
| alaabsolute | Picklist |
| ALA Change Time | Date/Time |
| Alarm | Picklist |
| Class | Lookup(Event Adherence Class) |
| Compliance | Formula (Text) |
| Contact | Lookup(Contact) |
| Created By | Lookup(User) |
| duration | Number(8,0) |
| filter | Picklist |
| geosite | Lookup(geosite) |
| Last Event Time | Date/Time |
| Last Modified By | Lookup(user) |
| Lead | Lookup(Lead) |
| Notes | Text(255) |
| Owner | Lookup(User+1) |
| Postid | Text(80) |
| reported | Picklist |
| Show More Fields | |

2100

| ⚙ ▽ | |
|---|---|
| Call Duration | Number(8,0) |
| Call Object Identifier | Text(255) |
| Call Result | Text(255) |
| Call Type | Picklist |
| Comments | Long Text Area(32000) |
| Created By | Lookup(User) |
| Due Date | Date/Time |
| Email | Email |
| Last Modified By | Lookup(User) |
| Name | Lookup(Contact+1) |
| Phone | Phone |
| Priority | Picklist |
| Public | Checkbox |
| Related To | Lookup(Contact+7) |
| Status | Picklist |
| Subject | Picklist |
| Type | Picklist |

| | |
|---|---|
| All Day Event | Checkbox |
| Assigned To | Lookup(User+1) |
| Created By | Lookup(User) |
| Date | Date/Time |
| Description | Long Text Area(32000) |
| Duration | Number(8,0) |
| Email | Email |
| End | Date/Time |
| Last Modified By | Lookup(User) |
| Location | Text(255) |
| Name | Lookup(Contact+1) |
| Phone | Phone |
| Private | Checkbox |
| Public | Checkbox |
| Related To | Lookup(Contact+7) |
| Show Time as | Picklist |
| Start | Date/Time |
| Subject | Picklist |
| Time | Date/Time |
| Type | Picklist |

FIG. 21A (Continued)

| | | |
|---|---|---|
| 10-28 | 📱 | Andrew Johnson |
| 10-29 | 📱 | Andrew Johnson |
| 10-30 | 📞 | Andrew Johnson |
| | 📞 | Andrew Johnson |
| | 📞 | Andrew Johnson |
| 11-03 | 📞 | Chris Thompson |
| 11-14 | (📞) | |
| | 📞 | Chris Thompson |
| | 📞 | Chris Thompson |
| 11-21 | 📞 | David Peterson |
| Friday | (📞) | Chris Thompson - 1min |
| | (📞) | |
| | (📞) | David Peterson - 1min |
| | (📞) | David Peterson - 1min |
| Tuesday | (📞) | |
| | (📞) | |
| | (📞) | Chris Thompson - 2min |
| | (📞) | |
| 14:32 | (📞) | |
| 15:29 | (📞) | |
| 15:30 | (📞) | |
| | (📞) | |
| | (📞) | |

| Home | Accounts | Contacts | Opportunities | Leads | Configurations | Profiles | Auto Classifications + |
|---|---|---|---|---|---|---|---|

| Create New... ▽ |
|---|

App. Go

Data Entry Assistant
Incoming Calls (Merged) ← 2211

Customize Page|Edit Layout|Printable View|Help for this Page ②

«Back to List: Custom Object Definitions

SMS Conversations [0] | Integreties [0] | Data Entry Assistants [3]

| My Work |
|---|
| Data Entry Assistant |
| All Pending |
| Pending Identified |
| Pending Unidentified |
| All Events |

Data Entry Assistant Detail   [Work Related] [Not Work Related] [Other] [Split Event] [Show Activity]

▽ Facilitation
value  Pending                                   Class
time   05/11/2013 4:09 PM                 reported  Not Reported
Auto Classified  □                             Classified on
Parent                                              Notes
▽ Information
Type    Incoming Calls (Merged)              Owner  🔲 Andrew Johnson [Change]
Phone/Address  5554530642                   Contact
Contact Name                                    Account

| Settings |
|---| subject                                              Lead
duration  50                                       User   Andrew Johnson ▽ More Details         [Work Related] [Not Work Related] [Other] [Split Event] [Show Activity]

| 🗑 Recycle Bin |
|---|

◎ SMS Conversations                                                SMS Conversations Help ②
No records to display

Integrities   [New Integrity]                                          Integrities Help ②
No records to display 🗐 Data Entry Assistants   [New Data Entry Assistant]              Data Entry Assistants Help ②

| Action | Type | type | time | duration | Phone/Address |
|---|---|---|---|---|---|
| Edit Del | Incoming Call | Incoming Call | 05/11/2013 4:09 PM | 25 | 5554530642 |
| Edit Del | Incoming Call | Incoming Call | 05/11/2013 4:34 PM | 5 | 5554530642 ← 2213 |
| Edit Del | Incoming Call | Incoming Call | 05/11/2013 4:39 PM | 20 | 5554530642 |

∧ Back To Top            Always show me ▽ more records per related list

[Chat ↗]

FIG. 22C

| Home | Accounts | Contacts | Opportunities | Leads | Configurations | Profiles | Auto Classifications + | | |
|---|---|---|---|---|---|---|---|---|---|

Create New... ▽

App. Go

My Work
Data Entry Assistant
 All Pending
 Pending Identified
 Pending Unidentified
 All Events
Settings 🗑 Recycle Bin 📦 Task
Product demo
👤 📇 🗓 ③①
« Back to List: Data Entry Assistants

[ Save ]—2305  [ Cancel ]

Edit Layout | Help for this Page ②

Attachments [0]

Task Detail

| Assigned To | 👤 Andrew Johnson | Status | Completed —2307 |
| Subject | Product demo ← | Name | Tim Barr ← |
| Due Data | 23/10/2013 | Related To | United Oil SLA |
| Priority | Normal | | |

Comments

Created By   Andrew Johnson, 23/11/2013 12:36 AM   Last Modified By   Andrew Johnson, 02/12/2013 10:13 PM ▽ Ophio Specific Information

| Activity Type | Outgoing Call | Start Time | 23/10/2013 6:23 PM |
| Email | | End Time | 24/10/2013 6:24 PM |
| Phone | 5559376571 | Duration | 3 |
| Location | | | |

Corollary Events

| Type | Type | Start Time | End Time | Duration | Address/Phone Number |
|---|---|---|---|---|---|
| Remove | Offsite Geolocation | 23/10/2013 5:57 PM | 23/10/2013 6:06 PM | 9 | 1739 Marine Drive, West Vancouver, BC V7V 1J3, Canada |
| Remove | Outgoing Call | 23/10/2013 6:23 PM | 23/10/2013 6:23 PM | 1 | 5559376571 |
| Remove | Outgoing Call | 23/10/2013 6:24 PM | 23/10/2013 6:24 PM | 1 | 5559376571 |
| Remove | Outgoing Call | 23/10/2013 6:24 PM | 23/10/2013 6:24 PM | 1 | 5559376571 |
| Remove | Outgoing Call | 23/10/2013 6:24 PM | 23/10/2013 6:24 PM | 1 | 5559376571 |

2313

Chat ↗

METHODS FOR PROCESSING INFORMATION ASSOCIATED WITH SALES FORCE MANAGEMENT, CUSTOMER RELATIONSHIP MANAGEMENT AND PROFESSIONAL SERVICES MANAGEMENT SYSTEMS

CROSS REFERENCE TO RELATED APPLICATION DATA

This application claims benefit/priority of U.S. provisional patent application No. 61/911,431, filed Dec. 3, 2013, and is a continuation-in-part of U.S. application Ser. No. 13/905,115, filed May 29, 2013, published as US 2014/0046711A1, which are incorporated herein by reference in entirety. This application also bears relation to U.S. provisional patent application 61/652,830 filed 29 May 2012, and PCT application No. PCT/CA2013/050415, published as WO2013/177710A1, which are incorporated herein by reference in entirety.

APPENDIX MATERIALS

Appendices, labeled "Appendix A" through "Appendix F", are attached hereto and incorporated by reference herein in their entirety.

BACKGROUND

Field

Aspects of the present inventions relate to sales force automation or sales force management systems (hereinafter collectively referred to as "SFA"), Customer Relationship Management (hereinafter referred to as "CRM"), other systems that rely on data entry by users, data quality enforcement and facilitation for those systems, such as those associated with professional services organizations to manage productivity and ensure that billable activities are documented, as well as both big data analytics and business analytics systems. Among other things, innovations herein relate to systems and methods for providing user-centric tools that help companies to facilitate and enforce both user software adoption and data quality in user data entries; automate data collection tasks and distill large volumes of relevant data from telecom networks and devices, data networks and devices, billing systems, mobile and other computing and communications devices; shorten the time needed to make that data useful and available; provide real-time access to data while making that data more user-centric and consumable by business stakeholders; and translate large volumes of transactional data into business insight to drive business decision-making.

Aspects of the present inventions utilize a data-driven approach to solving the core data quality issues for systems that collect information from users via data entry, such as customer relationship management, sales force automation and professional services systems, and enhances those systems with actionable insight derived from objective data sources and the data quality facilitation and enforcement mechanisms described herein together with mechanisms for reducing the need for manual data entry by users of those systems and accelerating how users interact with those systems.

Description of Related Information

The burden of manual data entry for Customer Relationship Management, Sales Force Automation and professional services systems taxes both productivity and relationships between managers and front-line users, as users are continually asked to provide manually-entered situational updates into such systems in response to real-world events. The veracity of user data entries often complicates the challenges associated with accurate data collection and analysis of the data in the context of customer relationship management, sales force automation and professional services systems.

The volume, variety and velocity of newly available data sources in conjunction with the processes detailed herein provide an opportunity to alleviate the above-noted challenges and extract actionable insight from those data sources.

As such, some of the solutions/innovations herein are designed to make alleviate the burden of manual data entry, increase productivity, provide visibility and insight to both front-line users and managers and make sense of big data and other data sources in order to find patterns that help organizations better manage their data quality and employees, and gain new insights that enable them to make better financial projections and better manage processes related to sales and services.

Further, drawbacks of current sales force, customer relationship management and/or professional services systems often include or involve aspects of failing to effectively address one or more of 3 core issues, adoption, data integrity and/or productivity. For example, many such systems suffer with respect to adoption in being unable to address issues of people failing to enter relevant data into the system on a timely basis or at all.

Further, many suffer drawbacks with respect to data integrity, such as issues relating to sales pipeline projections that are often overly optimistic or recordation of time or other information related to services provided. Finally, such systems have drawbacks with respect to accurate productivity measures, such as when level(s) of productive activity may not bode well for future results in future quarters, but management may not have a reliability check on levels of sales or services productivity/processes that may be lacking.

In sum, there is a need for systems and methods that may adequately address these and other drawbacks.

OVERVIEW OF SOME ASPECTS

Aspects of the systems and methods herein may involve innovations in the areas of sales force management, sales forecast analyses, professional services productivity and billing management, workforce policy adherence and technology adoption facilitation and enforcement. Further, sales and services productivity solutions and implementations herein may leverage both new and existing data streams to look for patterns within the business that correlate to success or failure in the context of a sales or services organization's forecasts and objectives. Implementations herein may also dynamically process and/or model information to address correlations to failure—in order to suggest changes to process and individual activities and thereby meaningfully and positively affect outcomes. Such 'seek, model and adapt' innovations are designed to empower companies to leverage system-based pattern-detection in both their strategic and tactical decision-making, in all phases of sales process and professional services provision as well as in sales-forecasting processes.

It is to be understood that both the foregoing general description and the following detailed description are exemplary and explanatory only and are not restrictive of the inventions, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various implementations and aspects of the innovations herein and, together with the description, help illustrate the principles of the present inventions. In the drawings:

FIGS. 3A-3B are flowcharts of illustrative PBX phone call capture processing consistent with certain aspects related to the innovations herein.

FIGS. 9A-9C are illustrative user interfaces showing exemplary classification processing features consistent with certain aspects related to the innovations herein.

FIGS. 10A-10B are illustrative user interfaces showing exemplary classification processing features consistent with certain aspects related to the innovations herein.

FIGS. 11A-11D are flowcharts and illustrative user interface implementations showing facilitation processing consistent with certain aspects related to the innovations herein.

FIGS. 12A-12E are flowcharts and illustrative user interface implementations showing enforcement processing consistent with certain aspects related to the innovations herein.

FIGS. 13A-13H are flowcharts and illustrative user interface implementations showing integrity resolution processing consistent with certain aspects related to the innovations herein.

FIGS. 14A-14C are flowcharts and illustrative user interfaces of illustrative dispute resolution processing and notification management processing consistent with certain aspects related to the innovations herein.

FIGS. 16A-16F are flowcharts and illustrative user interface implementations showing time allocation and productivity analysis processing consistent with certain aspects related to the innovations herein.

FIGS. 18A-18F are illustrative user interfaces showing exemplary event classification processing features implemented on an automated basis consistent with certain aspects related to the innovations herein.

FIGS. 19A-19C are illustrative user interfaces showing exemplary event classification processing features for the division of events into separate data events for processing purposes consistent with certain aspects related to the innovations herein.

FIGS. 20A-20F are illustrative user interfaces showing exemplary exception event processing features for requesting, granting and managing exceptions to performance threshold time limits consistent with certain aspects related to the innovations herein.

FIGS. 21A-21C are illustrative databases and user interfaces showing illustrations of an implementation of team event timelines for user and team coordination.

FIGS. 22A-22C are illustrative user interfaces showing exemplary event classification processing features for the merging of separate events into a combined data event for processing purposes consistent with certain aspects related to the innovations herein.

FIGS. 23A-23B are illustrative user interfaces showing exemplary event classification processing features for processing corollary events and appending corollary events to an activity for data analysis consistent with certain aspects related to the innovations herein.

DETAILED DESCRIPTION OF ILLUSTRATIVE IMPLEMENTATIONS

Figure 1A:
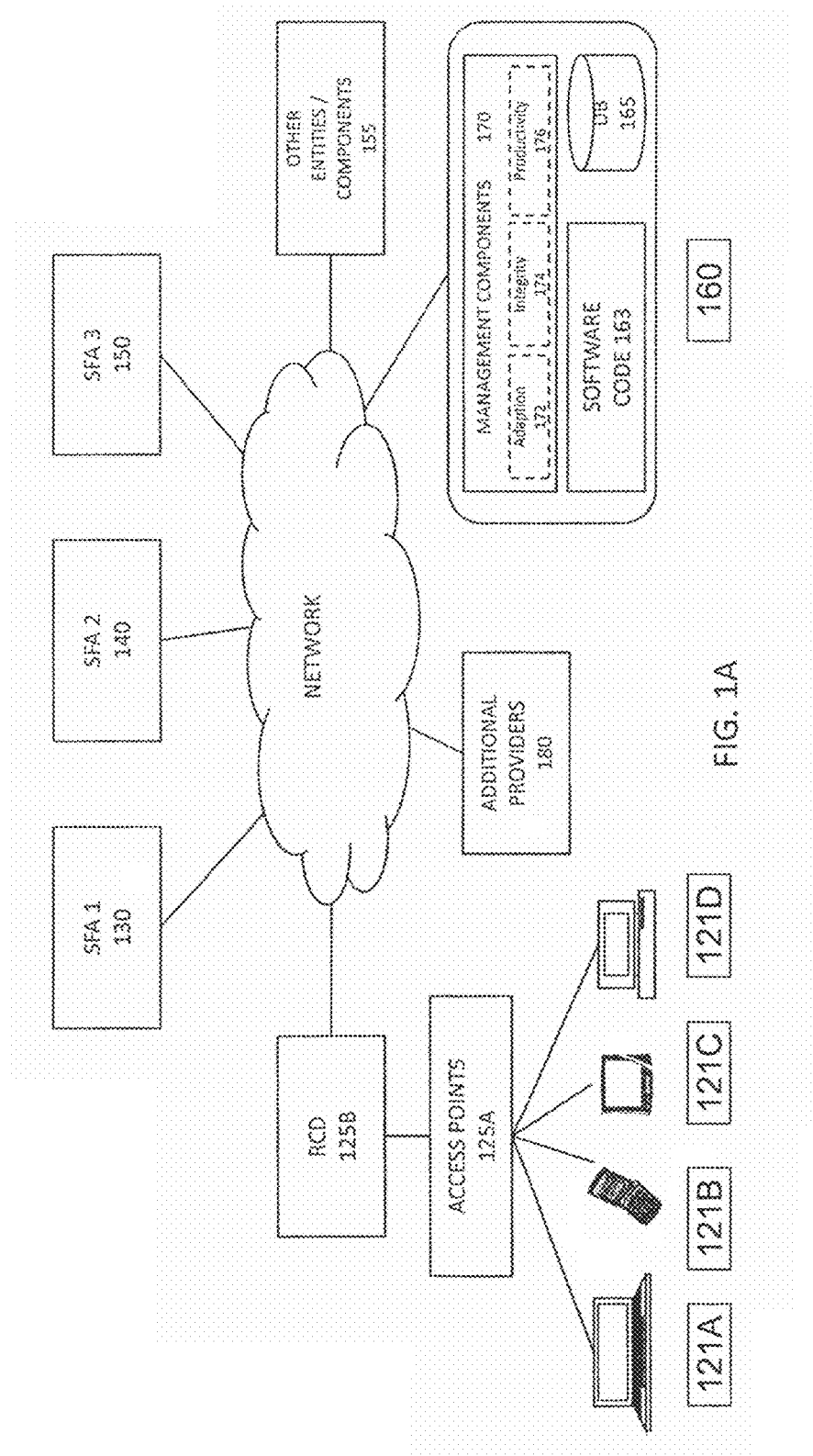
FIG. 1A is a diagram of an illustrative web or network-based implementations consistent with certain aspects related to the innovations herein.

Reference will now be made in detail to the inventions herein, examples of which are illustrated in the accompanying drawings. The implementations set forth in the following description do not represent all implementations consistent with the present inventions.

Instead, they are merely some examples consistent with certain aspects related to the present innovations. Wherever possible, the same reference numbers will be used throughout the drawings to refer to the same or like parts.

Certain systems and methods herein relate to innovations characterized herein as involving aspects as described below. Various present innovations relate to the enforcement and facilitation of data entries in software systems that require systemic and methodical data entry by software users in order for such software systems to be effective. Such software systems include but are not limited to sales force automation, sales force management and professional services systems and encompass any system wherein user adoption and the honesty and integrity of user-entered data meaningfully impacts on system effectiveness (such as business intelligence, analytics, and financial services software that requires compliance).

Most software systems for managing employee efforts, activities and policy/process compliance, such as Customer Relationship Management, Sales Force Automation ("SFA") systems (also known as "Sales Force Management") and professional services systems, fundamentally rely on inputs being methodically entered into the system by members of the organization as well as on the integrity of those members. As such, the data generated by such systems has generally been incomplete (user adoption issue) and plagued by inaccurate information (user integrity issue).

The innovations contained herein include the ability to aggregate, measure, track and cross reference each person's "event data stream"—including electronic calendar entries, previous entries such as CRM, sales force automation and professional services systems data entries, Call Detail Records ("CDR") of PBX (circuit-switched and packet-switched, directly or indirectly via Presence Manager or other systems that can provide such records) and mobile phone call Call Detail Records, emails, SMS messages, chat messages, fax information obtained from fax server, desktop fax software program or from the Call Detail Records of fax lines, credit card transaction data, Wifi positioning and geolocation data (related to site visits and off-site meetings and other location-relevant reporting)—and to identify the points at which follow-on data entries are ordinarily required.

As such, the innovations contained herein include new approaches to the determination that an event has occurred that requires follow-on human data-entry, new classification approaches for processing raw data to improve the quality of that data and prepare it for analysis, and new approaches for launching follow-on workflow that depending on context can include pre-populated data fields and predefined context around the work being documented that previously required manual data entry. Systems and methods herein may also include processes for enforcing user adoption compliance. Here, for example, implementations may recognize external events that require human data entry, provide one or more mechanisms for displaying and classifying "unprocessed" events (e.g., raw data without context, etc.), and provide escalation thresholds based on elapsed time for processing events. Further, such escalation thresholds may vary as a function of various factors such as event type, opportunity type/size, customer value, etc and/or may include the context of the relevant person's schedule and ability to respond.

As described in more detail below, various implementations herein may include or involve providing to the user a list of visual data objects representing events of various types (e.g., PBX calls, mobile phone calls, SMS's, emails, geolocation information representing the location of live meetings, etc.) cross-referenced with one or more other data sources integrated or associated with at least one SFA, CRM, time and expense reporting system, or professional services provider management system (collectively referred to herein as the "management system") in order to enrich the visual data object with added context (which, e.g., may identify the person, company, status of lead, opportunity or account, etc.) in order to facilitate user recognition of the actual event represented by the visual data object and, in some use cases, accelerate the workflow process originating therefrom. In some implementations, the added context may identify whether the visual data object represents an event associated with a pre-defined classification, such as whether the event should be treated as personal or work related for subsequent event processing by the user. According to another example, the added context may identify whether the visual data object corresponds to one or more of a person, a company, lead status, opportunity status, and/or account status, etc.

Innovations contained herein also include processes for managing user integrity in data entry; by cross-referencing machine data and other data external to the software system with user-entered data in order to identify factual discrepancies that can be classified as "Integrity events;" to provide managers with insight about events about which the salespeople or service providers may be unintentionally misleading themselves or intentionally misleading the manager or company.

Innovations herein also include processes for providing automated warnings (such as those customizable by managers) to system users and an escalation process to a manager (via email, SMS or rolling data feed) based on customizable thresholds—as well as a resolution process for dealing with missing data (e.g. adoption issues) and data discrepancies (e.g. integrity issues). Present innovations may also include historical reports and/or the ability to define policy profiles and apply different policy profiles to different employees and different classes of sales opportunities or services types, and/or be configured for exception handling, such as handling discrepancies between objective data and user-reported data are disregarded if they fail to meet a customizable discrepancy threshold. Here, for example, a discrepancy of less than X minutes on the reported duration of a meeting or a call may be disregarded.

The innovations contained herein also include methods for the facilitation of user adoption of software systems—including (i) recognizing the occurrence of relevant events and providing employees with automated reminders to manually enter the appropriate data into the software system; and/or (ii) by reducing time commitment ordinarily associated with sales or services related data entries by auto-populating fields in the user interface with data obtained from alternate sources.

The innovations contained herein also include productivity and time-allocation tracking and analysis by through the use of machine data and other data sources that can disclose the existence of real-world events and the duration of certain event types. Managers as well as the sales or services people, themselves, can view their own productivity reports to gain insight on their time allocation via a variety of factors, as set forth in more detail below.

The innovations contained herein also include a new and differentiated approach to sales forecasting that applies "data pattern matching and modeling" analysis to sales opportunities in a sales pipeline: to identify those opportunities who's external data attributes seem to correlate to failure rather than success. For example, pipeline items will be flagged for managers if the opportunity has had fewer external data 'events' (phone calls, email exchanges, site visits, etc.) of sufficient duration than the data model suggests is correlative with a successful sales outcome, taking variables such as seasonality into account. This data model is dynamically updated as new sales take place. As a result, the analysis becomes more accurate the longer the solution is in place. This analysis is run using objective data sources (the aggregated personal data streams described above) filtered to provide data about specific sales opportunities—without the context of employee opinions (as reflected in their data entries) and without reference to their self-report characterizations of the relevant events. This modeling component provide for correlation analysis of employee projections with dynamically updated, data-driven success models—in order to assist managers to more accurately assess pipeline quality, better forecast sales revenue and offer direction for employee training and mentoring.

The innovations contained herein and their pattern-based methodologies go beyond simple business intelligence derived from user inputs; to analyze a diverse range of technologies across a diverse set of disciplines and join together a variety of complex new and existing data streams into a single framework for technology adoption analytics, factual integrity analytics and data quality enforcement, process and productivity management analytics for services and sales (which includes sales territory management analytics), as well as sales forecast opportunity analysis.

Today, many "data processing events" are either undetected or remain unused and therefore unavailable to the legacy systems that could benefit from the data and insight they can bring. These events can be detected, captured, represented electronically and housed in a database—but many challenges and drawbacks in the area of event processing relate to making (any) use of this data. Such issues tie into the innovations contained herein, where both new and existing "event data streams" may be aggregated, cross-referenced, correlated and synthesized within to provide meaningful business insight that can empower better business decision-making, improve the performance of existing software investments (such as Customer Relationship Management, Sales Force Automation and professional services systems) and positively impact on business outcomes, revenue and the ability to process and understand the consequences of business activities as they happen.

FIG. 1A is a diagram of an illustrative web or network-based implementations consistent with certain salesforce-based aspects related to the innovations herein. While the description of FIG. 1A shows various elements, the components of the system can be implemented through any suitable unitary or distributed combination of hardware, software and/or firmware. Referring to FIG. 1A, the illustrated system may include at least one Sales Force Processing ("SFP") server and/or component 160, users at access devices 121 (e.g., one or more of access devices 121A-121D), one or more connectivity components 125A/125B, as well as possibly other unitary, connected, interconnected or distributed processing entities or components such as network management components, a first sales force automation ("SFA") server/component 130, a second SFA server/component 140, a third (or more) SFA server/component 150, other third party servers or components 155, and/or additional providers 180 such as information providers, all connected over a network 170 such as a Wide Area Network, a Local Area Network, or a combination including the Internet. The Sales Force Processing server/component 160 may, in some implementations, include one or more management components 170, such as optionally an adoption management component 172, an integrity management component 174 and/or a productivity management component 176. Further, the Sales Force Processing server/component 160 may, in some implementations, be the web-based platform for handling and/or performing processing regarding various sales force management features, functionality and/or innovations herein.

Implementations herein may include various management components 170 that perform methods for managing complete and accurate data for business analysis. Such implementations may accomplish this via adoption management, integrity management and productivity management. Further implementations may be aided by data quality mechanisms and process enforcement as well accelerating user interaction with systems by using machine data to initiate workflow and/or eliminate manual data entry related to workflow. User adoption systems may be configured with features that recognize the occurrence of relevant events and providing employees with automated reminders to manually enter the appropriate data into the software system; and by reducing time commitment ordinarily associated with Sales Force Automation "SFA" data entries by auto-populating fields in the user interface with data obtained from alternate sources.

Systems and methods herein may include or involve a variety of processing components and mechanisms for performing the innovations here, such as:

Data Stream Aggregation Mechanisms: Aggregation processes run continuously across diverse devices and networks and comprise applicable data regarding all forms of network, voice and electronic data communications together with geolocation data (which may be crossed referenced with WiFi Positioning Systems ("WPS" or "WiPS/WFPS") or Indoor Positioning Systems (such as iBeacon and systems based on Near-Field Communication ("NFC")) that locate people inside a building using radio waves, acoustic signals or other sensory information collected by mobile devices for greater precision or as a substitute for geolocation data when a geolocation signal is inadequate due to various causes—collectively referred to herein as "geolocation") and electronic records (such as electronic calendar data, etc.), and such records include but not limited to origination, destination/termination, user and duration attributes.

Classification Mechanisms: classification interface(s) and processes are provided that displays each user's relevant raw data as unclassified events and provides a means of classifying those events with a series of default or custom classifications based on the type of work performed if the event is work-related or, alternatively, with a series of default or custom classifications if the event is not work-related.

Facilitation Mechanisms: The innovations contained herein also include methods for the facilitation of user adoption of software systems—including (i) recognizing the occurrence of relevant events and providing employees with automated reminders to manually enter the appropriate follow-on data into the software system; and (ii) by reducing time commitment ordinarily associated with user interface data entries by auto-populating fields in the user interface with data obtained from alternate sources.

Enforcement Mechanisms: The manager sets duration interval thresholds that define how long a raw data event can remain unprocessed/pending ("pending classification") before automated, customizable reminders are sent out ("user adoption enforcement"); and configures the escalation process so that a notification is sent to or displayed for the manager when the reminders have not led the user to classify the data on time and also provides access to historical reports and the ability to define policy profiles and apply different policy profiles to different employees and different classes of sales opportunities and administrative tasks.

Integrity Incident Identification Mechanisms: The innovations contained herein also include processes for managing user integrity in data entry; by cross-referencing data obtained in the data aggregation process with user-entered data in order to identify factual discrepancies that can be classified as "Integrity incidents"—incidents which may be escalated or disregarded depending on whether they meet a customizable discrepancy threshold (for example, a manager may specify that a discrepancy of less than X % on the reported duration of an event such as a live meeting should be disregarded, whereas a discrepancy of greater than X % should be escalated).

Dispute Resolution Mechanisms: A dispute resolution and retroactive exception approval process begins when the time-limit threshold has been triggered and the manager has been alerted that a user has failed to classify an unprocessed/pending event within the specified time interval or when an integrity incident has been flagged by the system and reported to the manager; at which time the user is provided the opportunity to append an explanation to the notification in order to advise their manager(s) of extenuating circumstances so that the manager can opt to treat the event as 'compliant' for reporting purposes—or not (this 'adjusted data' can be used for reporting as a supplement/replacement for the purely factual data depending on the context in which the data is being used and whether that context needs to incorporate extenuating circumstances).

Notification Management Mechanisms—The innovations contained herein also include configuration mechanisms to limit volume of notifications to a manageable volume and to suite the particular management style of the individual manager; wherein a manager can limit user adoption enforcement and integrity incident notifications with configuration that alters what is escalated based on variables that include but are not limited to named employee, named prospect/customer, event type, size of current opportunity, dollar value of potential follow-on opportunities, size of prospect/repeat customer, dollar value of historical business customer has done with company to date, or by a variation threshold percentage (for example, do not report if discrepancy in data entry about an event's duration is less than X minutes)

Privacy Management Mechanisms: Various privacy management mechanisms may be provided. For example, users can turn off "location services" on their mobile devices to disable geolocation tracking, which will be characterized as an integrity incident if such disablement takes place during work hours that has not been designated as a personal day or approved block of personal time or time in an environment where signal access is unavailable; with the result that a notification in such circumstances will be sent to the manager after a pre-set time-interval threshold (which will specify how long an integrity incident must last before it is reported in order to avoid creating events for time spent in parking garages, elevators, tunnels and other environments without signal access).

Time Allocation and Productivity Analysis Mechanisms: The innovations contained herein also include productivity and time-allocation tracking, analysis and data modeling mechanisms for the purpose of self-assessment, comparative assessment, manager employee assessment, mentoring and territory analysis (by providing managers with data and analysis to distinguish between both 'order takers' who make little effort to obtain new business yet still make quota in territories that should be split and salespeople who intentionally slow down their sales activities to push out sales opportunities to stay below their sales quota in order to avoid a territory split—and salespeople who make heroic efforts to meet their sales quota in territories that should logically not be split); with such productivity and time allocation mechanisms leveraging and relying on the data stream aggregation mechanisms described in step 1 in order to (i) enable managers, teams and individual users to view their own productivity reports and analyze their time allocation by activity type, account value, qualified versus unqualified leads, sales funnel stage (including: prospecting, new opportunities, initial communications, fact finding, solution development, solution proposal, solution evaluation, negotiation, purchase order, etc.), time allocation on sales versus non sales (internal) activities, as well as the speed and quality of their follow-up—to both challenge their subjective perceptions, self-assess their efforts, mentor others and gain insight on what adjustments can be made to improve performance (to this end, salespeople will have the opportunity to contrast and compare their time allocation to that of another salesperson and/or a composite of the top X % of salespeople and/or to the team in general).

Forecast Analysis Mechanisms: The innovations contained herein also include a dynamically-updated data pattern matching and modeling analysis that relies on the aggregated personal data streams described above (filtered to provide data about specific sales opportunities) which correlates the spectrum of historical aggregated data stream events to historically successful sales outcomes (factoring in business seasonality) in order to identify those current opportunities in the sales pipeline whose external data attributes appear to correlate more to failure than success— with a data model that is dynamically updated as new sales take place so that the analysis becomes more accurate the longer the solution is in place.

Implementations herein also include productivity and time-allocation tracking and analysis by through the use of machine data and other data sources. Such implementations may include integrity and productivity management features. Managers and salespeople themselves can view their own productivity reports to gain insight on their time allocation by activity type (including time spent on internal and external activities as well as business related and non-business related activities, including personal calls), total account or individual sale value, qualified versus unqualified leads, sales funnel stage (including: prospecting, new opportunities, initial communications, fact finding, solution development, solution proposal, solution evaluation, negotiation, purchase order, etc.), time allocation on sales versus non sales (internal) activities, as well as the speed and quality of their follow-up. Allowing employees to see this productivity-related information allows them to both challenge their subjective perceptions to self-assess their efforts and gain insight on what adjustments can be made to improve performance. To this end, salespeople will have the opportunity to contrast and compare their time allocation to that of another salesperson and/or a composite of the top X % of salespeople and/or to the team in general. Over time, productivity modeling enables team members to process how changes in their own productive behaviors can impact on their sales performance. For the manager, productivity becomes a dashboard metric with associated alarms and configurable reports. The modeling component provides managers with valuable insights on where productive efforts should be focused in the context of specific product lines while also providing the business insight required for mentoring and assessing sales staff. Historical productivity data is also used for productivity data pattern-matching and modeling to create time allocation/optimization success models. Productivity analysis also provides insight for sales territory management by enabling managers to distinguish between 'order takers' who make little effort to obtain new business and salespeople who make heroic efforts to meet their sales quota. This distinction provides meaningful insight on when sales territories should be split and arguably provides a superior metric to the most common practice of splitting sales territories when they reach sales quota targets.

Figure 1B:
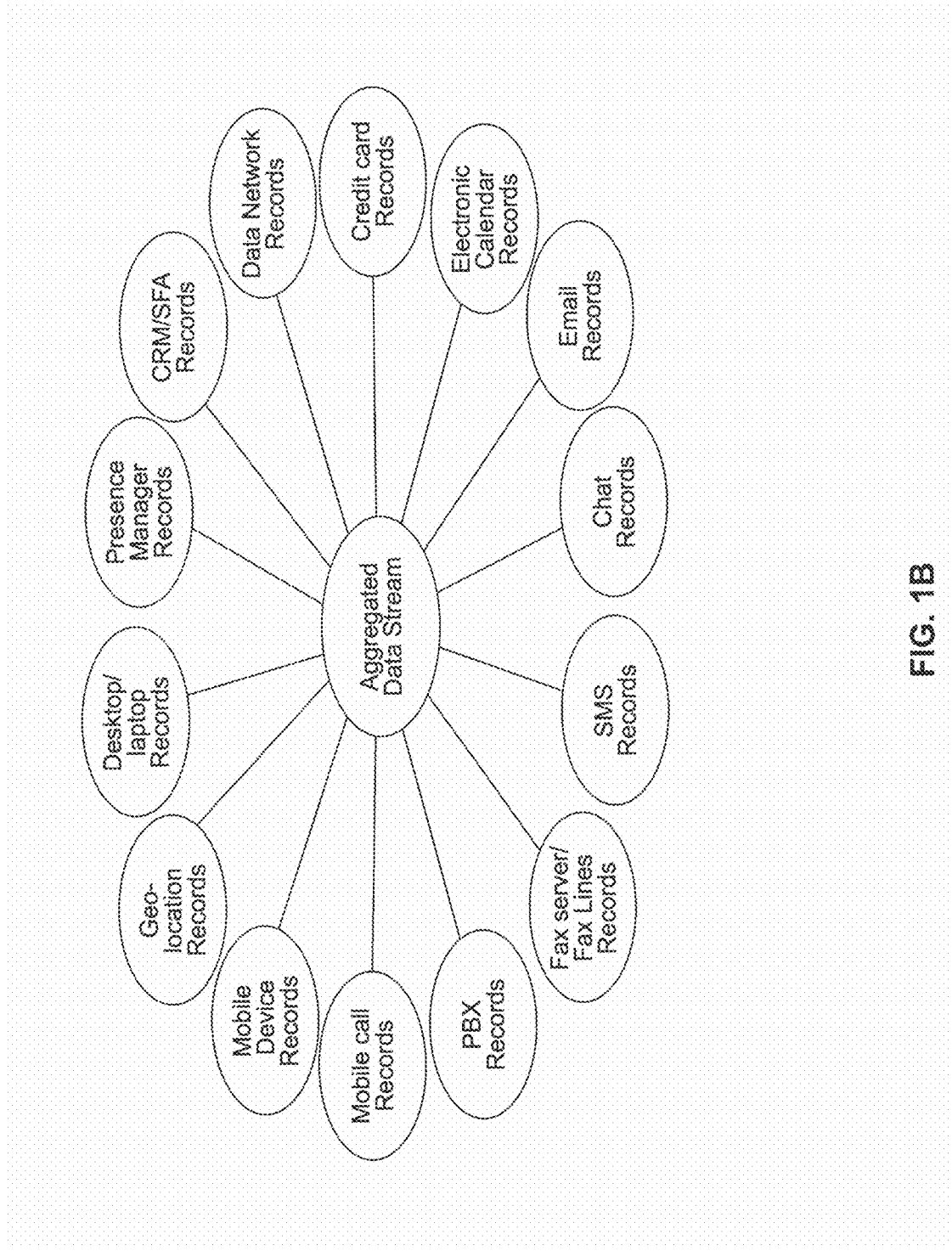
FIG. 1B is a diagram of an data aggregation implementations consistent with certain aspects related to the innovations herein.

FIG. 1B is a block diagram of the aggregated data stream 195 that aggregates data of a user/employee from a plurality of remote data streams, e.g., over various wireless and wired communication networks. The data streams may include desktop/laptop records, presence manager records, CRM/SFA records, data network records, credit card records, electronic calendar records, email records, chat records, SMS records, fax server and fax line records, PBX records, mobile call records, mobile device records, geolocation records and other records. The data from the aggregate data stream may be stored in a server, database, etc.

Figure 2A:
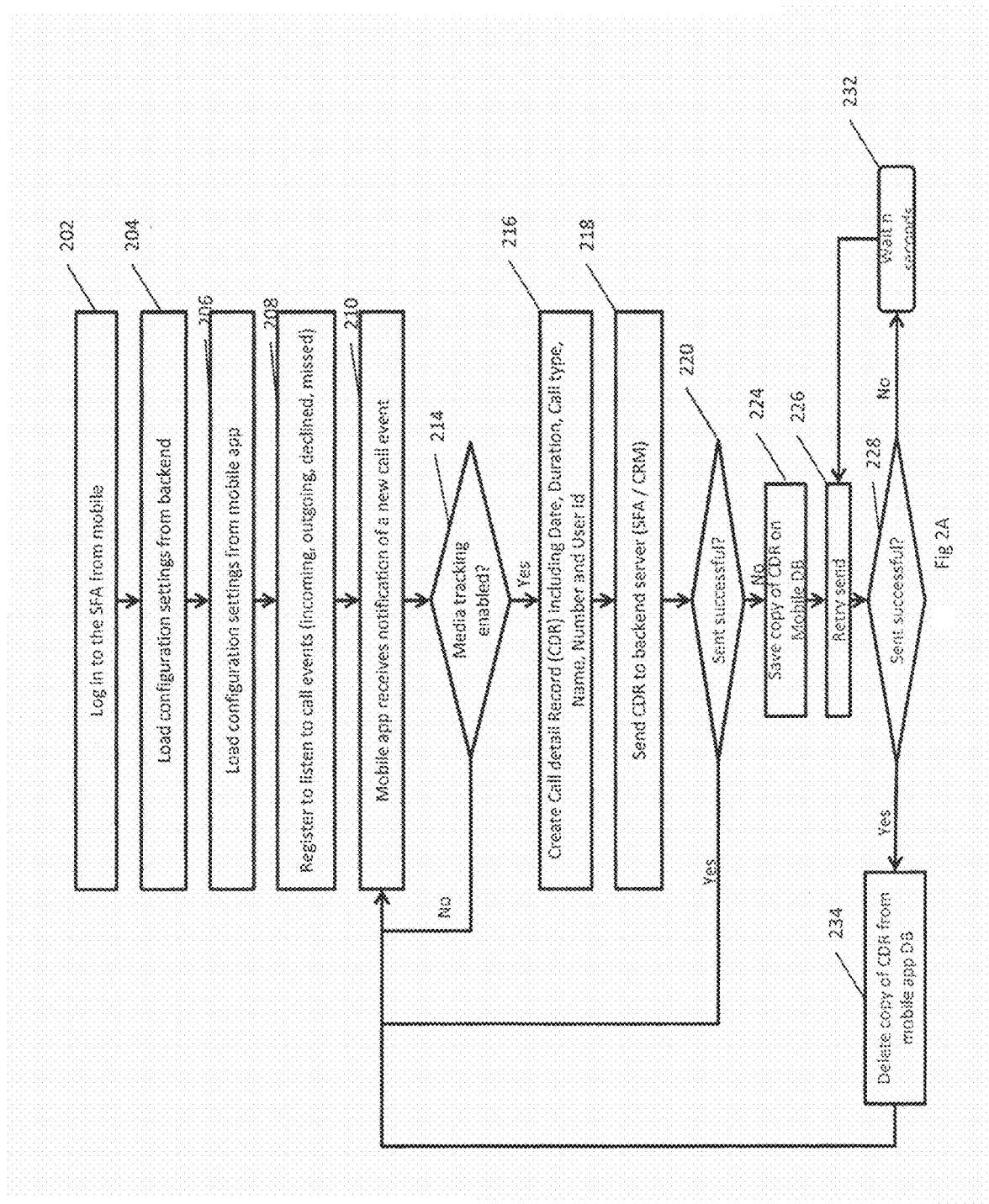
FIGS. 2A-2B are flowcharts of illustrative mobile phone capture processing consistent with certain aspects related to the innovations herein.
Figure 2B:
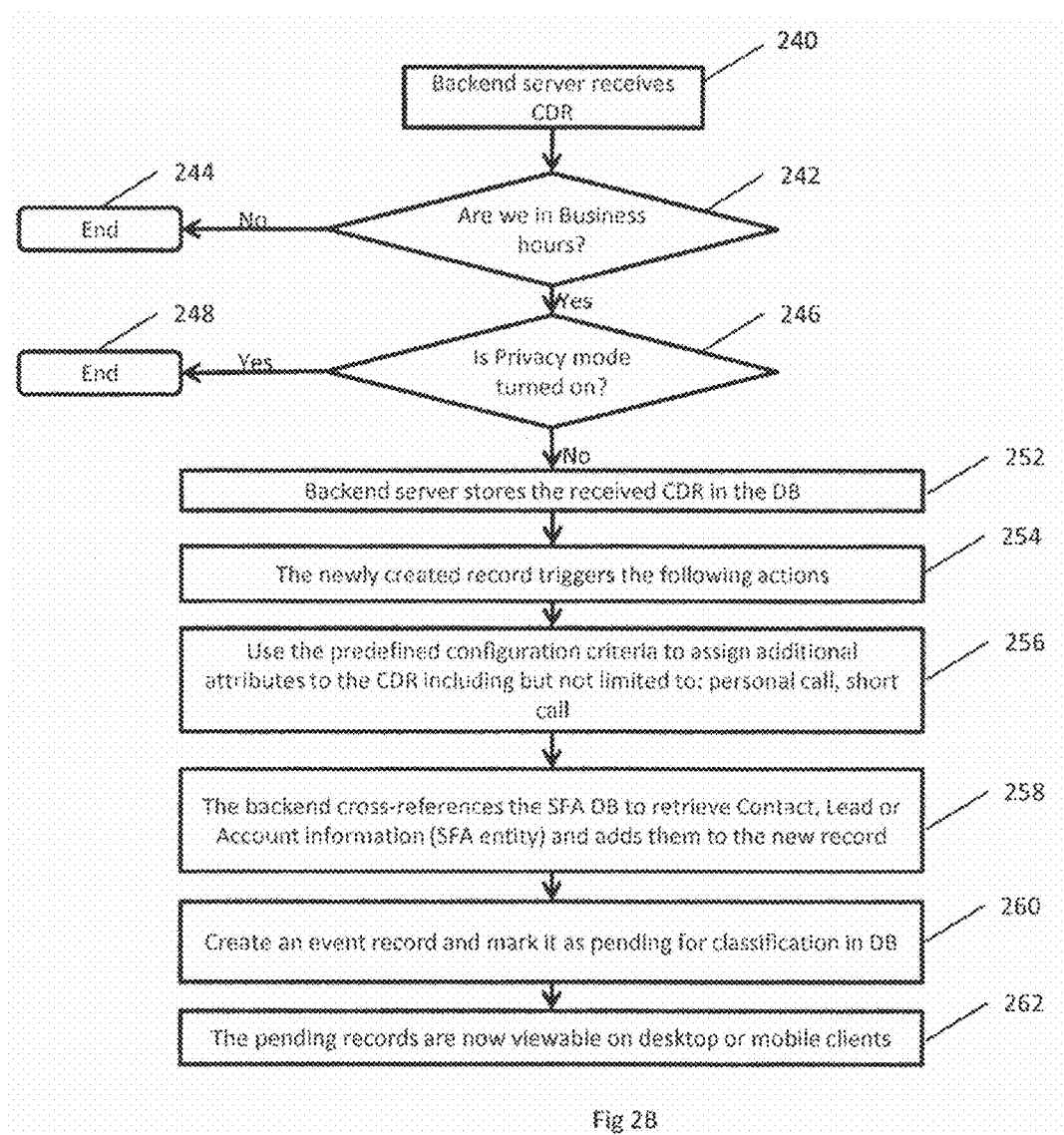

FIGS. 2A-2B are flowcharts of illustrative mobile phone capture processing consistent with certain aspects related to the innovations herein. Referring to FIG. 2A, an illustrative process of capturing a mobile phone call and/or SMS is shown. In a few optional initial steps, a salesperson may log into the Sales Force Automation SFA server from a mobile device, at 202, and/or configuration settings may be loaded from the backend, at 204. Configuration settings may then be loaded from a mobile application ("app"), at 206. The app may then be registered, at 208, to listen to call events such as incoming calls, outgoing calls, declined calls, missed calls, incoming SMS, outgoing SMS, etc. At 210, the mobile app receives notification of a new call event 210, at which point media tracking may then be enabled or not enabled, at 214. If media tracking is not enabled, the process returns to 210 to await receipt of another notification of a new call event. If, at 214, media tracking is enabled, the process then creates a call detail record (CDR), at 216, which may include data such as date, call type, name, number and/or user ID. Next, the call detail record is sent to the backend server, at 218, e.g., to a SFA server, a CRM server, or the like. According to various implementations herein, call event notifications may be received in real-time from the underlying mobile OS or the native call application of the device. Call event notifications may also be received from third party application(s) installed in the mobile phone (Lync, Skype, Line2, etc.). Moreover, implementations may also be configured such that the Call Log may be downloaded from the mobile to the desktop and processed as a batch file. Here, for example, iTunes may be used to download the call logs to a desktop. Then, the same process described above might be applied to create all the CDR and send them to the backend server to be processed.

Further, in some embodiments, a verification step may then be performed to confirm that the call detail record was sent successfully 220. If so, the process may again return to 210 to await receipt of another notification of a new call event. If the send is not successful, a copy of the call detail record is saved in connection with the mobile device, at 224, such as in the mobile device app database. Then, a routine attempting to again send the call detail record, or wait and re-send it, is performed, at 226, 228 and 232. Once the re-send is successful, the process proceeds to a step of deleting the copy of the CDR from the mobile app database, at 234, and again returning to 210 to await receipt of another notification of a new call event. The verification step described above might be performed either synchronously or asynchronously.

Referring to FIG. 2B, an illustrative process of data treatment and storage into the database by the backend is shown. The backend receives the CDR sent by the mobile app (cf. FIG. 2A), at 232. At which point, the backend verifies that the date and time of the CDR are within business hours, at 242. If not, the CDR will not be processed, at 244. If within business hours, then the process verifies that the Privacy mode is not enabled, at 246. If enabled, the CDR will not be processed, at 248. If not enabled, the process stores the CDR in a preliminary database table, at 252, at which point a trigger is sent indicating a new record has been added and ready for processing, at 254. Additional attributes are assigned to the record if certain predefined criteria are met, at 256. A partial list of these attributes can include: Short call, Personal call, internal call, etc. The process cross-references the SFA database to retrieve any existing SFA entity records that might be associated with the CDR, such as Contact, Account, Lead and Opportunity, and adds the results to the record, at 258. The record is now ready to be added to the database table of processed records and marked as Pending, at 260. The record is now viewable on the desktop application as well as the mobile application, 262.

Figure 3B:
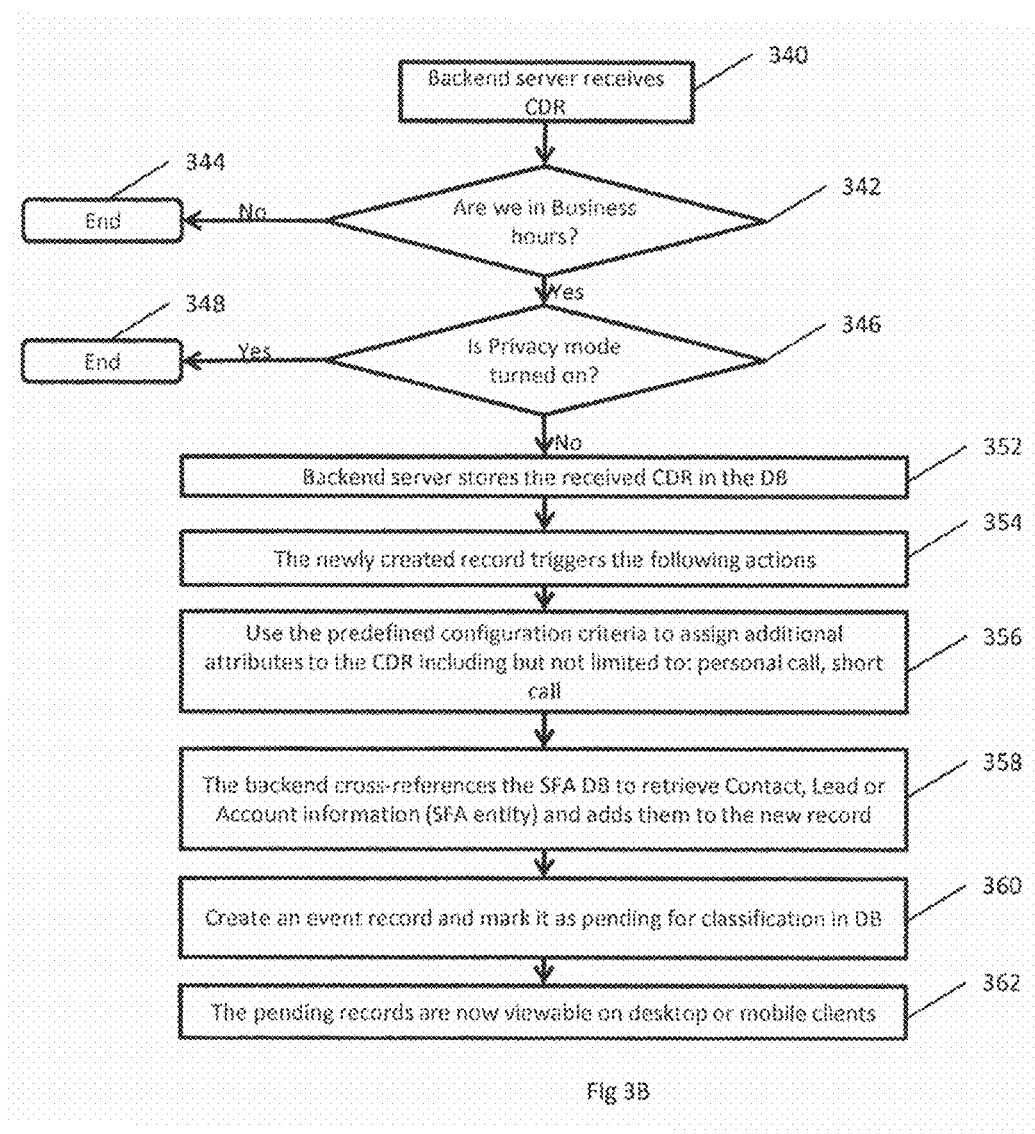

FIGS. 3A-3B are flowcharts of illustrative PBX phone call capture processing consistent with certain aspects related to the innovations herein. Referring to FIG. 3A, an illustrative process of capturing phone call data from phone systems is shown. In a few optional initial steps, a phone system connector may log into the Sales Force Automation SFA server as an administrator, at 302, and/or configuration settings may be loaded from the backend, at 304. The phone system connector is configured to log into the phone system and register to listen to call events such as incoming calls, outgoing calls, declined calls, missed calls, etc., at 306. The phone system connector can launch a query to the phone system to retrieve all the Call Detail Records not received since last connection, at 308. The retrieved CDRs can be added to the queue of new call events to be processed. The phone system connector can receive notification of a new call event for a specific user, at 310, at which point the phone system connector can verify if the media tracking is enabled or not enabled, at 314. If media tracking is not enabled, the process may return to 310 to await receipt of another notification of a new call event. If, at 314, media tracking is enabled, the process can then create a call detail record (CDR), at 316, which may include data such as date, call type, name, number and/or user ID. Next, the call detail record is sent to the backend server, at 318, e.g., to a SFA server, a CRM server, or the like.

According to various implementations herein, the process described may apply to any local phone call system (a short list of these includes Traditional PBX, virtual PBX, Key system, Call managers, Presence managers, Softswitch). Further, in some embodiments, a verification step may then be performed to confirm that the call detail record was sent successfully 320. If so, the process may again return to 310 to await receipt of another notification of a new call event. If the send is not successful, a copy of the call detail record may be saved in connection with the phone system, at 324, such as in the phone system connector local database. Then, a routine attempting to again send the call detail record, or wait and re-send it, may be performed, at 326, 328 and 332. If the re-send is successful, the process can proceed to a step of deleting the copy of the CDR from the phone system connector database, at 334, and again returning to 310 to await receipt of another notification of a new call event. The verification step described above might be performed either synchronously or asynchronously.

Referring to FIG. 3B, an illustrative process of data treatment and storage into the database by the backend is shown. The backend can receive the CDR sent by the phone system connector (cf. FIG. 3A), at 340. At which point, the backend may verify that the date and time of the CDR are within business hours, at 342. If not, the CDR will not be processed, at 344. If within business hours, then the process can verify that the Privacy mode is not enabled, at 346. If enabled, the CDR will not be processed, at 348. If not enabled, the process can store the CDR in a preliminary database table, at 352, at which point a trigger may be sent indicating a new record has been added and ready for processing, at 354. Additional attributes can be assigned to the record if certain predefined criteria are met, at 356. A partial list of these attributes includes, but is not limited to: Short call, Personal call, internal call, etc. The process can cross-reference the SFA database to retrieve any existing SFA entity records that might be associated with the CDR such as Contact, Account, Lead and Opportunity, and can add the results to the record, at 358. The record is now ready to be added to the Recorded Events database marked as Pending, at 360. The record is now viewable on the desktop application as well as the mobile application, 362.

Figure 4A:
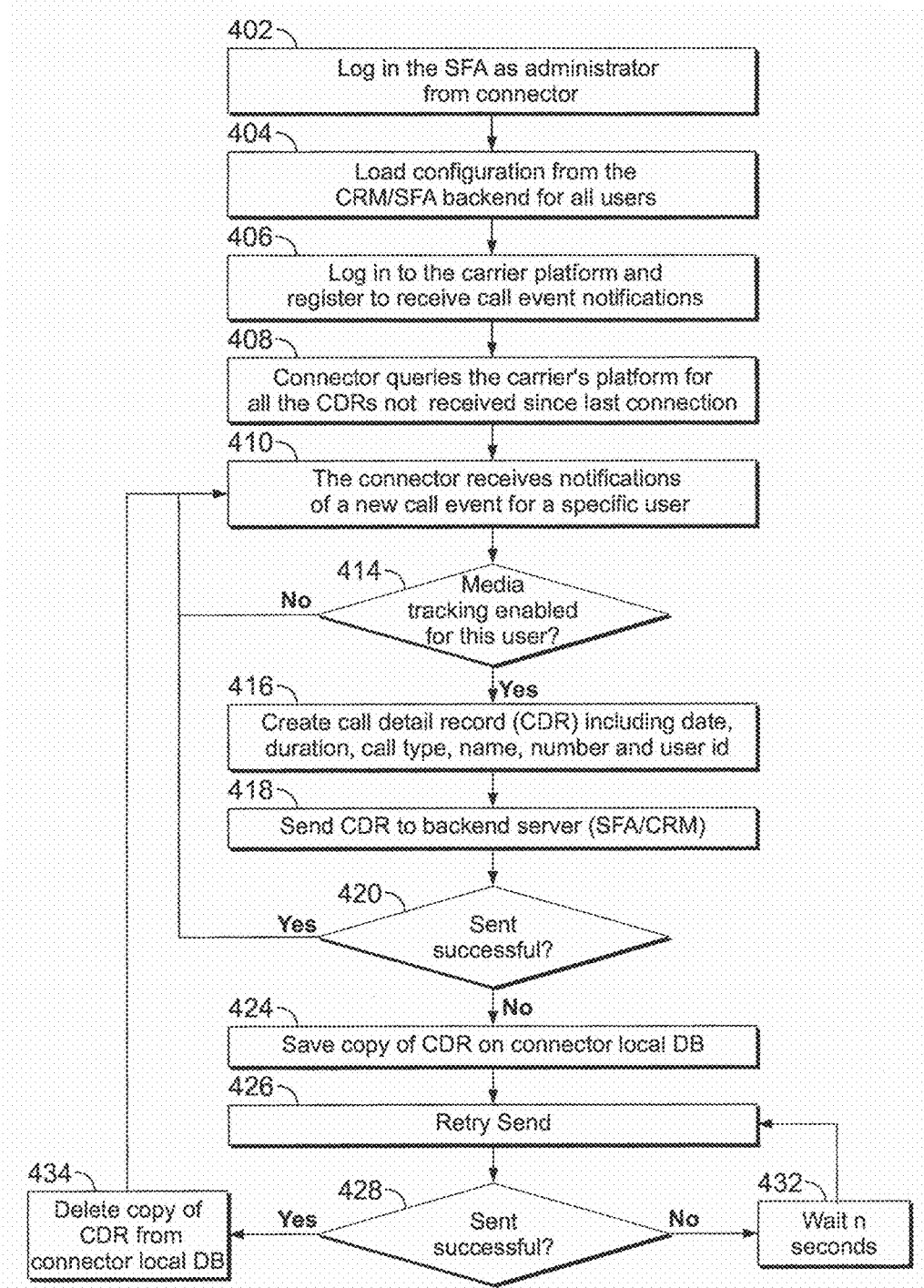
FIGS. 4A-4B are flowcharts of illustrative phone call and SMS capture processing from carriers consistent with certain aspects related to the innovations herein.
Figure 4B:
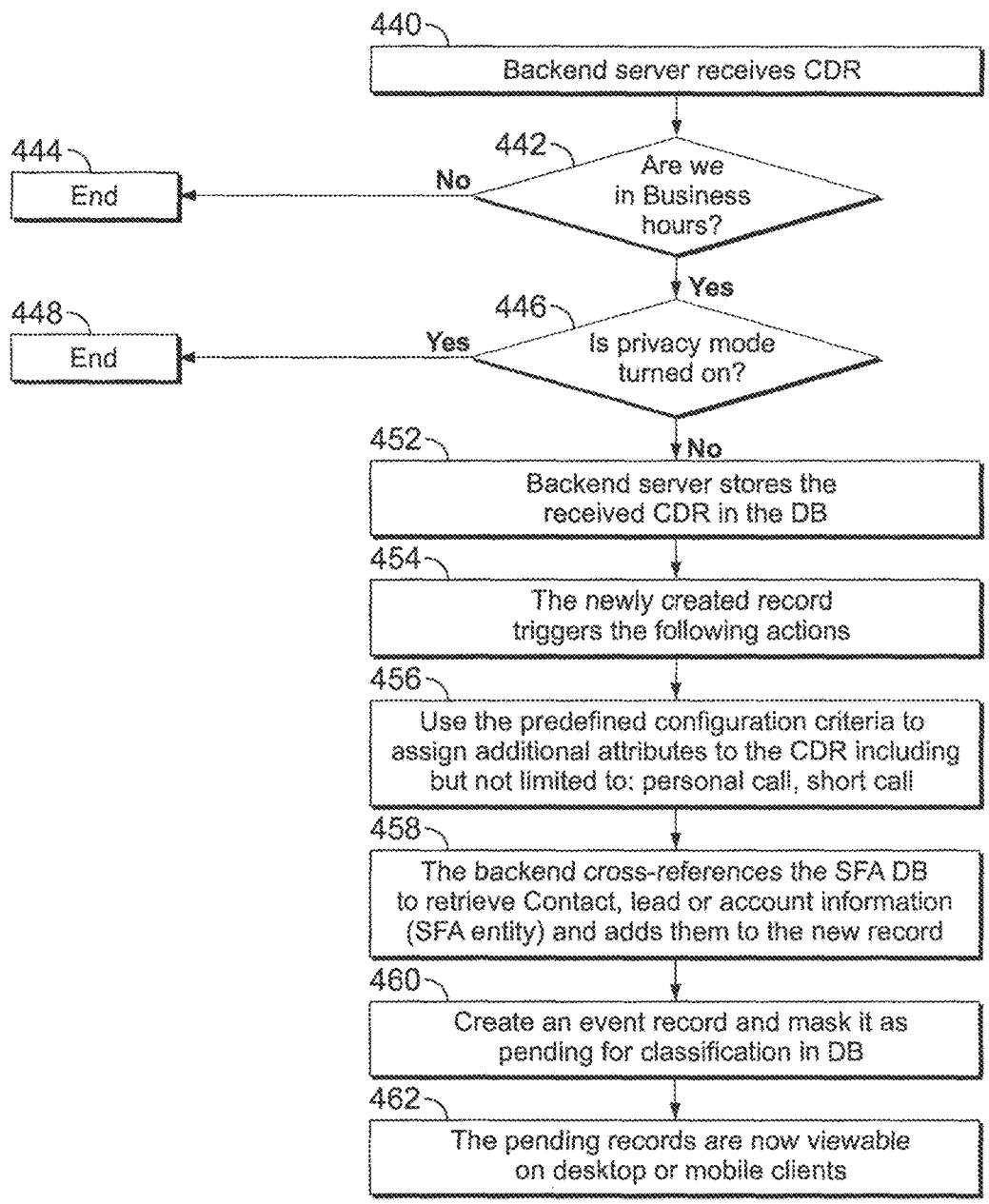

FIGS. 4A-4B are flowcharts of illustrative phone call and SMS capture processing from phone carriers consistent with certain aspects related to the innovations herein. Referring to FIG. 4A, an illustrative process of capturing phone call data from wireline, mobile and packet switched (VoIP) telephone carriers (Carrier) is shown. In a few optional initial steps, a phone system connector may log into the Sales Force Automation SFA server as an administrator, at 402, and/or configuration settings for all users may be loaded from the backend, at 404. The phone system connector can log into the Carrier's platform and register to receive call event notifications such as incoming calls, outgoing calls, declined calls, missed calls, incoming SMS, outgoing SMS, etc., at 406. The phone system connector can launch a query to the Carrier platform to retrieve all the Call Detail Records not received since last connection, at 408. The retrieved CDRs may be added to the queue of new call events to be processed. The phone system connector can receive notification of a new call event for a specific user, at 410, at which point the phone system connector can verify if the media tracking is enabled or not enabled, at 414. If media tracking is not enabled, the process returns to 410 to await receipt of another notification of a new call event. If, at 414, media tracking is enabled, the process can then create a call detail record (CDR), at 416, which may include data such as date, call type, name, number and/or user ID. Next, the call detail record may be sent to the backend server, at 418, e.g., to a SFA server, a CRM server, or the like.

According to various implementations herein, data provided from the carrier may cover, for example, mobile phone calls, SMS and landline calls, among others.

Further, in some embodiments, a verification step may then be performed to confirm that the call detail record was sent successfully 420. If so, the process may again return to 410 to await receipt of another notification of a new call event. If the send is not successful, a copy of the call detail record is saved in connection with the phone system, at 424, such as in the local phone system connector database. Then, a routine attempting to again send the call detail record, or wait and re-send it, is performed, at 426, 428 and 432. If the re-send is successful, the process proceeds to a step of deleting the copy of the CDR from the phone system connector database, at 434, and again returning to 410 to await receipt of another notification of a new call event.

Referring to FIG. 4B, an illustrative process of data treatment and storage into the database by the backend is shown. The backend can receive the CDR sent by the phone system connector (cf. FIG. 4A), at 440. At which point, the backend can verify that the date and time of the CDR are within business hours, at 442. If not, the CDR will not be processed, at 444. If within business hours, then the process verifies that the Privacy mode is not enabled, at 446. If enabled, the CDR will not be processed, at 448. If not enabled, the process stores the CDR in a preliminary database table, at 452, at which point a trigger may be sent indicating a new record has been added and ready for processing, at 454. Additional attributes are assigned to the record if certain predefined criteria are met, at 456. A partial list of these attributes may include but is not limited to: Short call, Personal call, internal call, etc. The process cross-references the SFA database to retrieve any existing SFA entity records such as Contact, Account, Lead and Opportunity, and adds the results to the record, at 458. The record is now ready to be added to the Recorded Events database marked as Pending, at 460. The record is now viewable on the desktop application as well as the mobile application, 462.

Figure 5A:
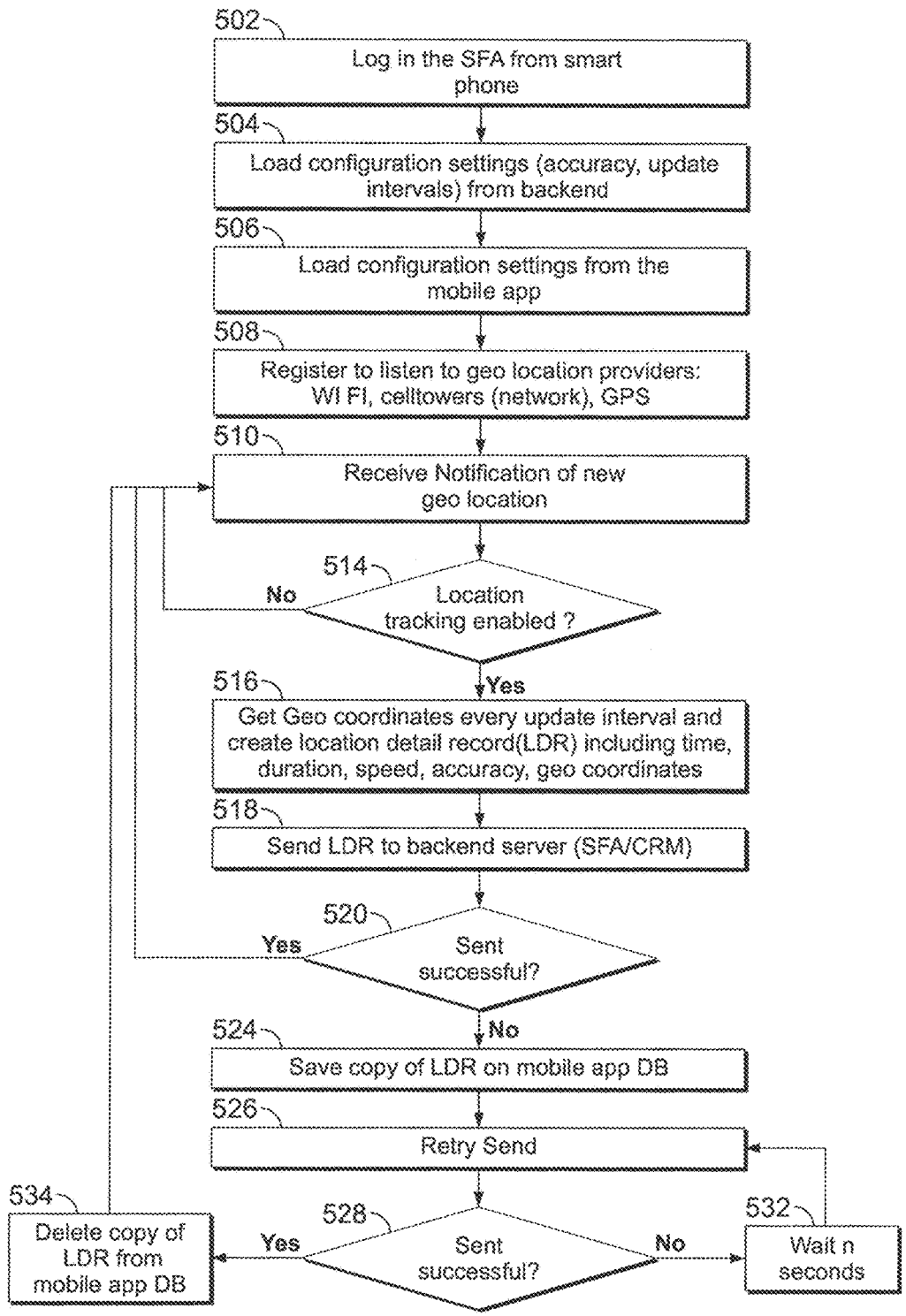
FIGS. 5A-5C are flowcharts of illustrative geolocation capture processing from mobile devices consistent with certain aspects related to the innovations herein.
Figure 5B:
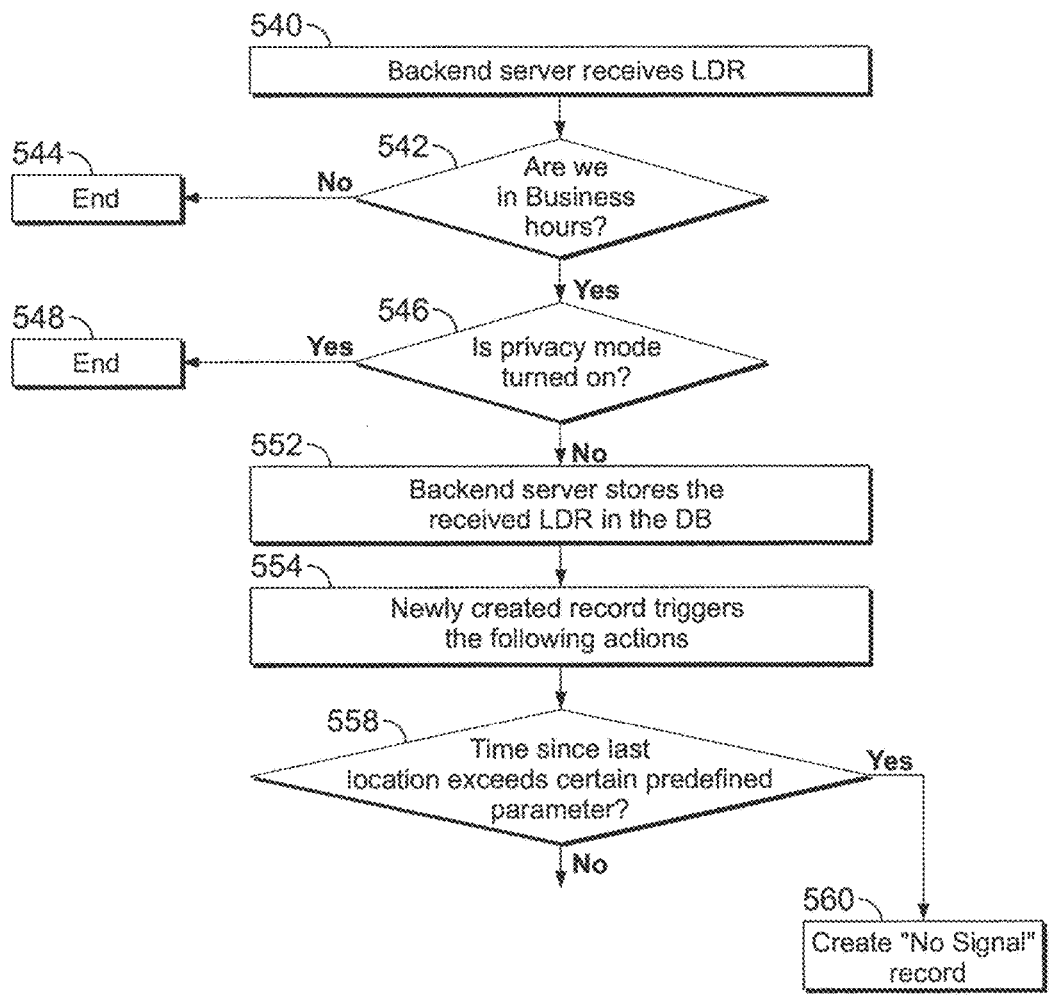
Figure 5C:
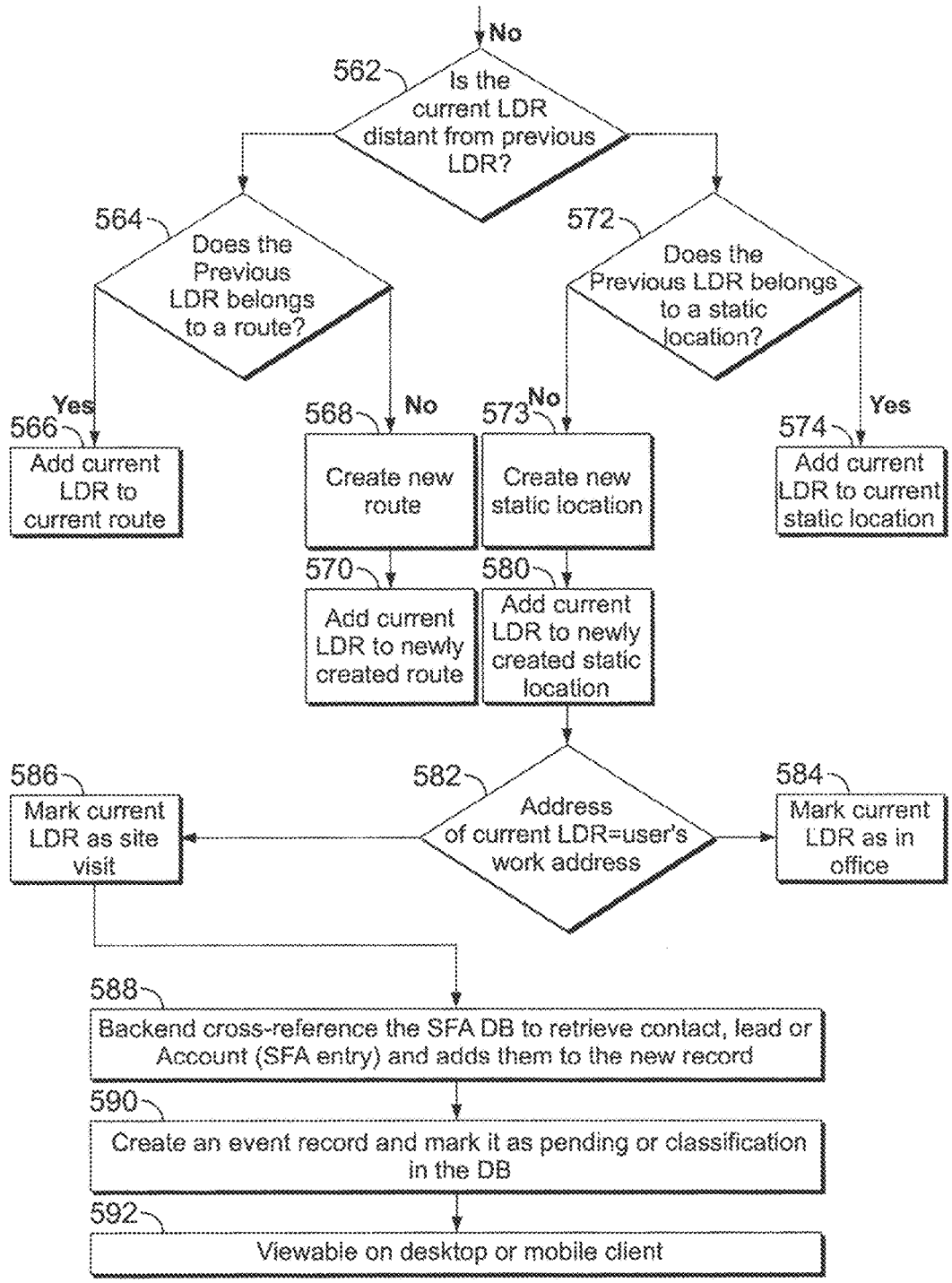

FIGS. 5A-5C are flowcharts of illustrative geolocation capture processing from mobile devices consistent with certain aspects related to the innovations herein.

Referring to FIG. 5A, an illustrative process of capturing geolocation from smartphone devices is shown. In a few optional steps, the mobile app logs into the Sales Force Automation SFA server from a mobile device, at 502, and/or configuration settings may be loaded from the backend, at 504. Configuration settings may then be loaded from a mobile application ("app"), at 506. The app may then be registered, at 508, to listen to geolocation providers such as, for example: Wi-Fi, Cell towers (network) and GPS satellites, among others. The mobile app receives, at 510, a new geolocation notification, at which point the Location Tracking option may be enabled or not enabled, at 514. If Location Tracking is not enabled, the process returns to 510 to await receipt of another notification of a new geolocation event. If, at 514, Location Tracking is enabled, the process then creates a Location Detail Record (LDR), at 516, which may include data such as date and time, duration, speed, accuracy, longitude, latitude and altitude. Next, the call detail record is sent to the backend server, at 518, e.g., to a SFA server, a CRM server, or the like.

Further, in some embodiments, a verification step may then be performed to confirm that the Location Detail Record was sent successfully 520. If so, the process may again return to 510 to await receipt of another notification of a new geolocation event. If the send is not successful, a copy of the Location Detail Record may be saved in connection with the mobile device, at 524, such as in the mobile device app database. Then, a routine attempting to again send the call detail record, or wait and re-send it, may be performed, at 526, 528 and 532. If the re-send is successful, the process proceeds to a step of deleting the copy of the LDR from the mobile app database, at 534, and again returning to 510 to await receipt of another notification of a new call event. The verification step described above might be performed either synchronously or asynchronously.

Referring to FIGS. 5B and 5C, an illustrative process of data aggregation and storage into the database by the backend is shown. The backend receives the CDR sent by the mobile app (cf. FIG. 5A), at 540. At which point, the backend may verify that the date and time of the LDR are within business hours, at 542. If not, the LDR will not be processed, at 544. If within business hours, then the process may verify that the Privacy mode is not enabled, at 546. If enabled, the CDR will not be processed, at 548. If not enabled, the process may store the LDR in a preliminary database table, at 552, at which point a trigger may be sent indicating a new record has been added and ready for processing, at 554.

A process of geolocation aggregation of the data received may be performed that can allow differentiating when the series of consecutive geolocations data received describes a Route or a Static Location. The process may verify, first, if the signal is arriving regularly by comparing the time elapsed since previous LDR with a predefined parameter, at 558. If the time elapsed exceeds that parameter, the process may create a No Signal record, at 560, containing the Date and Time and the duration of the no signal period. If the time elapsed is within the predefined parameter, then the process may use the Speed data information received and/or the distance between the current LDR and the previous LDR with a predefined parameter, factoring in the precision and accuracy of the received geolocation data to determine if the user is moving or not from previous location, at 562. If he is moving, the process may check if it is a new route by checking if the previous LDR belongs already to a route, at 564. If so, the current LDR may be added to the existing route, at 566, if not, the process may create a new route, at 568 and add the current LDR to the newly created route, at 570. If test at 562 is negative (current LDR not distant from previous LDR), the process checks if the previous LDR was in a static location, at 572. If so, the process may add the current LDR to the existing Static Location, at 574, and if not, the system may create a new Static Location record, at 578, and add the current LDR to this existing Static Location, at 580.

After the geolocation aggregation process, the process may compare the address of the current LDR to the user's work address, at 582, to determine whether the user is In Office or on Site Visit. If In Office, the current LDR may be marked "In Office", at 584. If in Site Visit, the current LDR may be marked as "Site Visit", at 588, the process then creates a new event record and marks it as Pending for classification in the database, at 590. The final Event Record is viewable from the desktop application as well as the mobile application.

Figure 6A:
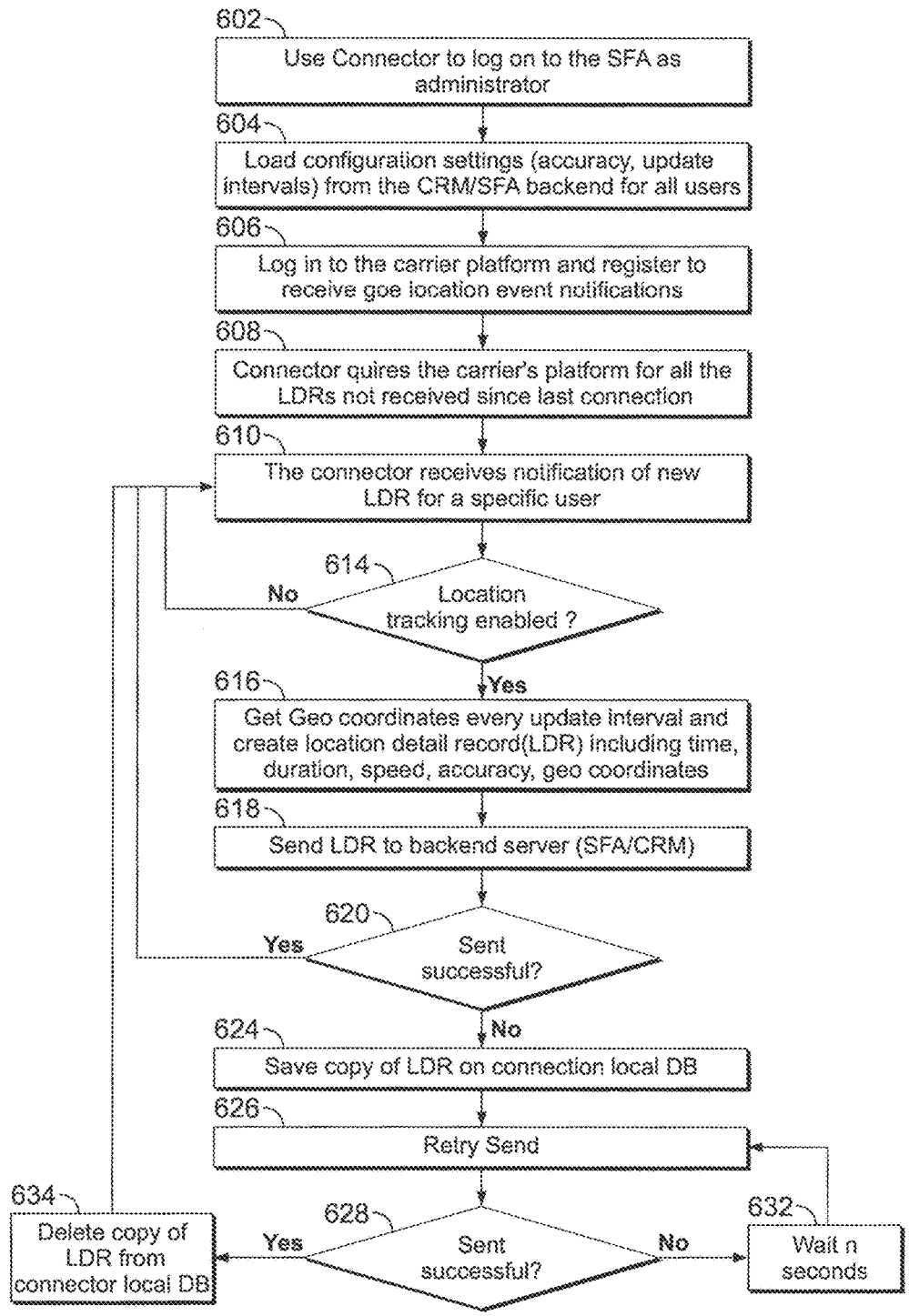
FIGS. 6A-6C are flowcharts of illustrative geolocation capture processing from phone carriers consistent with certain aspects related to the innovations herein.
Figure 6B:
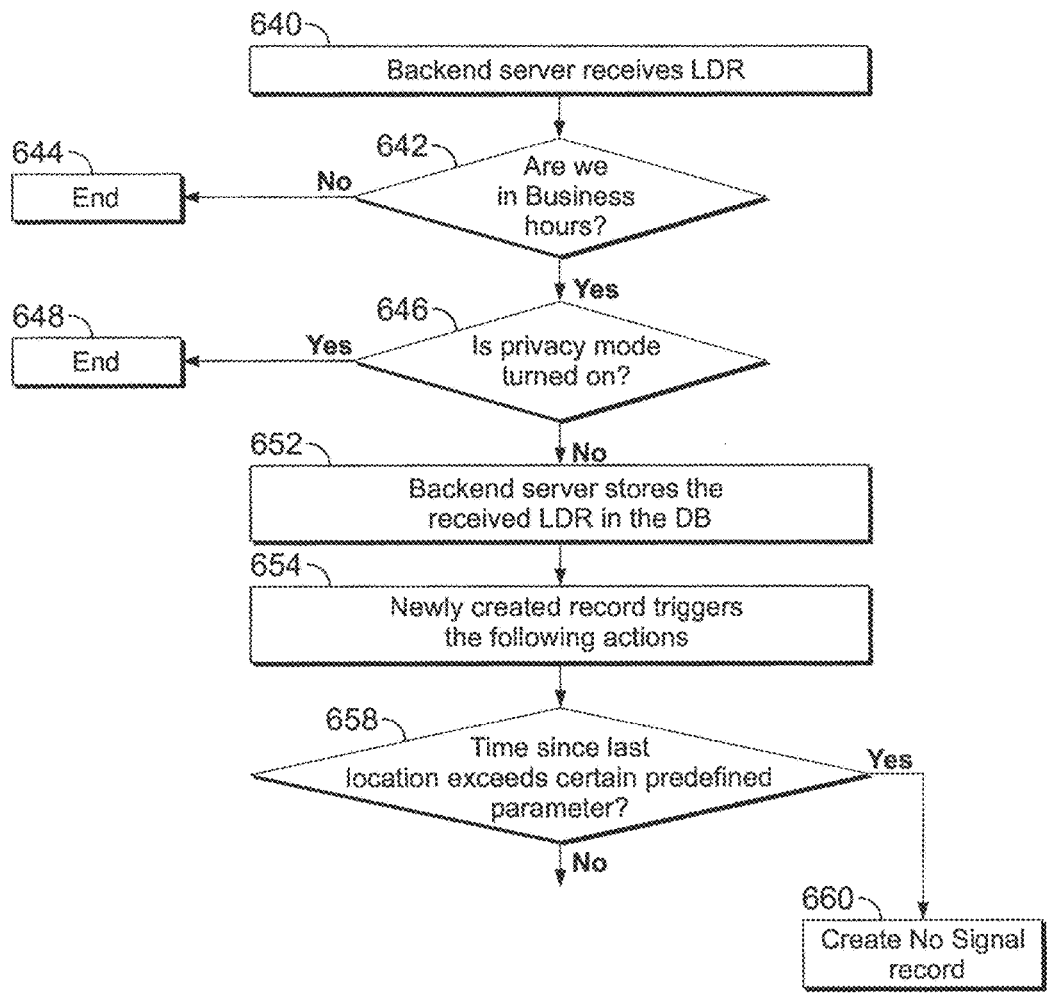
Figure 6C:
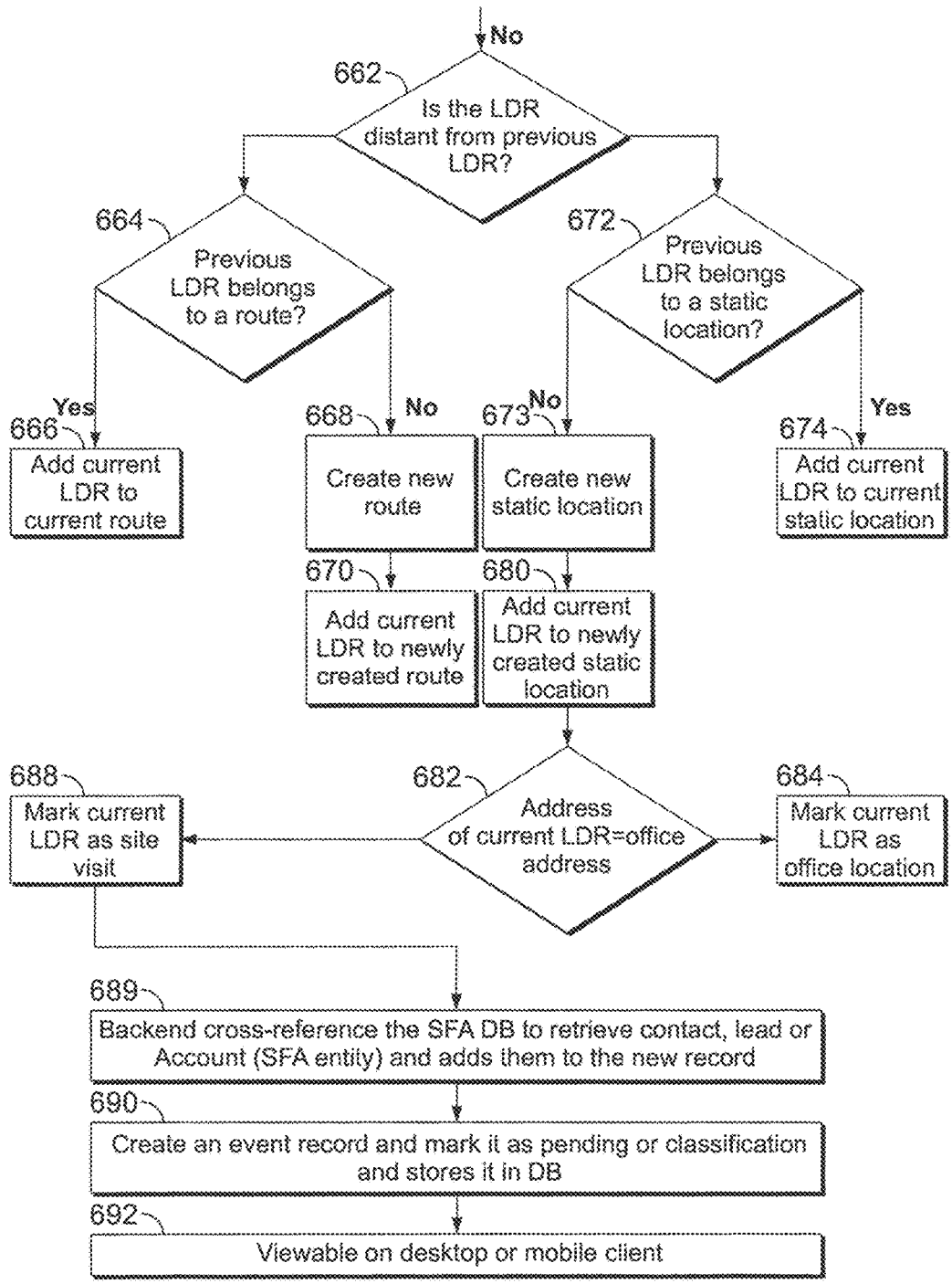

FIGS. 6A-6C are flowcharts of illustrative geolocation capture processing from phone carriers consistent with certain aspects related to the innovations herein.

Referring to FIG. 6A, an illustrative process of capturing geolocation from mobile telephone carriers (Carrier) is shown. In a few optional steps, the mobile app may log into the Sales Force Automation SFA server from a mobile device, at 602, and/or configuration settings may be loaded from the backend, at 604. The phone system connector may log into the Carrier's platform and registers to receive geolocation event notifications, at 606. The connector may receive, at 610, a new geolocation notification, at which point the Location Tracking option may be enabled or not enabled, at 614. If Location Tracking is not enabled, the process returns to 610 to await receipt of another notification of a new geolocation event. If, at 614, Location Tracking is enabled, the process may then create a Location Detail Record (LDR), at 616, which includes data such as date and time, duration, speed, accuracy, longitude, latitude and altitude. Next, the call detail record may be sent to the backend server, at 618, e.g., to a SFA server, a CRM server, or the like.

Further, in some embodiments, a verification step may then be performed to confirm that the Location Detail Record was sent successfully 620. If so, the process may again return to 610 to await receipt of another notification of a new geolocation event. If the send is not successful, a copy of the Location Detail Record may be saved in connection with the phone system connector, at 624, such as in the phone system connector local database. Then, a routine attempting to again send the call detail record, or wait and re-send it, may be performed, at 626, 628 and 632. Once the re-send is successful, the process may proceed to a step of deleting the copy of the LDR from the mobile app database, at 634, and again returning to 610 to await receipt of another notification of a new call event. The verification step described above might be performed either synchronously or asynchronously.

Referring to FIGS. 6B and 6C, an illustrative process of data aggregation and storage into the database by the backend is shown. The backend may receive the CDR sent by the mobile app (cf. FIG. 5A), at 640. At which point, the backend may verify that the date and time of the LDR are within business hours, at 642. If not, the LDR may not be processed, at 644. If within business hours, then the process may verify that the Privacy mode is not enabled, at 646. If enabled, the CDR may not be processed, at 648. If not enabled, the process stores the LDR in a preliminary database table, at 652, at which point a trigger may be sent indicating a new record has been added and ready for processing, at 654.

A process of geolocation aggregation of the data received may be performed that allows differentiating when the series of consecutive geolocations data received describes a Route or a Static Location. The process may verify, first, if the signal is arriving regularly by comparing the time elapsed since previous LDR with a predefined parameter, at 658. If the time elapsed exceeds that parameter, the process may create a No Signal record, at 660, containing the Date and Time and the duration of the no signal period. If the time elapsed is within the predefined parameter, then the process may use the Speed data information received and/or the distance between the current LDR and the previous LDR with a predefined parameter, factoring in the precision and accuracy of the received geolocation data to determine if the user is moving or not from previous location, at 662. If he is moving, the process may check if it is a new route by checking if the previous LDR belongs already to a route, at 664. If so, the current LDR may be added to the existing route, at 666, if not, the process may create a new route, at 668 and add the current LDR to the newly created route, at 670. If test at 662 is negative (current LDR not distant from previous LDR), the process checks if the previous LDR was in a static location, at 672. If so, the process adds the current LDR to the existing Static Location, at 674, and if not, the system may create a new Static Location record, at 678, and adds the current LDR to this existing Static Location, at 680.

After the geolocation aggregation process, the process may compare the address of the current LDR to the user's work address, at 682, to determine whether the user is In Office or on Site Visit. If In Office, the current LDR may be marked "In Office", at 684. If in Site Visit, the current LDR may be marked as "Site Visit", at 688, the process may then create a new event record and marks it as Pending for classification in the database, at 690. The final Event Record may be viewable from the desktop application as well as the mobile application.

Figure 7:
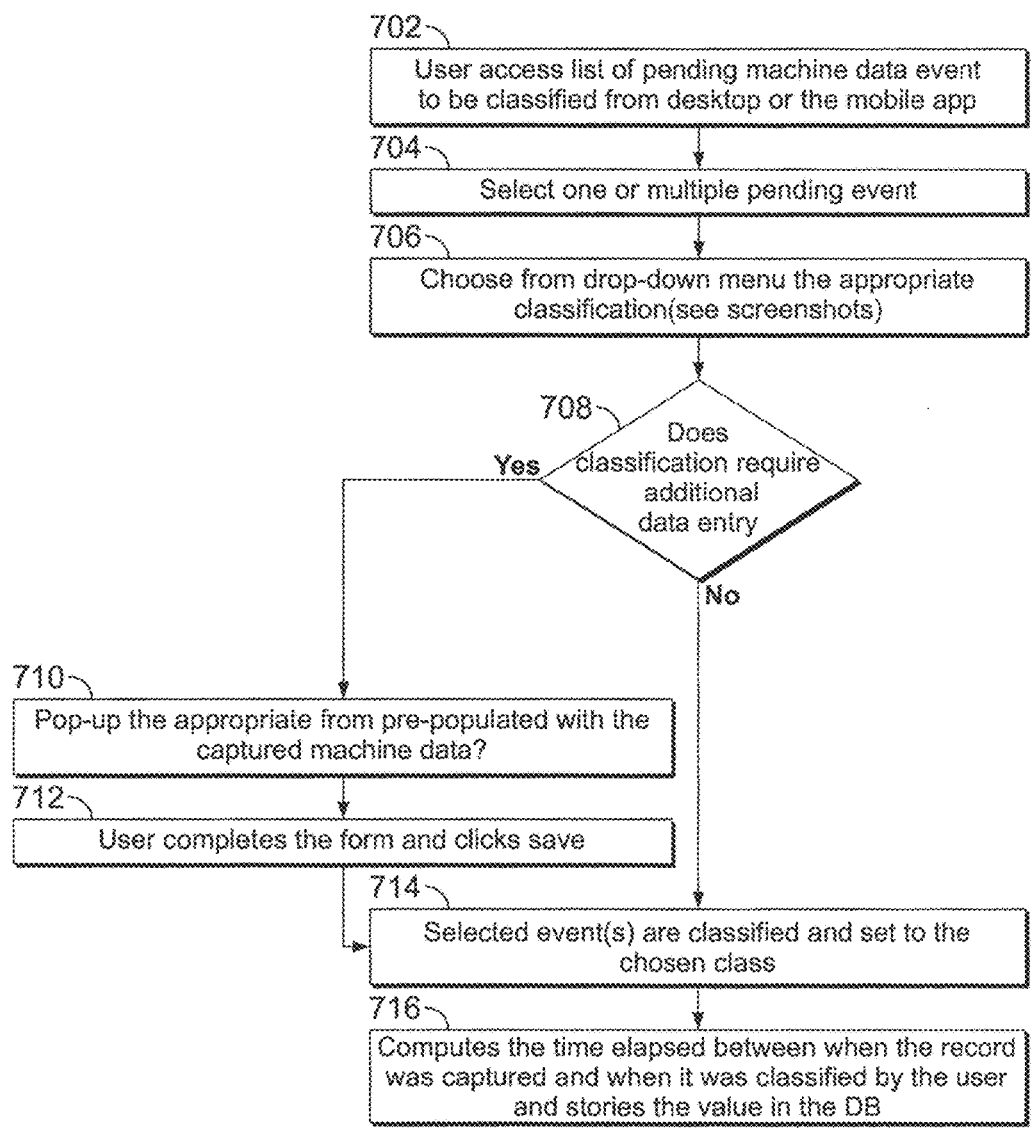
FIG. 7 is a flowchart of illustrative user 4 classification processing consistent with certain aspects related to the innovations herein.

FIG. 7 is a flowchart of illustrative user classification processing consistent with certain aspects related to the innovations herein. Referring to FIG. 7, an illustrative User Classification Process is shown. Here, the user can access directly to the list of Pending events that require the user to enter a note and/or additional information, at 702. The user can select one or multiple events, at 704, and select from one of the two drop-down menus the appropriate classification that qualifies the type of event selected, at 706. In some implementations, the choice for classification falls in 2 main categories, as shown in 820 FIG. 8A, as Work Related and Not Work Related, and within each of these 2 categories, a configurable set of sub-categories predefined in compliance with the company's profile, as shown in 822 FIG. 8A and 830 FIG. 8B. In case additional information is required, at 708, a pop-up form will pop-up with pre-populated fields from the information captured in the pending event, at 710. The user completes the form by adding a note and/or additional information and clicks save to record the activity in the SFA/CRM, at 712. The selected events are marked with the classification entered by the user, at 714, and the time elapsed since the time the record was captured and the time it was classified is stored in the database.

Figure 8A:
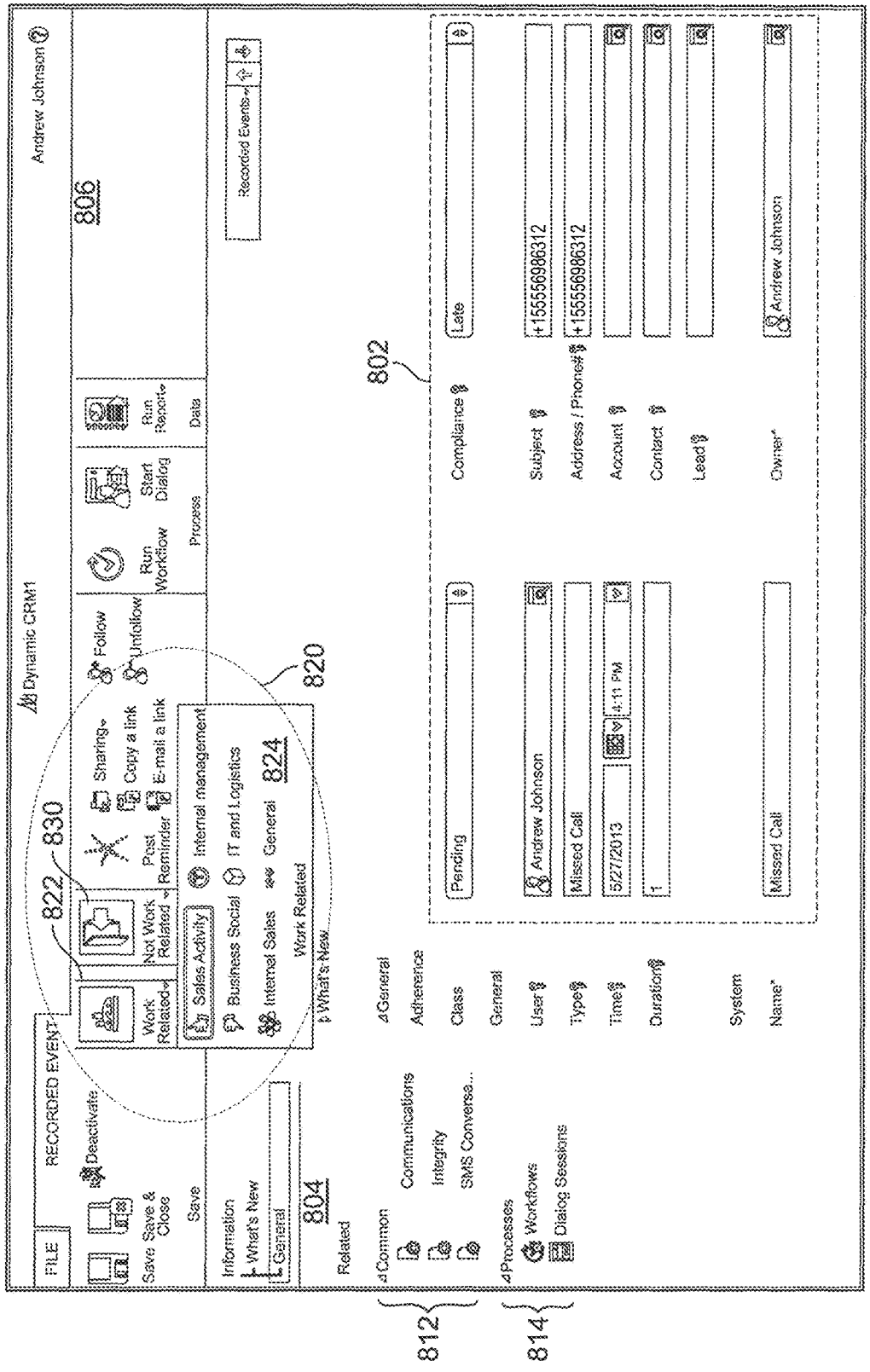
FIGS. 8A-8B are illustrative user interfaces showing exemplary classification processing features consistent with certain aspects related to the innovations herein.
Figure 8B:
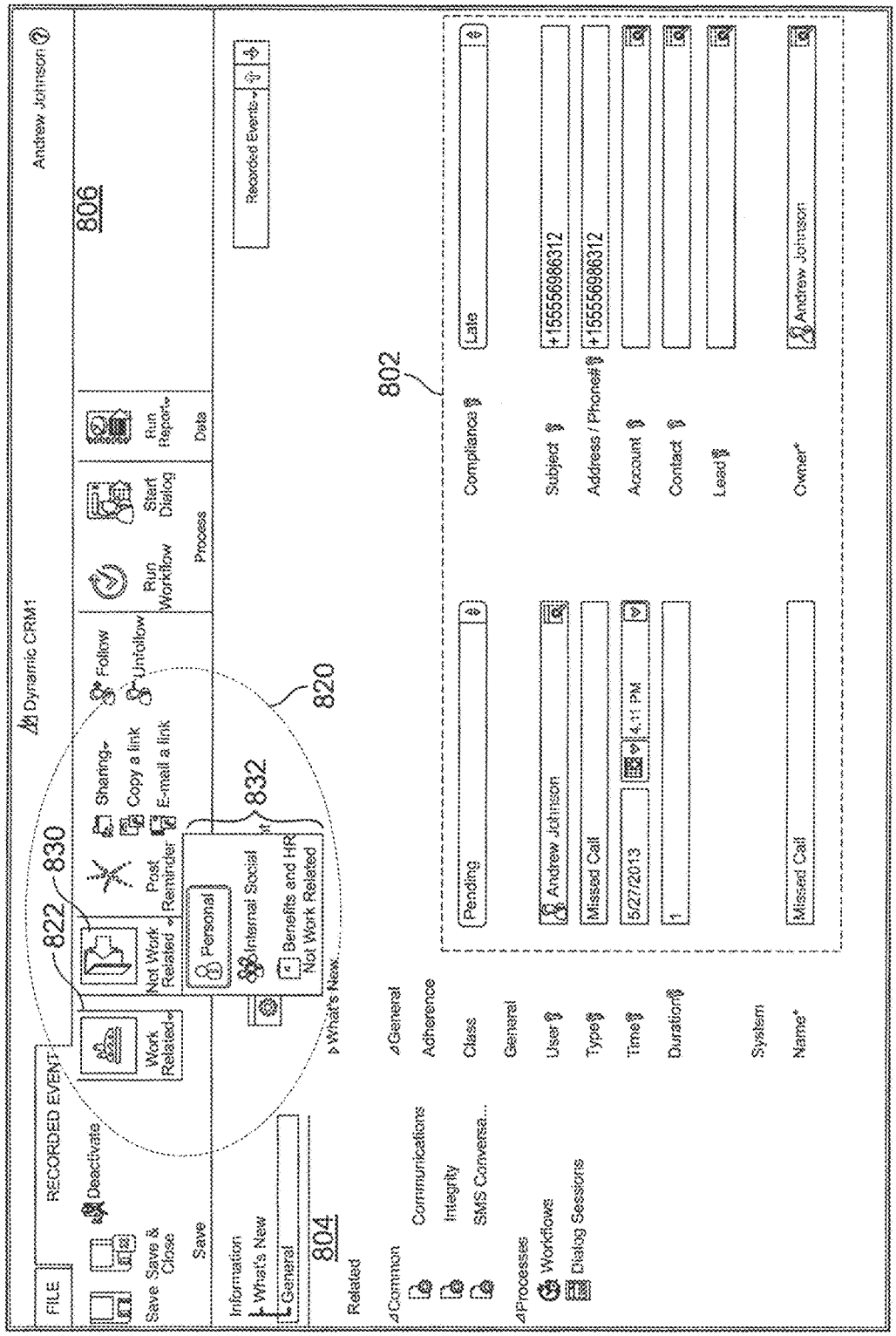

FIGS. 8A and 8B are illustrations of an embodiment of a classification process. The user GUI 806 displays the event data 802 pre-populated into the GUI 806. In this case, the event data 802 is a missed call pending classification. The highlighted section 820 indicates a menu for classifying the pending event data 802 into different categories such as work related 822 and not work related 830. Once a user selects either of these categories, then a corresponding sub-menu appears for the user to select a more specific description. The sub-menu 824 includes work related activities such as sales activity, internal management, business social, IT and logistics, internal sales and general. The sub-menu 832 includes personal, internal social, and benefits and HR classifications. Sidebar 804 allows a user to quickly select options such as common tasks 812 and processes 814.

Figure 9A:
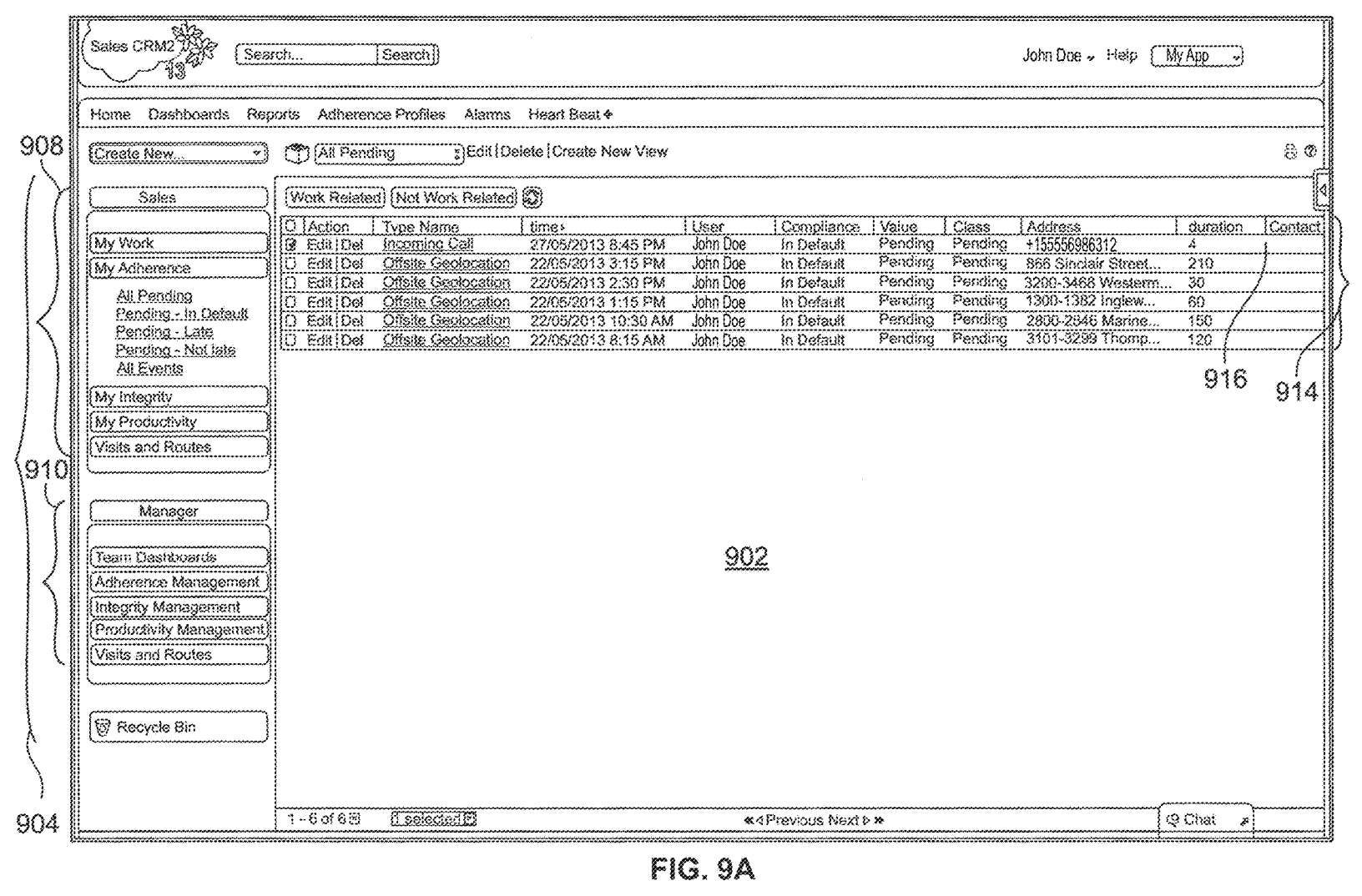
Figure 9B:
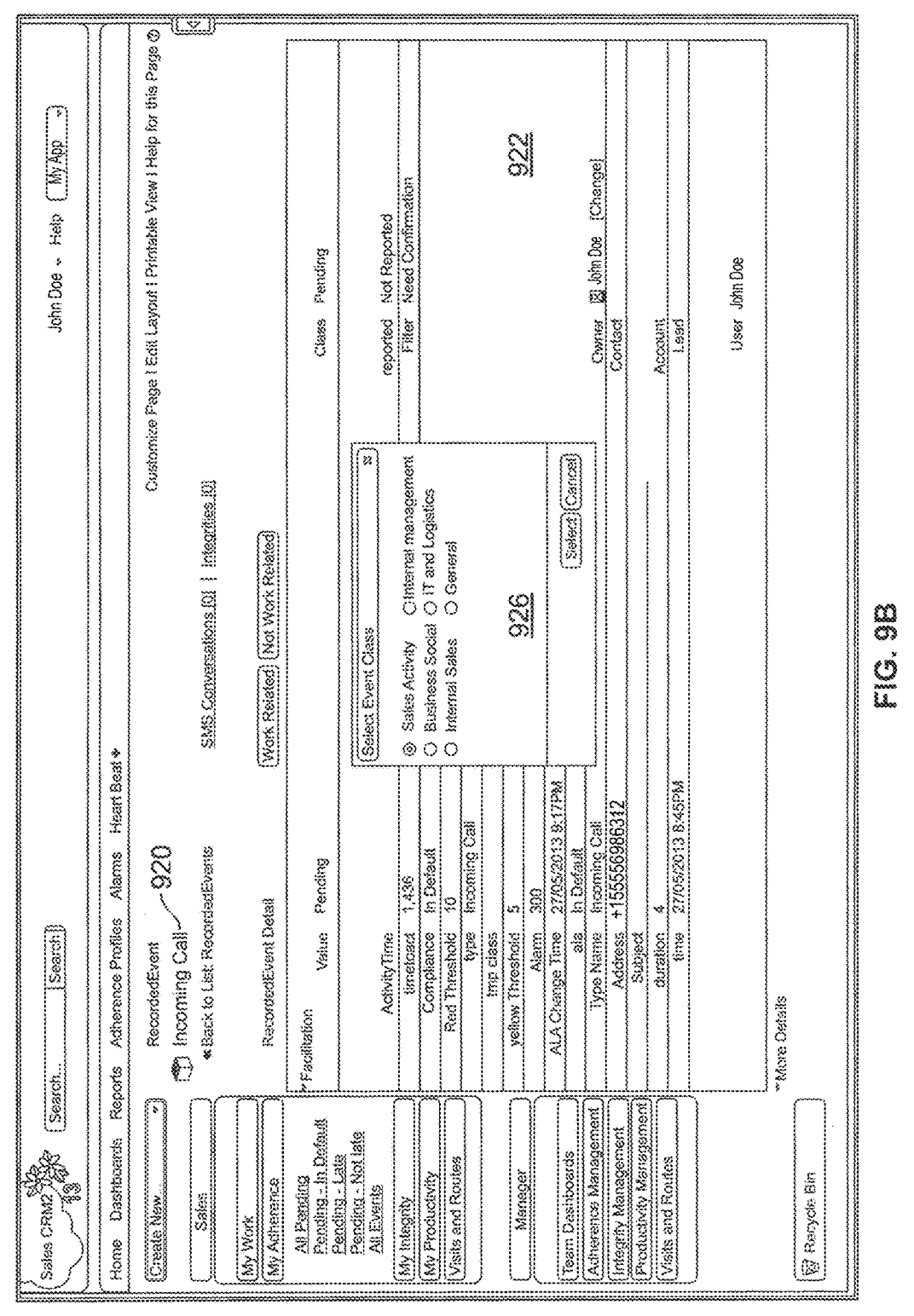
Figure 9C:
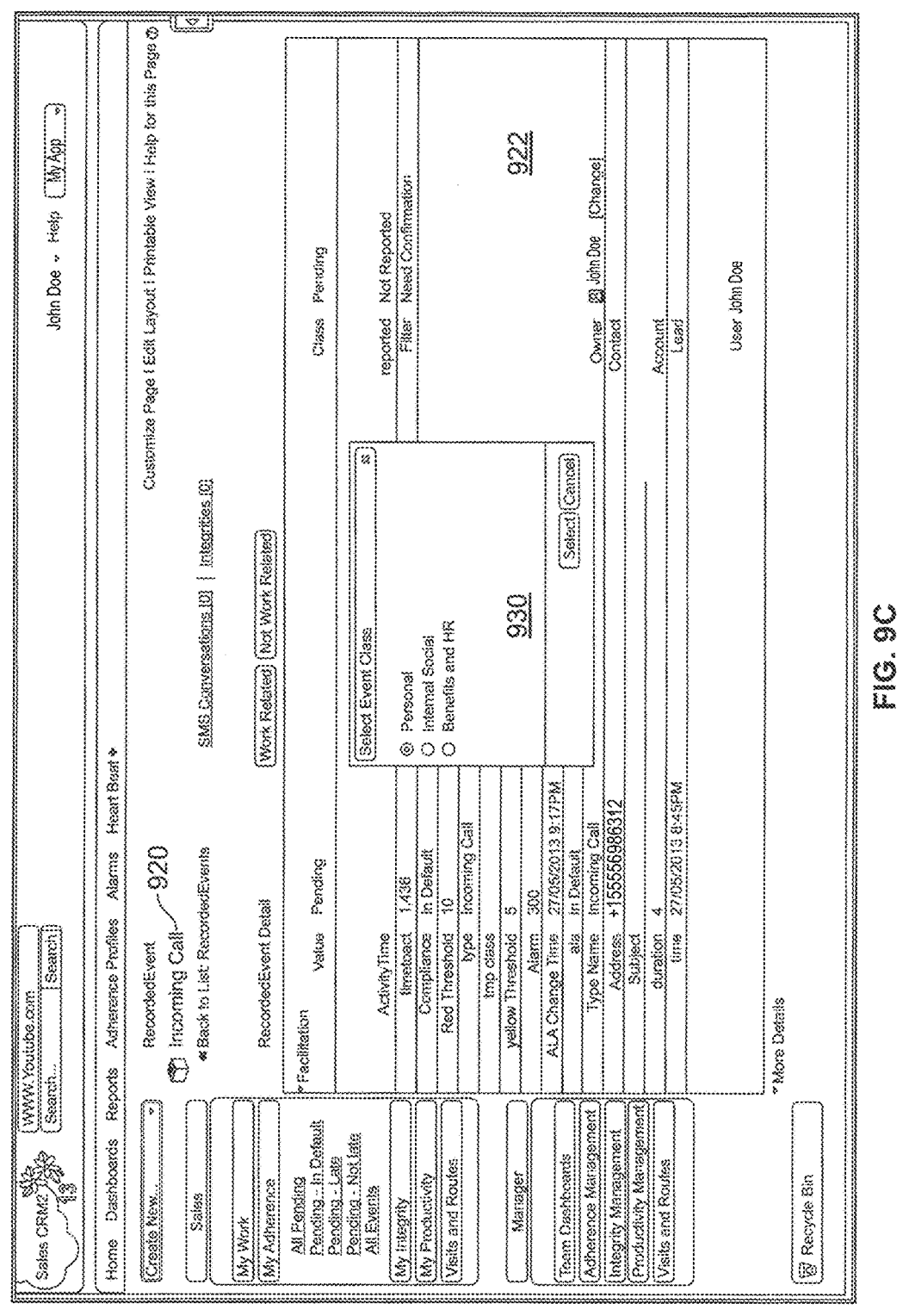

FIGS. 9A, 9B and 9C are illustrations of another embodiment of a classification process. The user GUI 902 displays a set of event data 914 including a selected and highlighted incoming call 916. A sidebar 904 is provided and includes a sales menu 908 and manager menu 910. After the incoming call 920 event data 916 is selected in FIG. 9B, a detailed display 922 of the event data information is provided. Detailed event data 924 includes call details and compliance status. A classification selection menu 926 is also displayed to prompt a user to classify the incoming call. FIG. 9C is similar to FIG. 9B and provides a display 922 with a classification selection menu 930 including different categories than menu 926.

FIGS. 10A and 10B are illustrations of yet another embodiment of a classification process operating on a mobile device. Event data 1002 includes information such as event type, time and a user input explanation regarding the event. Event data 1006 displays geolocation event data where user input has not been entered. Selections 1004 are displayed where a user classifies the event as work related and more specifically, as a sales event. Selections 1008 illustrates a not work related classification for a personal event.

In order to provide purely data-driven, actionable business insights regarding Sales Productivity and Sales Forecasting as well as Technology Adoption and Adherence, some implementations herein may aggregate and/or cross-references data streams and sources such as Presence Management Systems/"Multiple Points of Presence" ("MPOP") data, mobile phones, local PBXs (whether circuit or packet-switched/Voice over IP/"VoIP"), VoIP phone services, computing devices such as desktop computers, laptop computers, smart phones, tablets, servers, databases, networks, network components, etc., Geolocation (GPS) data, Sales Force Management/Sales Force Automation SFA systems, CRM system data, electronic calendar data and/or credit card transaction data, among other inputs.

Certain implementations herein may be broken down into and/or involve one or more of three key aspects (each of which address the core issues of adoption, data integrity and productivity. The first is alarms (and associated alarm notification mechanisms). The second is reports. The third is extrapolated insights, which includes but is not limited to pattern matching and modeling.

Implementations herein may leverage the data streams noted above and cross reference them to identify discrepancies between factual, mined data versus data entered by staff; and they may generate alarms when lead generation and sales processes are not followed. Such event processing may be (i) used to generate alarms; (ii) available in historical reports, and; (iii) used to provide extrapolated insights regarding individual productivity, group productivity and productivity modeling.

The innovations contained herein include user adoption facilitation and enforcement mechanisms that provide customizable, automated alarm reminders to users that escalate with the passage of time, ultimately triggering a different alarm for the salespersons' manager once the lack of compliance reaches a preset, customizable threshold. This alarm can be displayed in the user interface or sent by email, SMS text message and other methods.

Certain systems and methods herein also include productivity oversight, data quality and/or user adoption monitoring and enforcement mechanisms. Here, for example, implementations may include alarms when discrepancies between relevant data streams and self-reported data are identified so that managers can be alerted to "Integrity Incidents" wherein salespeople may be unintentionally misleading themselves or intentionally misleading others. These discrepancies may be event-specific, such as the length of site-visits and other meetings or the duration or quantity of phone calls or emails. They can also identify leads that have not in fact been pursued in accordance with prescribed sales methodologies, if at all. Integrity can also be managed from the perspective of absences from work (for both office and home-based employees) in that such absences can be tracked via geolocation and cross referenced with electronic calendar and other systems to identify cases where absences have not been listed as vacation or personal days. Also, the integrity of mileage expense reports and expensed client dinners are analyzed (for example, were they actually there on the day listed on the receipt?) which are now subject to verification on an automated basis. Since employees always have the ability to turn off geolocation tracking on their mobile devices (and they can also turn off CDR [Call Detail Record] tracking of telephone calls on their mobile phones via our mobile application for jurisdictions where this may be legally mandated), the system will detect that such tracking has been disabled, check the relevant electronic calendar to determine whether the employee has taken personal time or is travelling by air, and if appropriate, will alarm managers (in software dashboard notifications and/or email and/or SMS), and in report form, that user tracking has been disabled. (These alarms may result in follow-on investigation if warranted). If tracking is done via the carrier the system will nevertheless track when location services or CDRs are disabled and enabled for purpose of data filtering within the system. Managers can also set time-interval thresholds for disabled tracking notifications, to ensure that moments of signal loss (such as in elevators or parking garages) do not generate unnecessary notifications. Productivity alarms include manager and user notification when activities fall below a defined threshold. In the case of Sales Force Management and Sales Force Automation systems, these productivity alarms can be configured to monitor and alarm productivity deviations from prescribed policy in all stages of the sales process, which can be defined on a custom basis or by default include but are not limited to: new opportunities, initial communications, the fact-finding phase, the solution development phase, the solution proposal phase, the negotiation phase, the purchase order phase and account maintenance phase. If productivity as defined by the manager in terms of sales related activities tracked by the system (as described herein) do not meet the defined threshold for a given phase in the sales process, then the manager may also receive alarm notification in the form described above. Further, productivity alarms may also be defined in the context of overall time allocation tracked by the system (as described herein), such that neglected activities will also trigger alarms in the form described above.

In addition to such alarms, sales managers also have access to detailed compliance dashboards and displays and detailed reports including but not limited to user adoption, productivity, sales process adherence and user integrity. Additional details on these processes are included below.

Systems and methods herein may include user adoption monitoring and enforcement mechanisms such as implementations that may include reports and alerts that flag non-compliance with policies regarding timely data entry following activities such as live meetings (via geolocation and electronic calendar and/or SFA information), phone calls (mobile or PBX—including packet-switched voice over IP "VoIP"), SMS exchanges, email exchanges, faxes sent or received and/or chat sessions. These monitoring and enforcement mechanisms may also be applied to timely data entry regarding meeting cancellations, the time-lag between events requiring data entry and the follow-up data entry. Failure to enter data into Sales Force Automation and other systems can be followed up by automated warnings and Manager alerts. More detail regarding adoption enforcement and facilitation this as well as notification and other configuration options are set forth elsewhere herein.

Systems and methods herein include extrapolated insights regarding the quality of leads in the pipeline at each stage of the sales process. For example, by correlating the number and length of live meetings (via geolocation), phone calls, emails and chat sessions with a dynamically-updated, data-driven model of sales cycle assumptions (which are dynamically updated with real-world data on successful sales processes), conclusions may be drawn about the likelihood of a successful sales outcome for a prospect in a salesperson's sales pipeline. Pipeline verification analysis advises when the amount of communication to date relative to the success model conflicts with salesperson optimism—to invite further exploration by sales managers.

Systems and methods herein include time allocation analysis of individuals and groups analyzed in the context of dynamic success modeling. Managers and salespeople themselves can view their own productivity reports to gain insight on their time allocation by activity type, account value, qualified versus unqualified leads, sales funnel stage (including: prospecting, new opportunities, initial communications, fact finding, solution development, solution proposal, solution evaluation, negotiation, purchase order, etc.), time allocation on sales versus non sales (internal) activities, as well as the speed and quality of their follow-up. Allowing employees to see this productivity-related information allows them to both challenge their subjective perceptions to self-assess their efforts and gain insight on what adjustments can be made to improve performance. To this end, implementations may provide salespeople the opportunity to contrast and compare their time allocation to that of another salesperson and/or a composite of the top X % of salespeople and/or to the team in general. Over time, productivity modeling can enable salespeople to process how changes in their own productive behaviors can impact on their sales performance. For the manager, implementations can enable productivity to become a dashboard metric with associated alarms and configurable reports. The modeling component provides managers with valuable insights on where productive efforts should be focused in the context of specific product lines while also providing the business insight required for mentoring and assessing sales staff. Implementations of productivity analysis can also provide insight for more effective sales territory management by enabling managers to distinguish between 'order takers' who make little effort to obtain new business and salespeople who make heroic efforts to meet their sales quota. This distinction can provide meaningful insight on when sales territories should be split and arguably provides a superior metric to the most common practice of splitting sales territories when they reach sales quota targets.

Systems and methods herein include cross-referencing of individual and group time-allocation analysis with a dynamically-updated, data-driven success model of sales process effectiveness to identify time allocation inefficiencies. This success model may be derived from the analysis of successful sales events and includes an analysis of the number of communications with the prospects and their duration, including phone calls, chat sessions and emails, as well as the number and duration of live meetings, expensed business meals (business lunches/dinners), the number and duration of communications following significant milestones in the sales process (such as the response to a Request for Proposal), as well as the duration of time elapsed between communications.

Systems and methods here include time allocation analysis to monitor time spent on sales activities relative to the size of the initial sales opportunity and/or the size of the potential opportunity in the future; (with data related to time spent derived by analyzing the number and length of live meetings, phone calls, emails and chat sessions as well as internal communications related to sales opportunities). Implementations with time allocation analysis features may also provide actionable insight to managers regarding excessive personal communication by staff during business hours. Embodiments including time allocation analysis can also provide actionable insight on time spent on internal activities versus customer-facing revenue-producing activities— to draw attention to time management issues as well as staffing shortages (for example in product managers, sales engineers, etc.) that are diverting salespeople from a singular focus on revenue production.

Systems and methods herein may be configured for identification of neglected opportunities by cross-referencing prospect inquiries and lead lists with actual follow-up by sales staff across all communications channels: phone calls, emails, fax, chats and live meetings.

Systems and methods include integrity monitoring and enforcement mechanisms. Here, for example, implementations may include cross referencing of data entries with live meetings (via geolocation), phone calls (which in all cases herein include mobile phone calls or PBX phone calls— including packet-switched Voice over IP ["VoIP"] phone calls), faxes, email exchanges and chat session/SMS analysis to advise management of potentially inaccurate or wrong information contained in user data entries. Implementations can also include cross referencing data entries with live meetings (via geolocation), phone calls (mobile or PBX including packet-switched voice over IP "VoIP"), faxes, email exchanges and chat session/SMS analysis to advise management of potentially inappropriate communication with competitors. In addition, implementations can include geolocation tracking analysis cross-referenced with mileage expense report submissions to determine the true level of reimbursement that is warranted. Implementations may also include geolocation tracking analysis to track inappropriate absences from work (long lunches, personal time not entered as 'personal days', too much time spent in offices of people with whom the employee has no professional interaction, too many outdoor breaks, etc.). Implementations can also include the ability to detect and identify an absence of any work-related activity: such as live meetings (via geolocation), internal or customer phone calls, faxes, email exchanges or chat sessions; in order to identify employees that may be intentionally slowing down sales to avoid a territory split or who are simply derelict in the professional responsibilities.

Systems and methods herein include various features that provide value-add for purposes of employee adoption of SFA systems. Among other things, implementations herein provide for increase in adoption by reducing data entry requirements. Further, adoption is also increase by alerting managers regarding non-compliance. The fact that non-compliance itself can now be tracked will in and of itself impact on user adoption process adherence. According to some systems and methods, alarms are provided when communications or meetings are not followed up with notes in the CRM system, and some implementations utilize various colors and/or changes in color levels as time elapsed. Reports may also be generated including information as to how long the person waited before entering the data, as time lag correlates inversely with accuracy. Alarms are also provided for missing data entries. Here, for example, alerts may be issued to managers regarding events such as calls, chats and meetings not entered into SFA.

Systems and methods herein include various features that provide value-add with respect to productivity, such as via various productivity alarms. In some implementations, reports and/or alarms may be generated when discrepancies arise between hard data and employee data entries. Here, for example, such reports and/or alarms may be generated when discrepancies regarding time spent on opportunities are detected, when prospects/leads have not actually been called, and/or when differences between actual versus reported time spent prospecting to fill the sales funnel are noted. Reports and alarms may also be generated for questionable data entries. Here, for example, such indicators may flag accounts where the amount of communication to date seems to conflict with salesperson optimism. Additionally, these contrasts may be further extrapolated, such as by generating data-driven conclusions with sales force data-entry projections. Here, for example, sales pipeline verification analysis can include how many calls, length of calls, number of visits, length of site visits, etc. Reports and alarms may also be generated to help management become aware of inappropriate communication with or visits to competitors or headhunters, and implementations herein may detect such events regardless of which email client is used. Alarms and warnings may also be generated for excessive personal communications during business hours. Additionally, reports and alarms may be generated to flag time actually spent in internal meetings vs revenue production.

Systems and methods herein include innovations that provide for high integrity and analytics, such as features offered by features of the big data analytics herein. Here, implementations may identify conflicts between personal data streams and self-reported data, and may present such information both as manager alarms and as data available in reports. For example, reports may include time spent on opportunities, leads not called, prospecting/cold calls not done, etc.

Systems and methods herein may also include or involve innovations associated with other integrity related alarms and reports. Implementations may include virtual punch clock features (e.g., via geolocation), offsite lunch duration tracking, mileage expense analysis (e.g., true miles travelled versus submitted mileage expense report), and/or absences not listed as vacation or personal days. Implementations may also involve features of personal communications analysis (e.g., personal calls, Internet data chat sessions, etc.), personal Web-surfing time analysis, and/or personal web usage analysis (e.g., personal versus business use). Further embodiments may include functionality related to headhunter call tracking (e.g., to identify at-risk employees), competitor call tracking (e.g., communications with competitors), and/or contact with other parties of concern. Integrity management features herein may also be configured to detect data indicating that an intentional sales process slowdown (usually because quota has been reached). Additionally, systems and methods may include features that track the integrity of entertainment expenses (e.g., to track expenses as well as location and time, etc). Here, for example, implementations may be configured with features monitoring geolocation and performing credit-card analysis, which help eliminate the issue of restaurant receipts submitted for different days than the actual restaurant visits (e.g., able to demonstrate that a business meal with a prospect may not have taken place, etc).

Systems and methods herein may also be configured to perform various organizational behavior barometrics and analytics. Here, for example, implementations may analyze aggregate communications traffic within organizations to flag when internal/external call traffic ratios suggest that employees are commiserating in an unusual traffic pattern, e.g., suggesting that there are company rumors that need to be addressed internally for productivity to be restored to standard levels.

Present systems and methods may also be configured for implementation via various deployment models. For example, the innovations herein may be offered both as a premises-based solution(s) for large enterprises and/or as hosted SaaS ("Software As A Service") solution(s) to empower companies of all sizes to leverage system-based pattern-detection in both their strategic and tactical decision-making, in all phases of the sales and sales-forecasting process. For those operating in the SaaS model, an anonymous comparative analysis opt-in program may allow workgroups to compare their performance and success models with other workgroups similarly tasked in similar organizations.

Systems and methods may also configured with features to innovatively process various data streams. For example, implementations may analyze a set of data streams which may be called Personal Event Data Streams ("PEDS") and a proprietary Data Stream Event Processor ("DSEP") to process and extrapolate insights regarding individual performance, productivity, potential fraud and adherence to company policies regarding software adoption. As part of this process, the aggregate data streams from multiple new and existing data streams may store the resulting "big data" in a dedicated event-stream repository (a dedicated set of database tables).

Personal Event Data Stream processing is achieved via algorithms that look at a variety of variables including (a) identifier(s), (b) regular hours of activities, (c) locations of users, such as those obtained via geolocation (e.g., via dedicated apps installed on company mobile devices), integration with premises, Wifi hotspot, IP address, RFID and Beacon systems, etc., (d) calls, including but not limited to mobile phone, IP phone, office phone, logs of phone provider, etc., (e) electronic conversations, including but not limited to chat, mail, Instant Message, etc., (f) presence status, (g) computers activity tracking, including but not limited to key loggers, tasks manager, etc., (h) electronic agenda, CRM, and Sales forces management type data, including but not limited to contacts, opportunities, accounts, leads, appointments, calls, etc., and (i) business credit card logs.

In systems and methods herein, users may enter their activities using different CRM, Sales Force Management ("SFM") or electronic calendar software. In addition, users may declare holidays or sick days on ERP and/or calendar software. Each of these is a data stream resource for the solution.

Implementations may be configured for use with additional systems or devices such that a company may deploy, manage systems and allocate professional devices to improve the efficiency of their employees. Such systems and devices include but are not limited to mobile phones, office PBX and/or IP phones, desktop and laptop computers, tablets and smartphones, presence management systems, email servers, GPS, and business credit cards.

Systems and methods herein may be configured to collect and process data from user devices and company software in order to generate user PEDS (Personal Event Data Streams) and store them in the database(s). Present implementations may also collect user's "declared activities" (information entered by the user) from relevant software (SFM, electronic calendars, ERP . . . ). Further, PEDS may be stored into Analytics database tables. Embodiments herein may extrapolate from PEDS (for example, true duration of all customer meetings in the sales process, number and duration of all phone calls, etc.—to identify, among other issues, questionable sales projections based on a dynamically updated model of the typical sales process for a given product or service. Such processing may also be used to identify fraudulent entries in the sales force management software. A Data Stream Event Processor ("DSEP") may also be utilized for performing these extrapolations. Further, reports and alarms may be derived or extrapolated from these PEDS. In some implementations, the DSEP may construct a "success model" by analyzing successful sales transactions in the pipeline as reflected in the Sales Force Automation system and cross-referencing them against the "big data" in the PEDS to create dynamically-updated PEDS success models. In other words, such processing may identify opportunities in the sales pipeline where there have been insufficient numbers of communications (in calls, emails, live meetings and site visits, etc.) to justify the optimism of the salesperson from a statistical correlation perspective.

In still other implementations, such as when companies opt-in to the "industry comparative analysis modeling" program, systems and methods herein may be configured to anonymously contrast individual (by role) and/or group performance data with counterparts at other companies of comparable size in comparable industries.

Figure 11A:
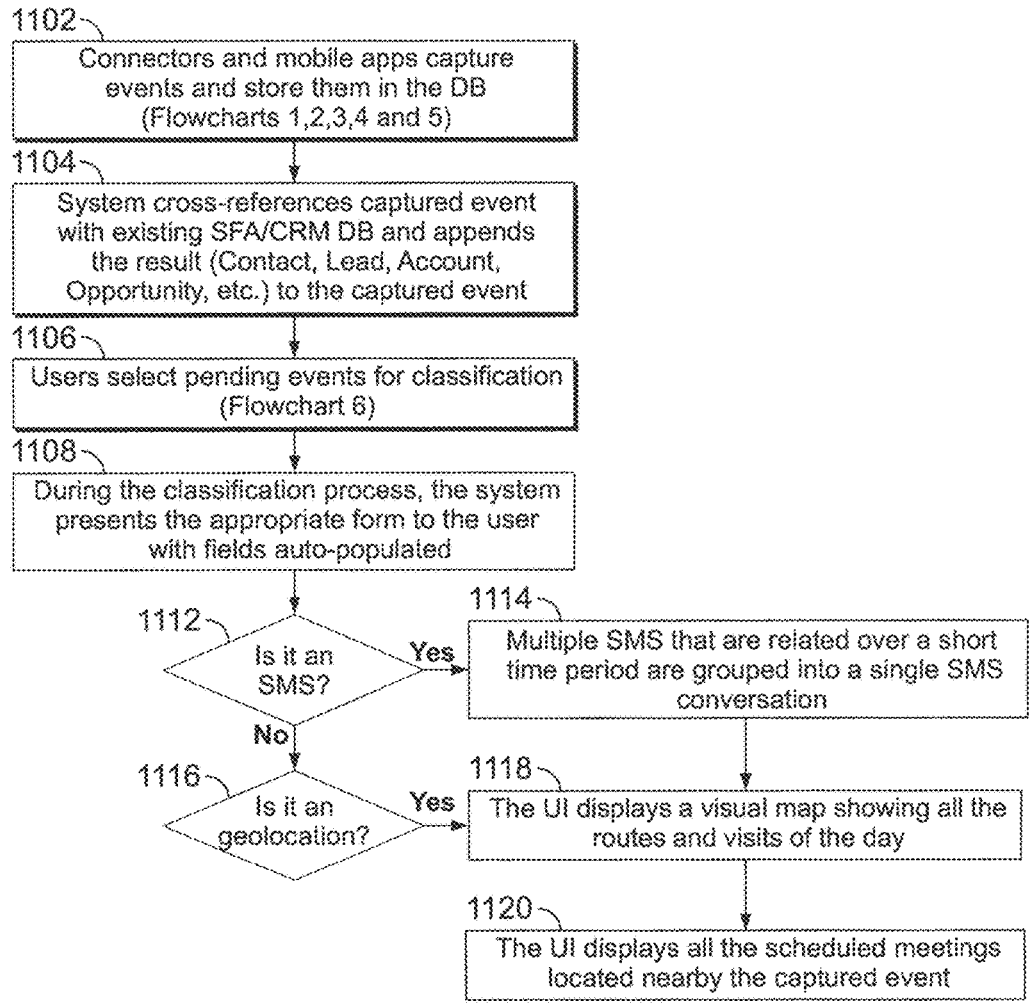

FIG. 11A is a flowchart illustrative of Adherence facilitation mechanism processing consistent with certain aspects related to the innovations herein. An illustration of facilitation mechanism process is shown in FIG. 11A. Events related to sales activity are captured through Connectors and/or mobile apps, and stored in the database, at 1102, as shown in FIGS. 2A, 2B, 3A, 3B, 4A, 4B, 5A, 5B, 5C, 6A, 6B and 6C. When an event is captured, the process cross-references it with existing SFA/CRM database in order to find additional information regarding the event. The results, (Contact, Lead, Account, Opportunity or any SFA/CRM entity), will be added to the captured event, at 1104. When the user selects the captured event to classify it, at 1106, following the process shown in FIG. 7, the process will be able to auto-populate the fields with the information contained in the captured event, at 1108, including the results from cross-referencing with SFA database. This will allow the user to save time and avoid human error. In the next optional steps, the process checks if the event is an SMS, at 1112, and if so performs a process of aggregation which purpose is to group all consecutive SMS with same recipients into a single SMS conversation, at 1114. SMS are subject of repeated messages sent back and forth that are all related into the same conversation and the aggregation process avoids the user to deal with a multitude of SMS to classify. The process further checks if it is a geolocation, at 1116, and if so, the UI will display a visual map showing all the routes and visits of the day, at 1118, allowing the user to easily recognize the meeting he needs to classify. The process will look in the scheduled events if matching meetings located nearby exist and list them next to the captured visits and routes, at 1120.

Figure 11B:
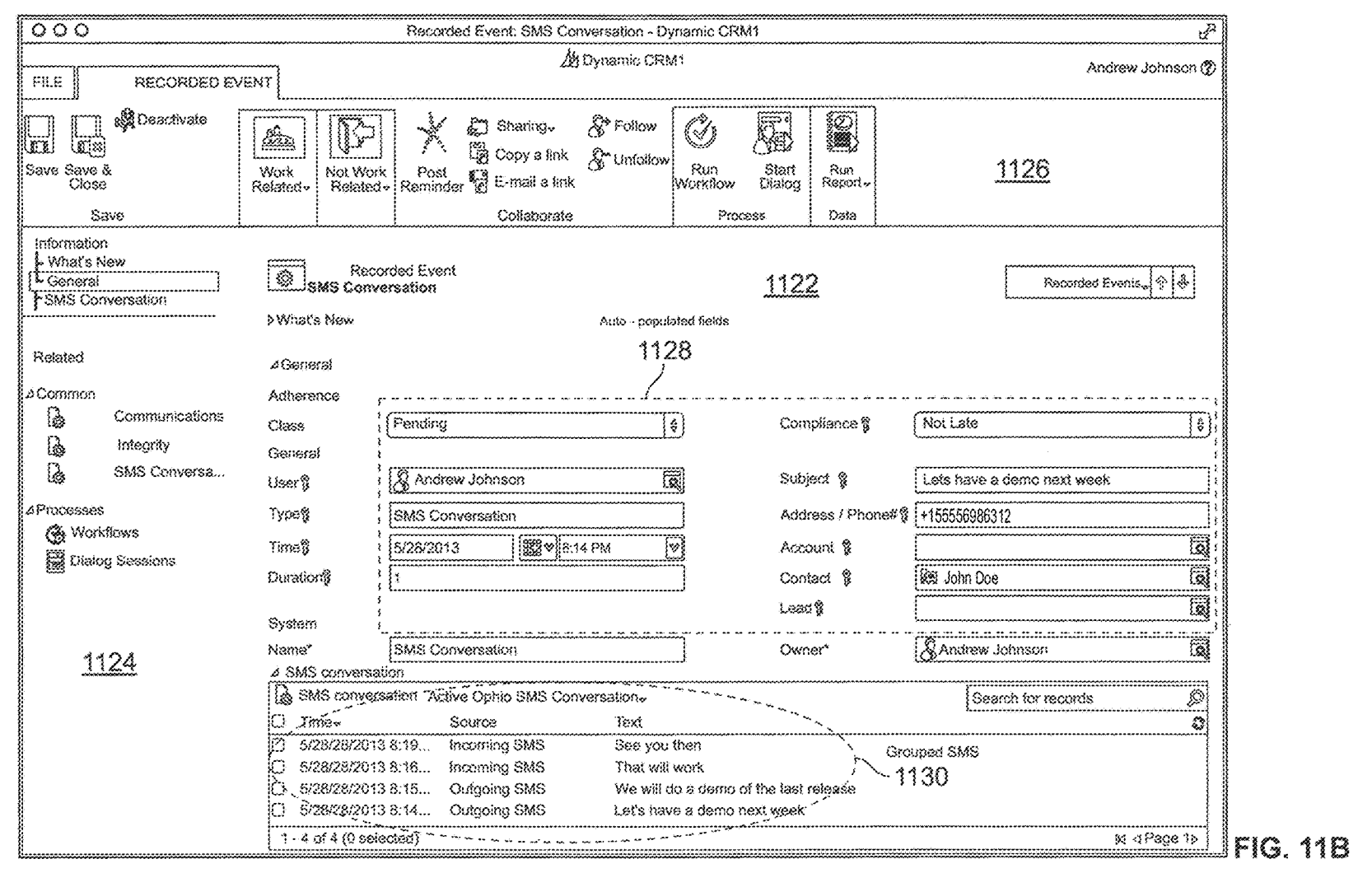
Figure 11C:
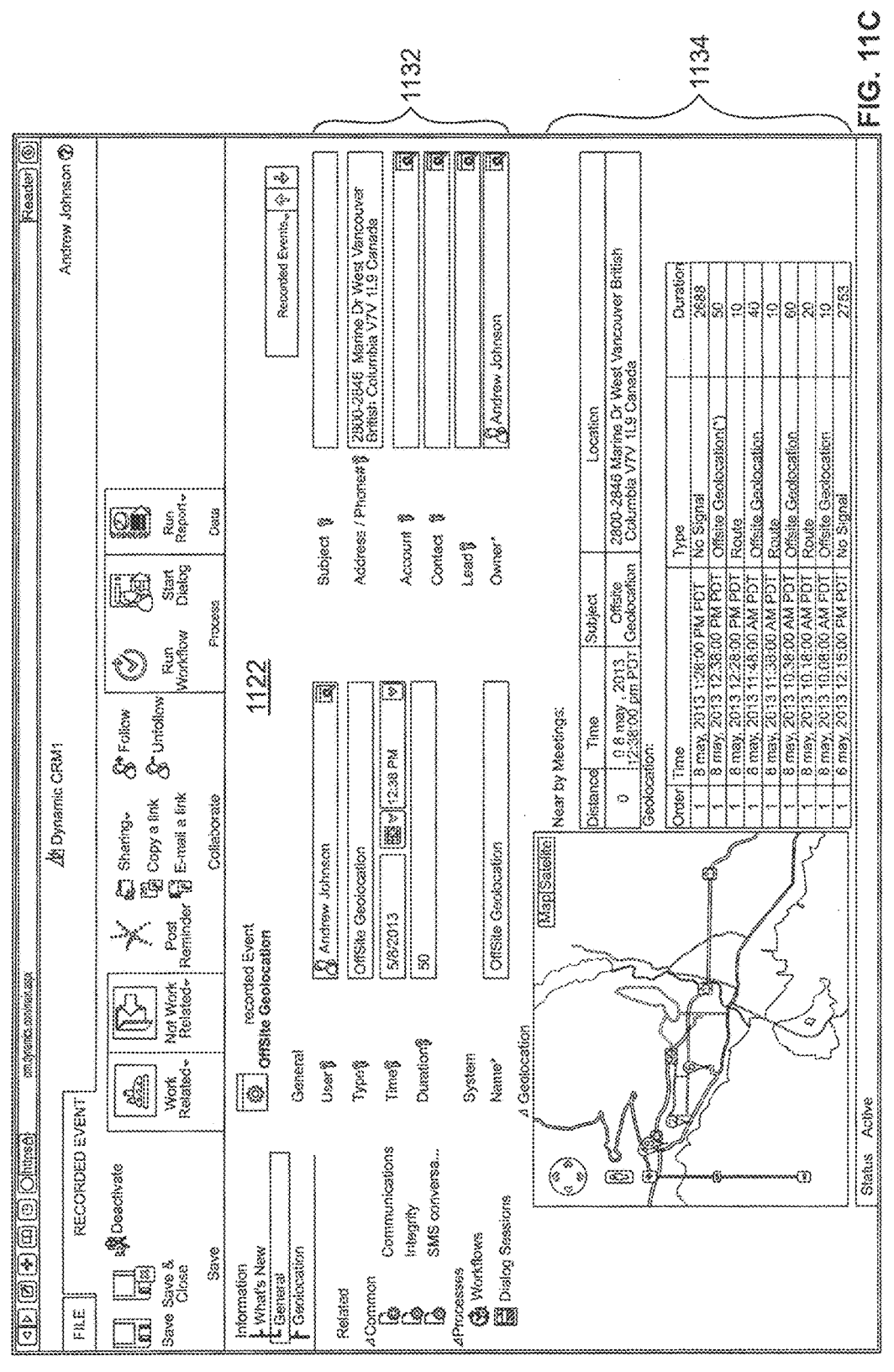

FIGS. 11B-11C are illustrative user interface showing exemplary facilitation mechanism processing features consistent with certain aspects related to the innovations herein. FIG. 11B shows the auto-populated feature, at 1128. The fields shown in 1128 have been populated with the information contained in the captured event, allowing the user to save time and avoiding human error. The SMS conversation is shown at 1130, where all the consecutive SMS displayed in the Active Ophio SMS conversation list. FIG. 11C shows the auto-populated fields for a geolocation, at 1132, and a visual map of routes and visits, at 1134, as well as the nearby scheduled meetings.

Figure 11D:
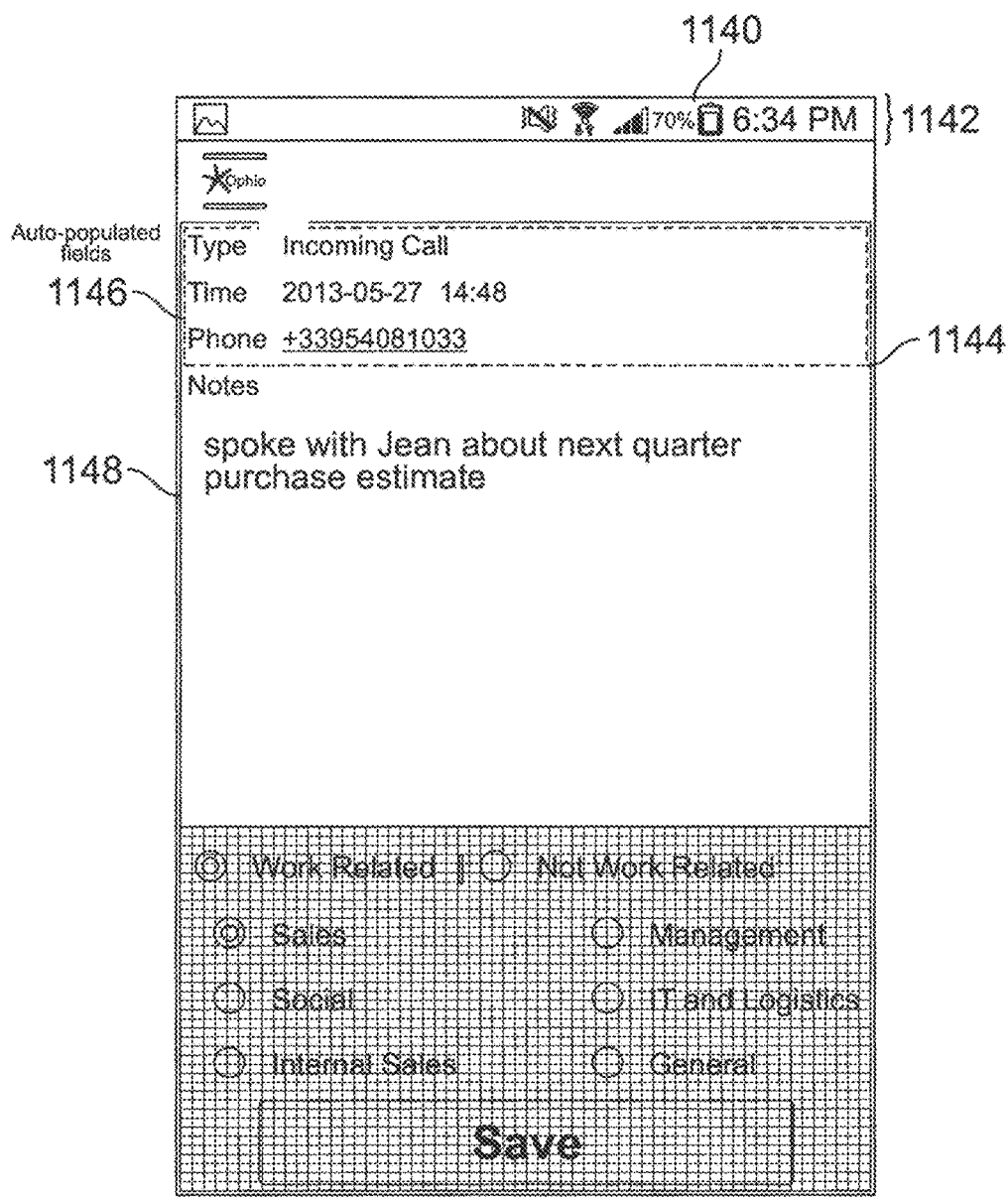

FIG. 11D is an illustrative user interface showing exemplary facilitation mechanism processing features consistent with certain aspects related to the innovations herein. FIG. D shows how facilitation is performed on a mobile application, at 1140. The auto-populated fields are shown at 1146. The user enters the note in an appropriate field at 1148.

Figure 12A:
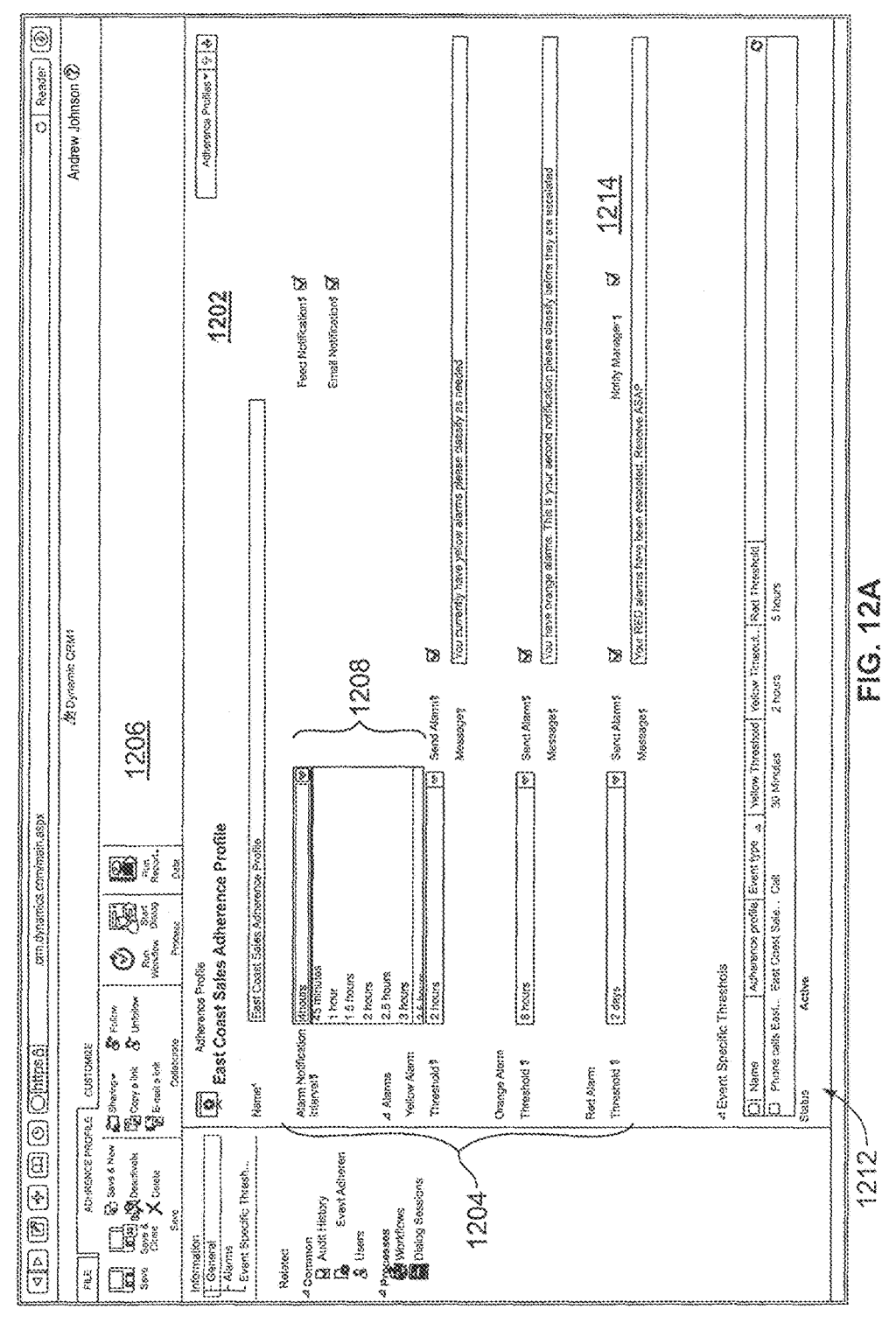

FIG. 12A is an illustrative user interfaces showing exemplary enforcement mechanisms processing. Referring to FIG. 12A, an exemplary embodiment of how enforcement mechanisms may be performed in the Microsoft Dynamics environment is shown. As set forth, herein, if a user has recorded events that require classification the user can be prompted to classify these events in a timely manner. Preconfigured adherence profiles may be utilized to configure Adherence alarms and notifications for users and Managers. For example, various adherence profiles may allow an administrator to specify: 1. The Alarm notification interval i.e. how often to send an alert to the user once an alarm has been triggered (1208); 2. The different levels of escalation, such as via colors, for example, Yellow, Orange and Red and their respective default thresholds (1204); 3. If a notification should be sent for a specific level of escalation (1210); 4. The means to use for notifications (Feeds or email) (1202); 5. The list of recipients for notifications (1214); and/or 6. individual time thresholds per event type that overwrite the default (1212). Administrators and/or management entities may create multiple Adherence profiles and assign different users to different profile for maximum flexibility.

Figure 12B:
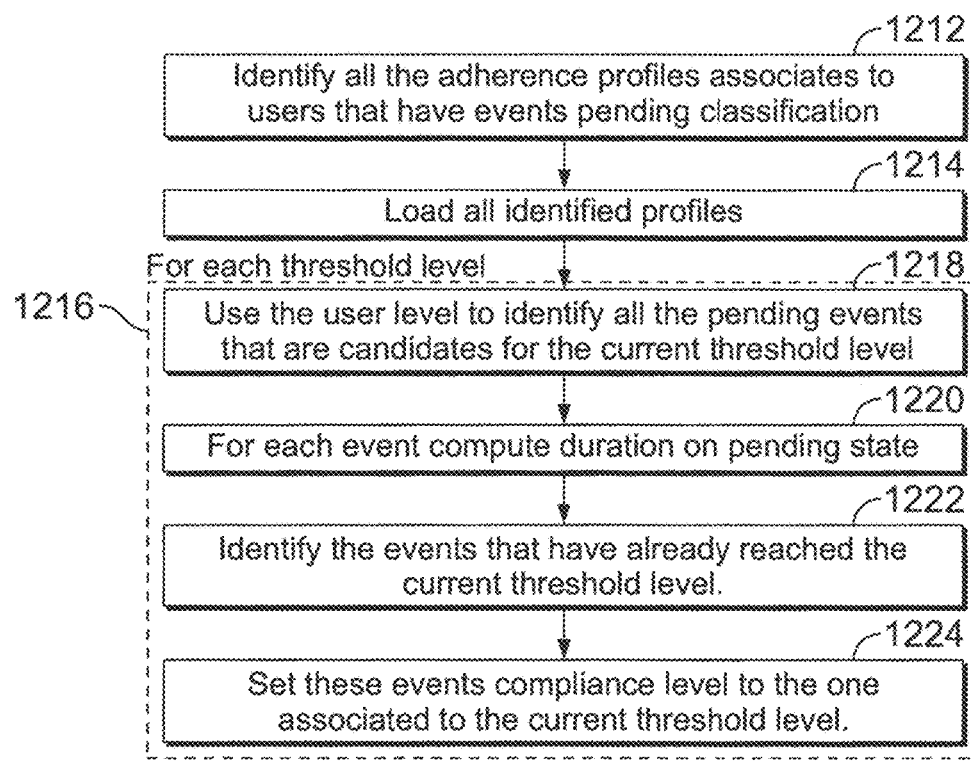
Figure 12C:
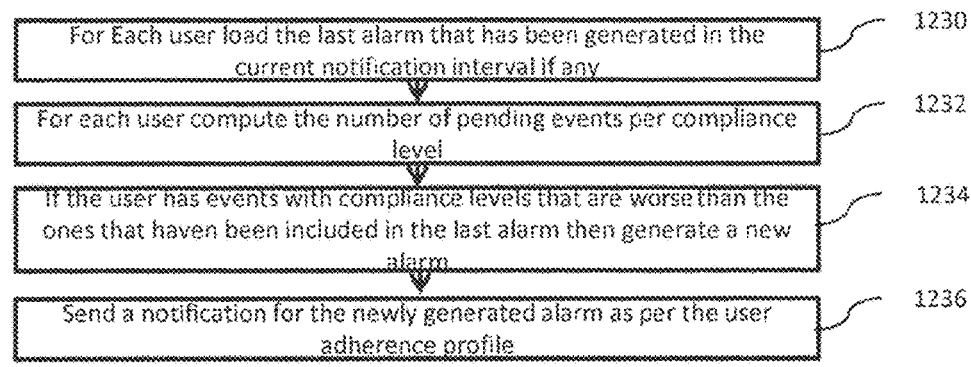

FIGS. 12B-12C are flowcharts of illustrative adherence enforcement processing consistent with certain aspects related to the innovations herein. Referring to FIG. 12B, an illustrative process of adherence enforcement is shown. In a few optional steps, the process identifies all the adherence profiles associated to the users that have events pending classification, at 1212. This will limit the number of profile to use in the following process. The process loads these profiles at 1214. A system administrator may define as many levels of escalation as needed. This process uses profiles to identify compliance levels for each event in pending state, at 1216. A pending event can move from a lower level of compliance to a higher level of compliance as defined by profile. The process uses the user profiles to identify all the pending events that are candidates to be set to the current threshold level, at 1218. Then, for each event, the process computes duration on the pending state, at 1220. The process identifies the events that have already reached the current threshold level, at 1222. Once these event are identified we set the compliance level to the one associated to the current threshold level 1224. Referring to FIG. 12C, an illustrative process to generate new alarms is shown. One aspect of this process is to control the number of generated alarms for each user. The user profile defines a time interval for generating alarm. The process will not generate an alarm with the same or lower level than the last sent alarm within the time interval. The process starts by loading the current alarms for all user candidates to receive new alarms 1230. Current alarms may be all alarms that are still with the time interval. For each user the process computes the number of pending events per compliance level 1232. If the user has events with compliance levels that are worse than the ones that have been included in the last alarm, then the process generates a new alarm, at 1234. The process will send a notification for the newly generated alarm as per the user adherence profile 1236. Eventually, his or her manager will get the same notification.

Figure 12D:
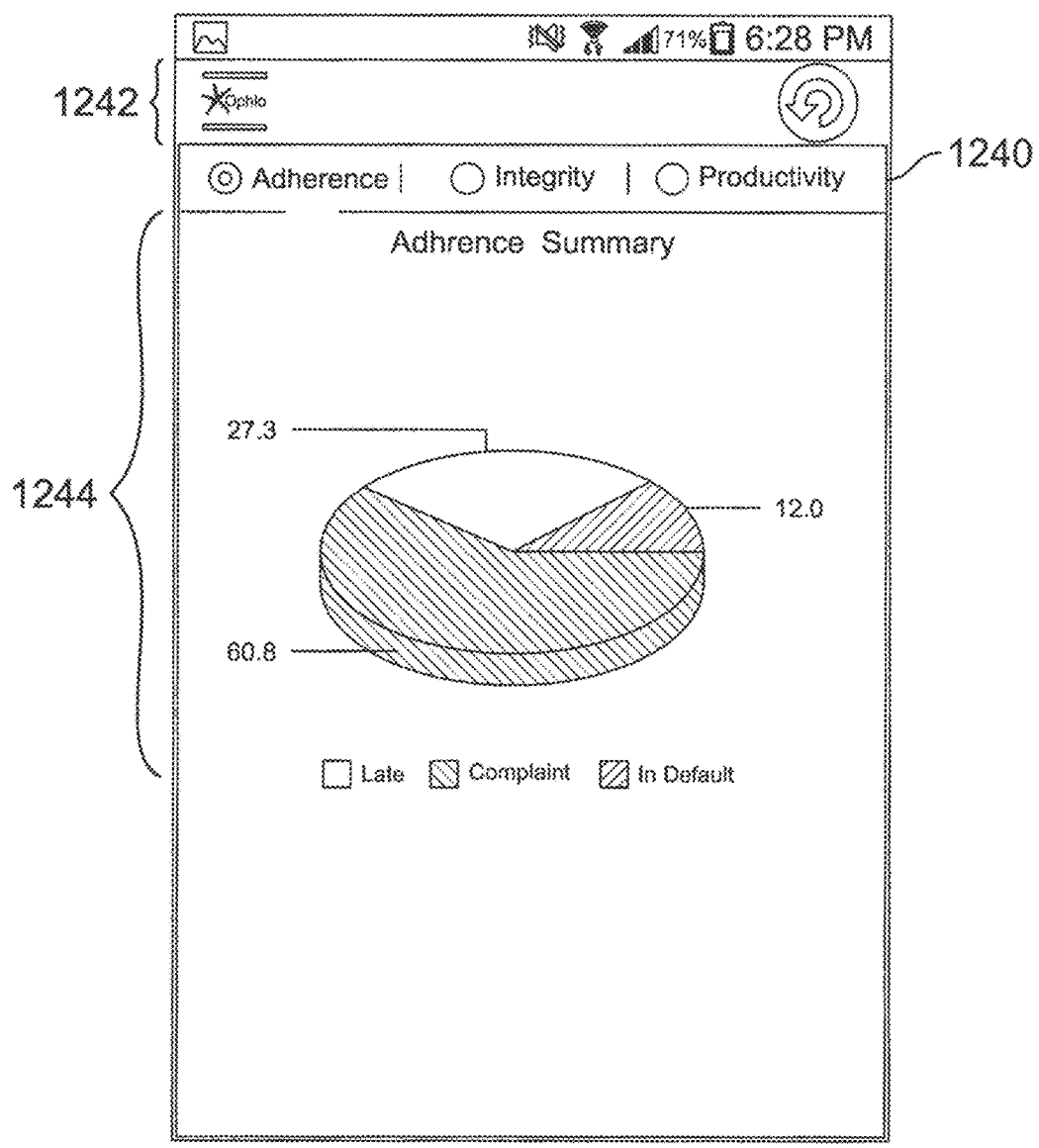
Figure 12E:
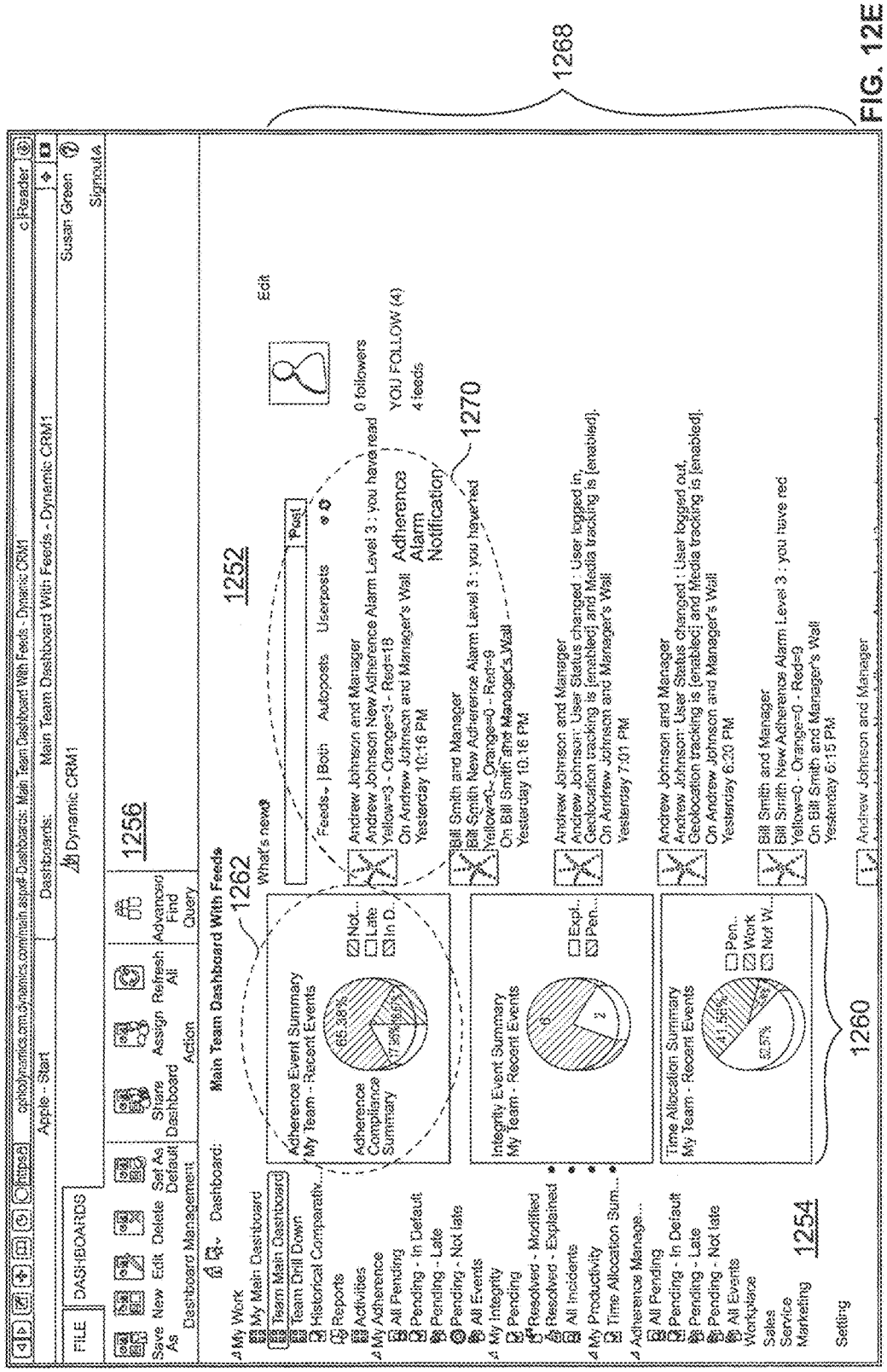

FIG. 12D is an illustrative user interface showing exemplary facilitation mechanism processing features consistent with certain aspects related to the innovations herein. FIG. 12D shows enforcement mechanism processing performed on the mobile app by showing a pie chart of the adherence level of the user, at 1244. The pie chart shows the percentage of each pending events per threshold level (in this case, Not late, Late and In default) giving a quick and straightforward summary of the user's compliance with the company's Adherence policy. FIG. 12E is an illustrative user interface showing exemplary facilitation mechanism processing features consistent with certain aspects related to the innovations herein. FIG. 12E shows how enforcement mechanism is performed on the desktop application within Microsoft Dynamics by showing a pie chart of the adherence level of the user, at 1262. The pie chart shows the percentage of each pending events per threshold level (in this case, Not late, Late and In Default) giving a quick and straightforward summary of the user's compliance with company's adherence policy. An example of enforcement notification is shown at 1270 where the user is being warned through the Feeds that he has reached level Alarm3 inviting him to take necessary action.

Figure 13A:
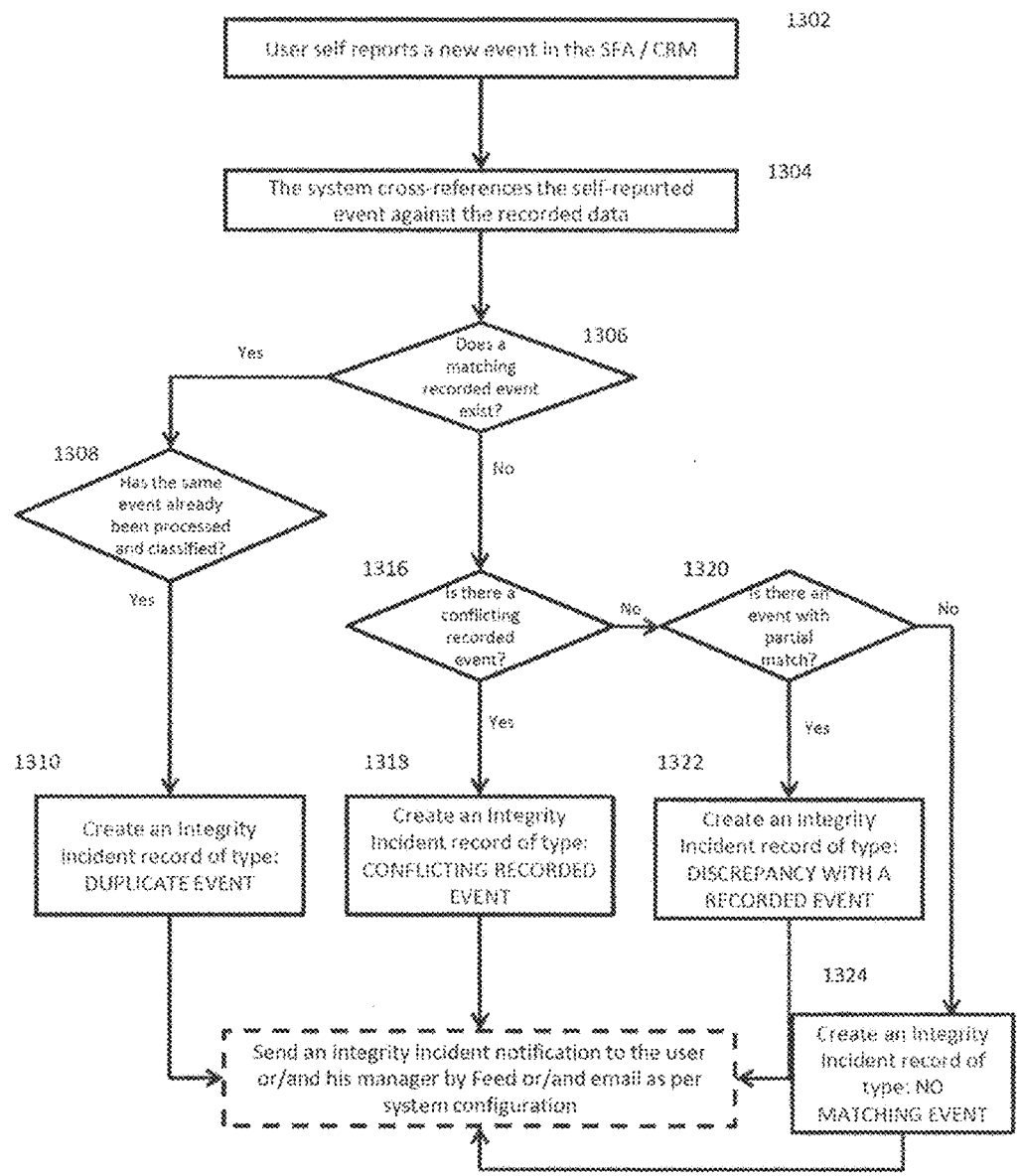

FIG. 13A is a flowchart illustrating an exemplary set of integrity incident identification mechanisms. At 1302, the integrity incident identification mechanism begins with a user self-reporting a new event in a software system that typically relies upon manual data entries, such as a CRM or sales force automation/salesforce management system. At 1304, the system then cross-references that self-reported data against the aggregated data derived by the methods and processes described in Step 1. At 1306, the system first determines whether a matching recorded event has already been created and added to the list of events that require manual processing of the data in accordance with step 2 herein. At 1308, if a matching recorded event exists in the aggregated data and has already been created and added to the list of events that require manual processing of the data in accordance with step 2 herein, the system then determines if manual processing and classification has already taken place or not. If no manual processing and classification has already taken place and the self-reported event matches a recorded event, then the self-reported event is compliant and no further action is warranted. At 1310, if (following 1308) manual processing and classification has already taken place then a "DUPLICATE EVENT" Integrity Incident is created and the user and/or his manager will be notified of the duplication by the method configured by the manager, which may include email and or SMS and/or a notification in the scrolling feed of the user and/or the manager. At 1316, if a matching recorded event does not exist in the aggregated data and has therefore not already been created and added to the list of events that require manual processing of the data in accordance with Step 2 herein, the system then determines whether a different conflicting event has been recorded in the aggregated data (derived by the methods and processes described in Step 1) that contradicts the self-reported data. (For example, a self-reported data entry of a call with a prospect between 9 am and 10 am would be contradicted by recorded event of a personal call that took place between 9:00 am and 9:45 am that same morning. Another theoretical example would be a self-reported event of a meeting with a prospect at their offices at the same time as the geolocation data places the employee at the baseball stadium). At 1318, if a contradicting event does exist, then a "CONFLICTING RECORDED EVENT" Integrity Incident is created and the user and/or his manager will be notified of that Integrity Incident by the method configured by the manager, which may include email and or SMS and/or a notification in the scrolling feed of the user and/or the manager. At 1320, if a matching recorded event does not exist in the aggregated data and has not already been created and added to the list of events that require manual processing of the data in accordance with step 2 herein, and the system determines that a different conflicting event has not been recorded in the aggregated data (derived by the methods and processes described in Step 1), then the system will determine whether a partial match exists. See 1322 for an example of a partial match. At 1322, if a partial match exists (for example, the data shows that a call took place with the specified party at the specified time, but the call duration was only 5 minutes and NOT the 50 minutes that the user manually entered into their system), then a "Discrepancy With A Recorded Event" Integrity Incident is created and the user and/or his manager will be notified of that Integrity Incident by the method configured by the manager, which may include email and or SMS and/or a notification in the scrolling feed of the user and/or the manager. At 1324, if a partial match does not exist, then a "NO MATCHING EVENT" Integrity Incident is created and the user and/or his manager will be notified of that Integrity Incident by the method configured by the manager, which may include email and or SMS and/or a notification in the scrolling feed of the user and/or the manager.

Figure 13B:
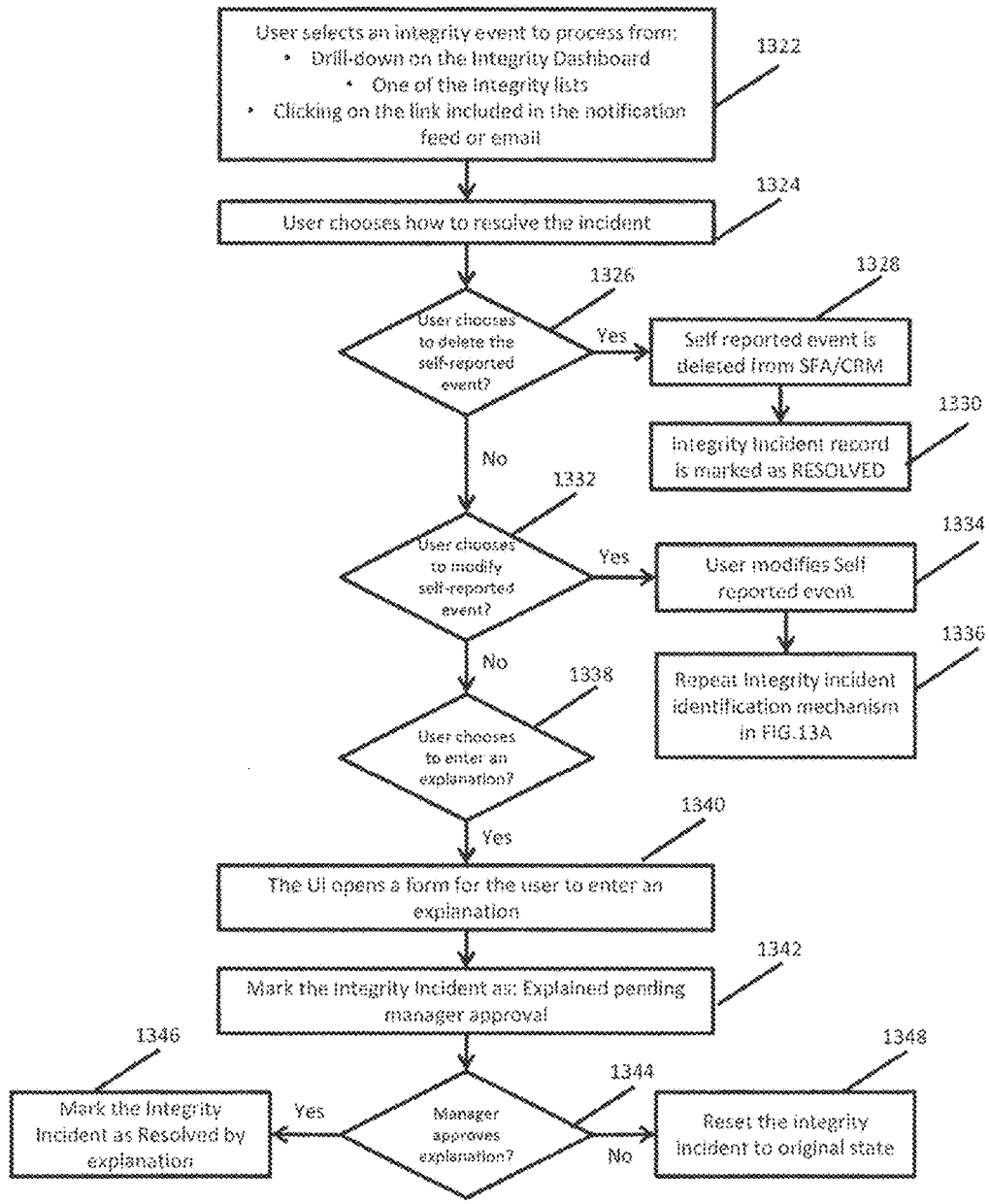
Figure 13C:
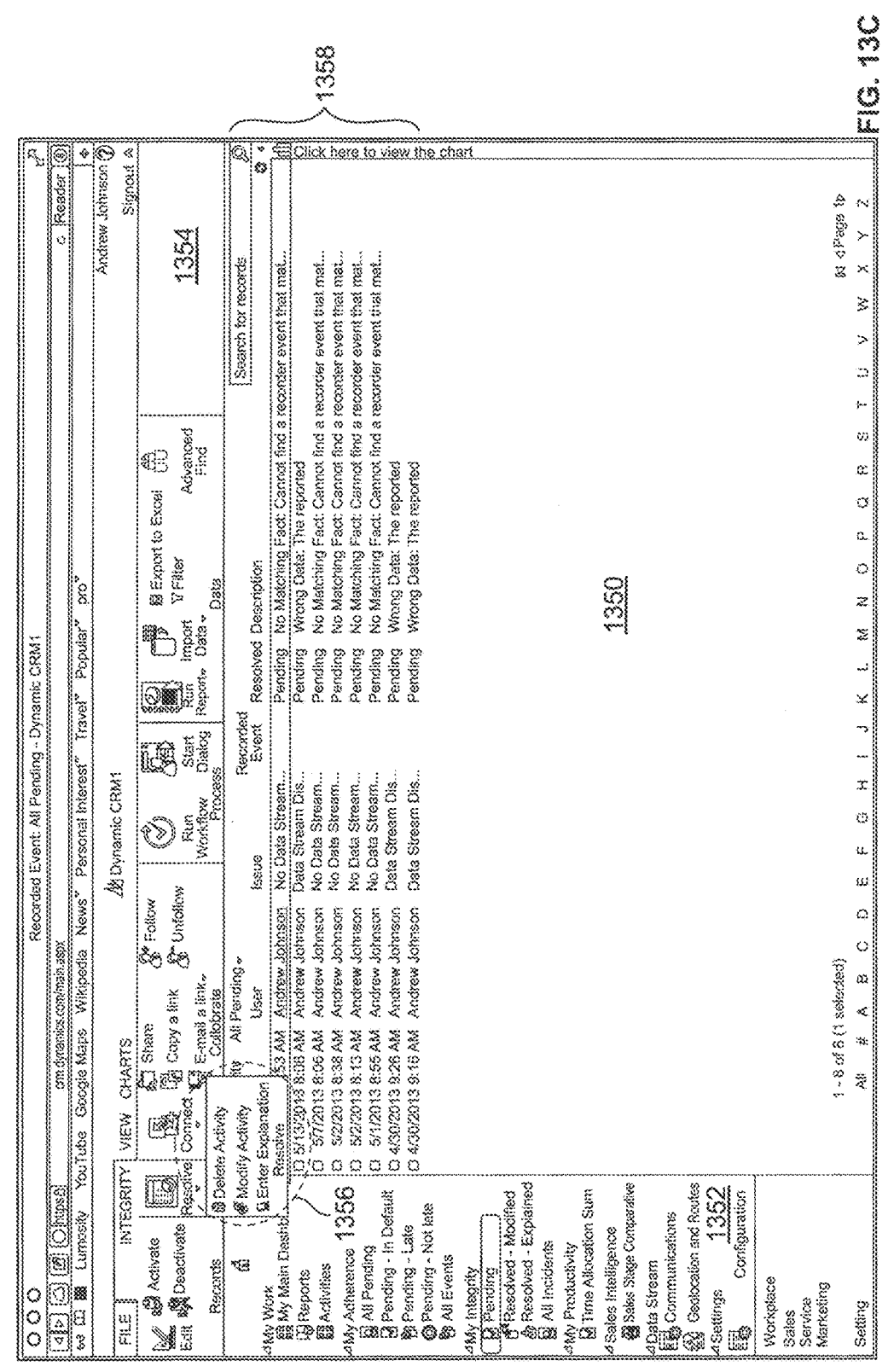
Figure 13D:
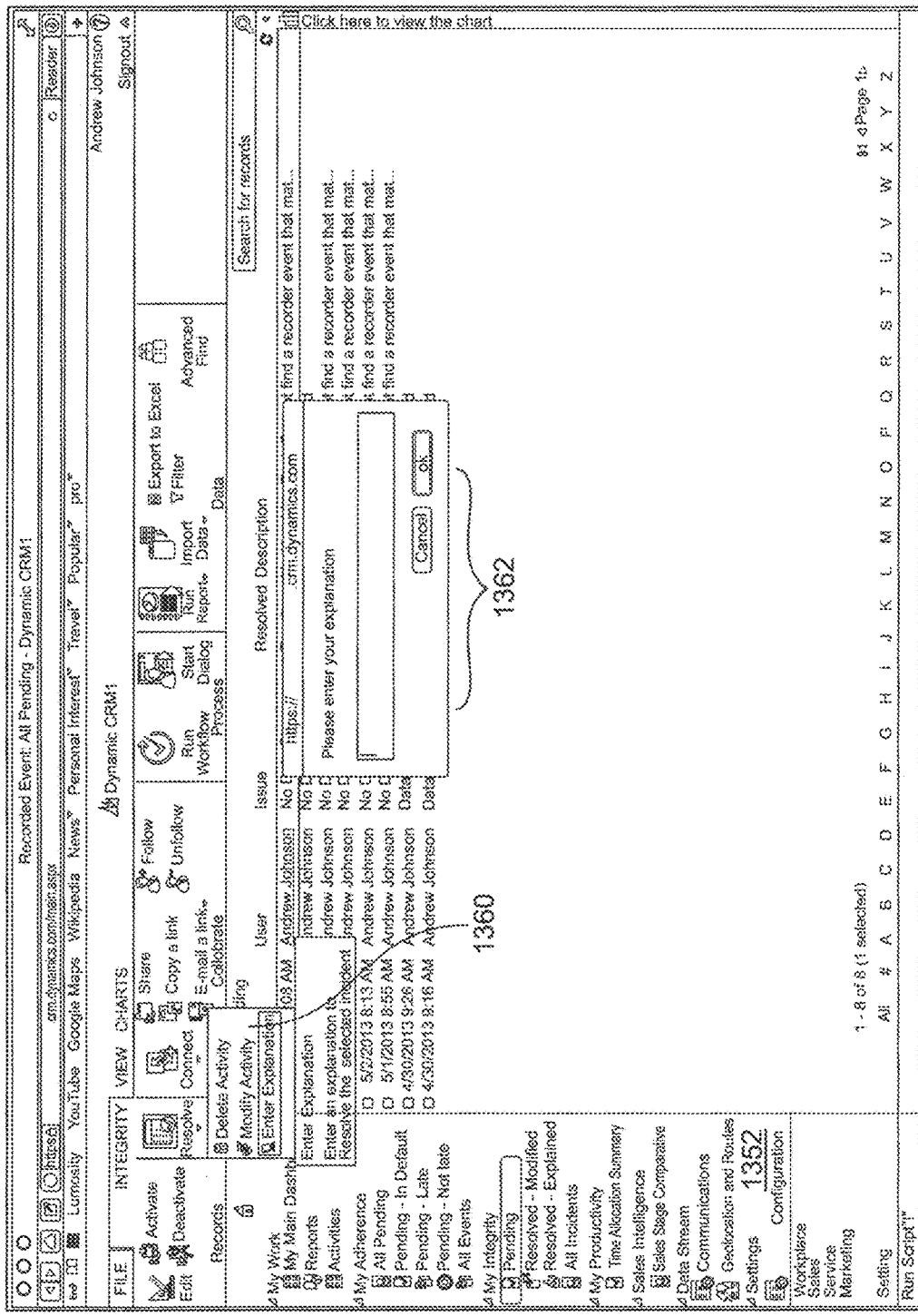
Figure 13G:
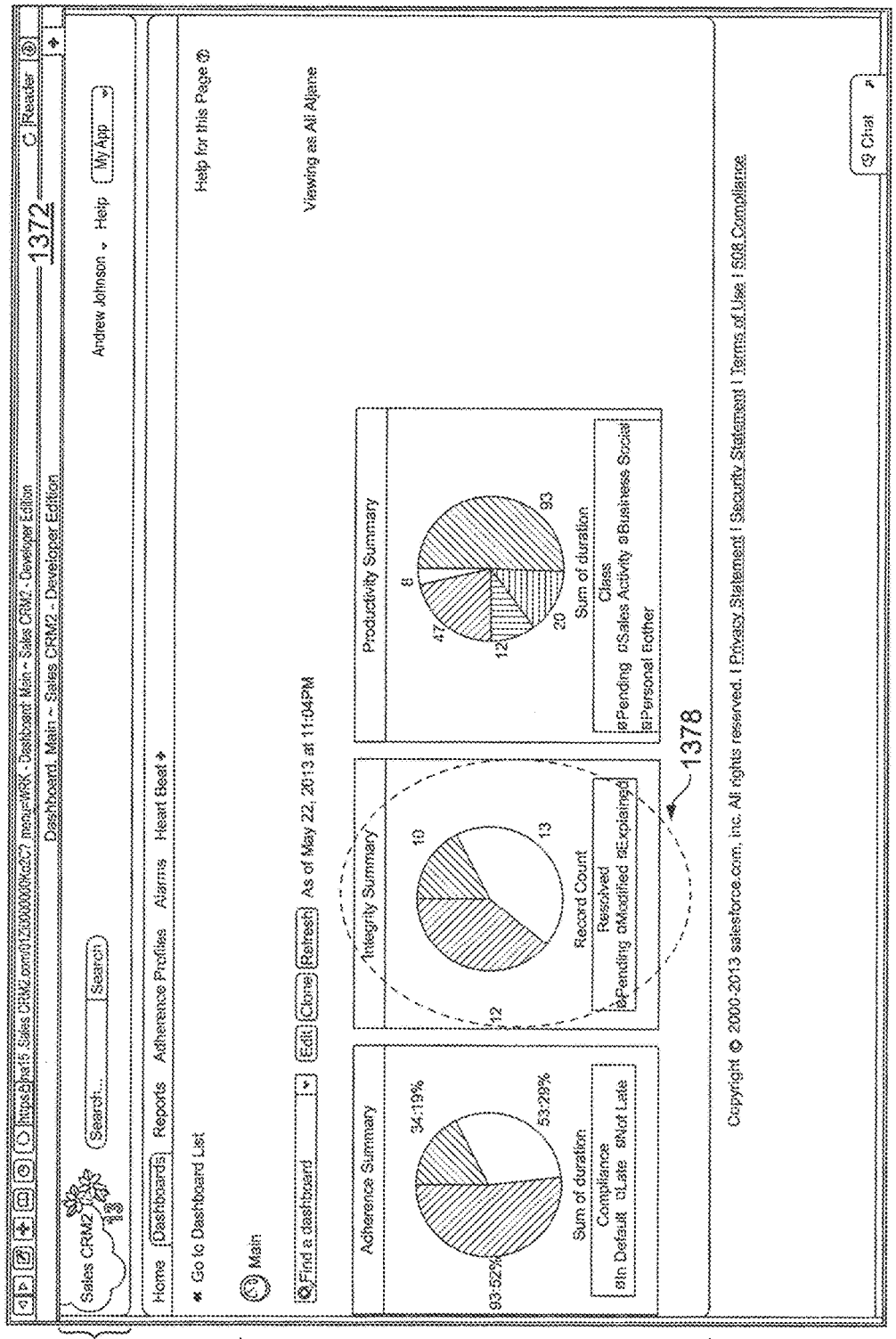
Figure 13H:
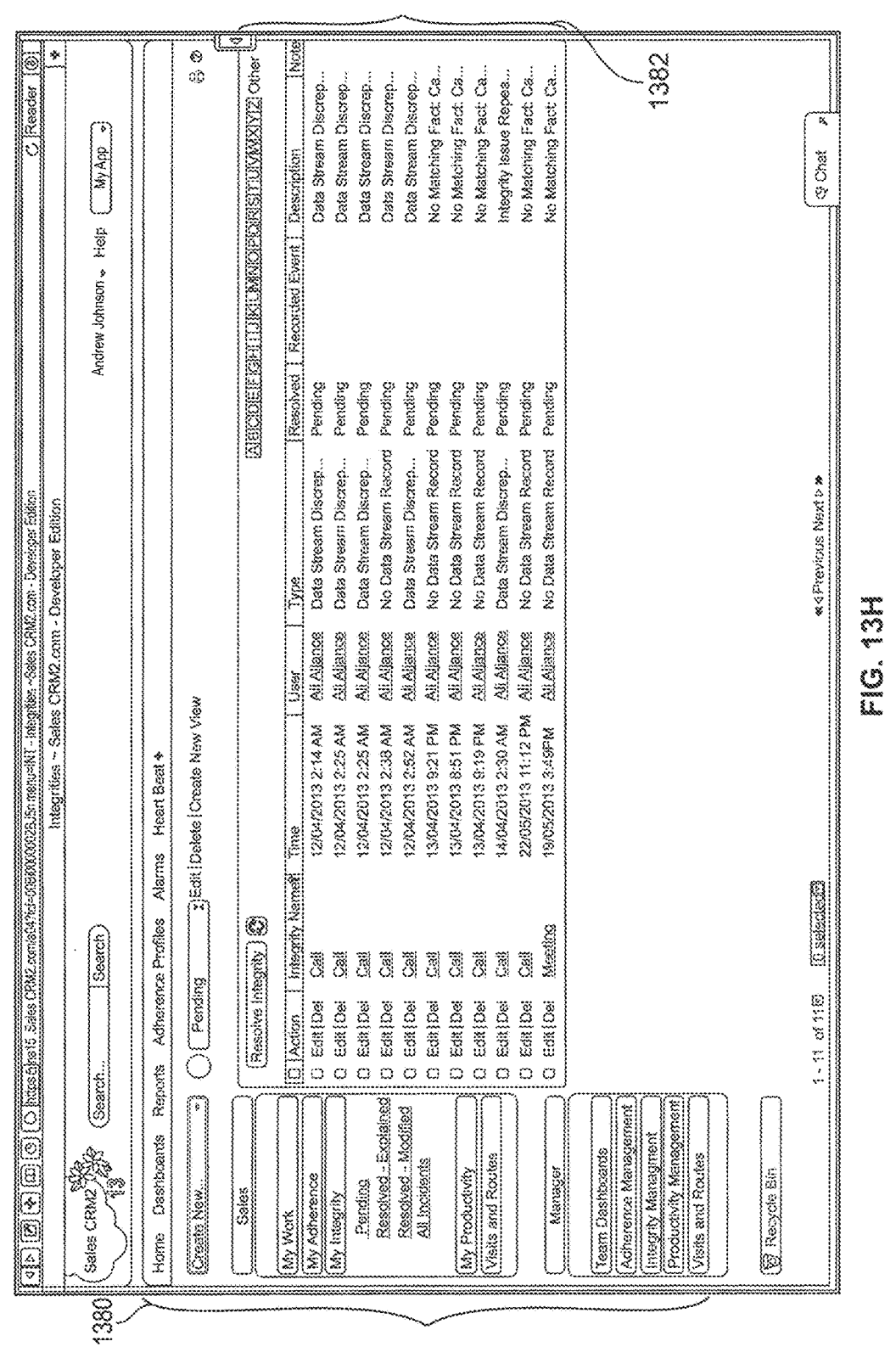

FIG. 13B is another flowchart illustrating an exemplary set of integrity incident resolution mechanisms. At 1322, the user selects and integrity event to process from their integrity—four or one of their integrity event lists or by clicking on a link included in the notification all the integrity event sent to them in their data feed or email or SMS text message. At 1326, the user has the option to delete the self-reported event that triggered the integrity incident. At 1328/1330, if the user chooses to delete the self-reported event that triggered the integrity incident, then that self-reported event is deleted and the integrity incident record is marked as "Resolved." At 1332/1334/1336, if the user chooses not to delete the self-reported event that triggered the integrity incident but to modify it instead, then modification is entered and the integrity incident identification mechanism's process (in FIG. 13A) is repeated. At 1338/1340/1342, if the user chooses not to delete the self-reported event that triggered the integrity incident and does not modify it, the user is provided with an opportunity to enter an explanation that will be appended to the incident record that will be sent to the manager. The user interface provides a form for the user to enter that explanation. Once appended with that explanation, the integrity incident is marked as "EXPLAINED PENDING MANAGER APPROVAL." At 1344/1346, if the manager approves the explanation, then the Integrity Incident is marked as "Resolved By Explanation." At 1348, if the manager does not approve the explanation then the integrity incident record is reset to its original state as set forth in connection with FIG. 13A.

Figure 14A:
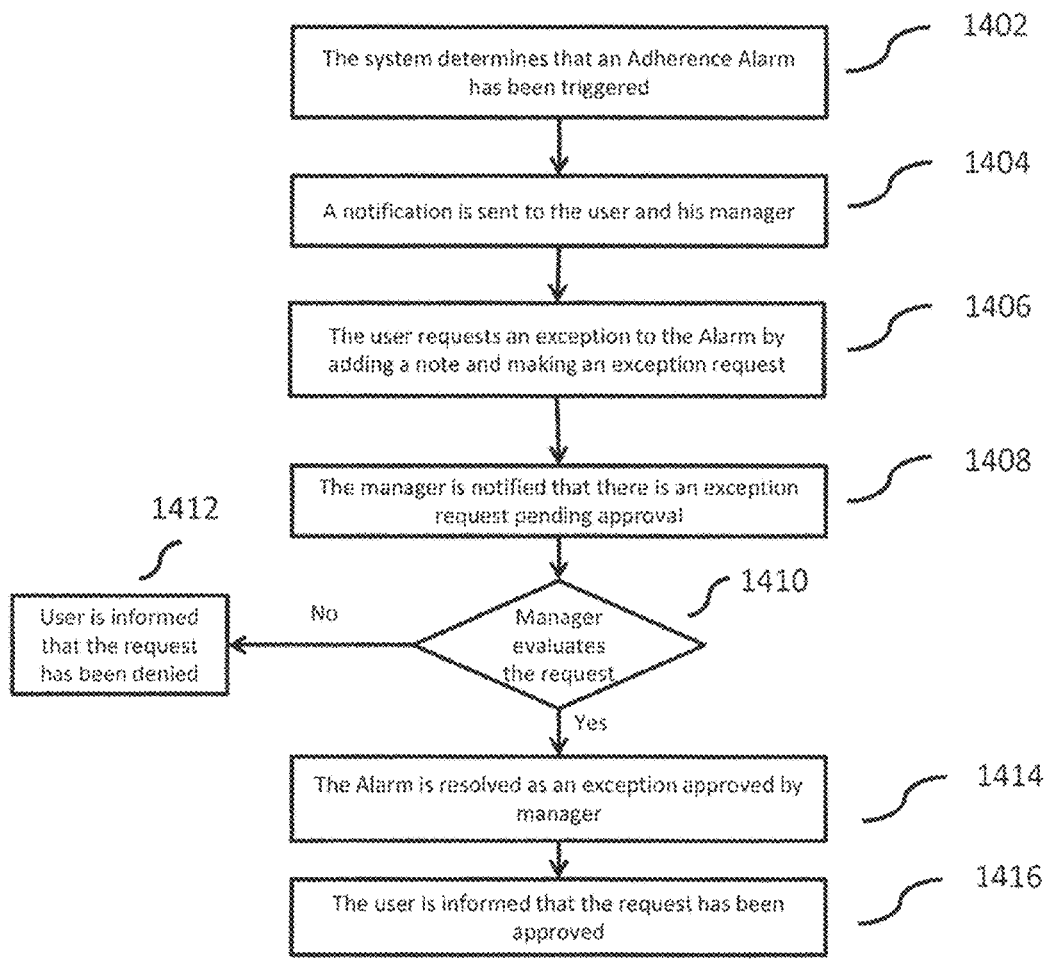
Figure 14B:
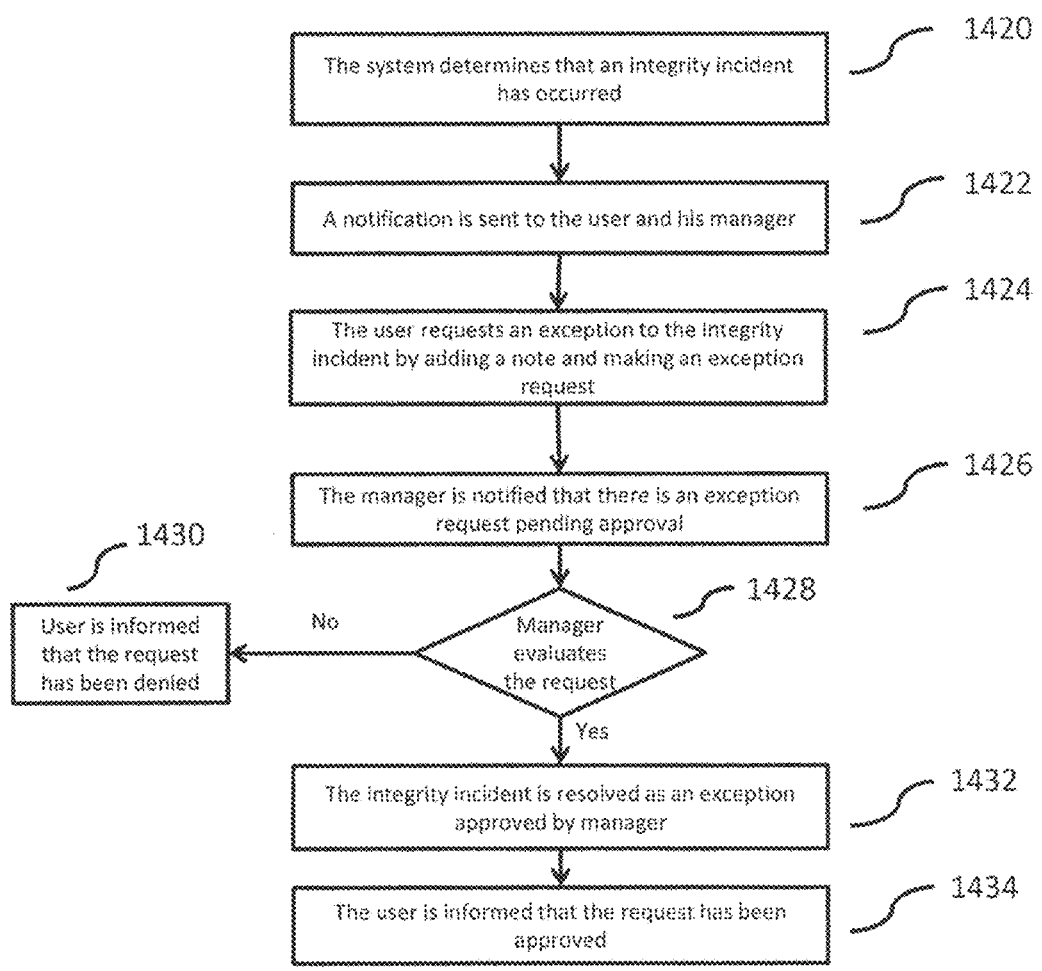

FIGS. 14A-14B are flowcharts of illustrative processing consistent with certain aspects related to the innovations herein. In the adherence alarm exception request processing of FIG. 14A, at 1402, the system determines that an Adherence Alarm has been triggered. The Adherence Alarm occurs when a user fails to follow company policy for example if a phone call from a lead is not classified within 24 hours, an Adherence Alarm will be created. At 1404, a notification can be sent to either the user or the user and his manager depending on the user's profile configuration. At 1406, when the user reviews the alarms that he has triggered (either by navigating to the appropriate tab on the CRM or mobile client or by receiving a specific Adherence Alarm. The user may submit a request that an exception be made because there is a valid explanation. The user must enter the reason and request that the manager review the request. The user may submit the request through the User interface or mobile client. At 1408, when the manager receives the exception request, he must review the request and decide whether or not to accept the user's reasoning. If the manager does not respond to the request in the timeframe specified in his profile, the manager will receive notifications that the exception request is pending. At 1410, the manager can decide to approve or reject the request at his discretion but the record remains in the database. At 1412, if the manager rejects the explanation the record of the alarm stands. At 1414, if the manager accepts the users request the Alarm record is closed with an exception approved by manager and this will not appear in the alarm reports. At 1416, the user is informed that the request was accepted and no further action is required.

Referring to the integrity incident processing of FIG. 14B, at 1420, the system determines that an integrity incident has occurred. The integrity incident occurs when user reported data is in conflict with machine reported data. For example an integrity event can be due to the user reporting a call to an opportunity but the call was made from a 3rd party phone or the user reported a site visit duration of an hour when the geolocation data reports that the visit was actually only 30 minutes. At 1422, a notification can be sent to either the user or the user and his manager depending on the user's profile configuration. At 1424, when the user reviews his assigned incidents (either by navigating to the appropriate tab on the CRM or mobile client or by receiving a specific integrity incident notification. The user may submit a request that an exception be made because there is a valid explanation. The user must enter the reason and request that the manager review the request. The user may submit the request through the User interface or mobile client. At 1426, when the manager receives the exception request, he must review the request and decide whether or not to accept the user's reasoning. If the manager does not respond to the request in the timeframe specified in his profile, the manager will receive notifications that the exception request is pending. At 1428, the manager can decide to approve or reject the request at his discretion but the record remains in the database. At 1430, if the manager rejects the explanation the integrity event stands but the user can still resolve the integrity event in the usual manner described in FIG. 13B. At 1432, if the manager accepts the user's request the incident is closed with an exception approved by manager and this incident will not trigger alarms or notifications and will not appear in integrity reports as an integrity event. At 1434, the user is informed that the request was accepted and no further action is required.

Figure 14C:
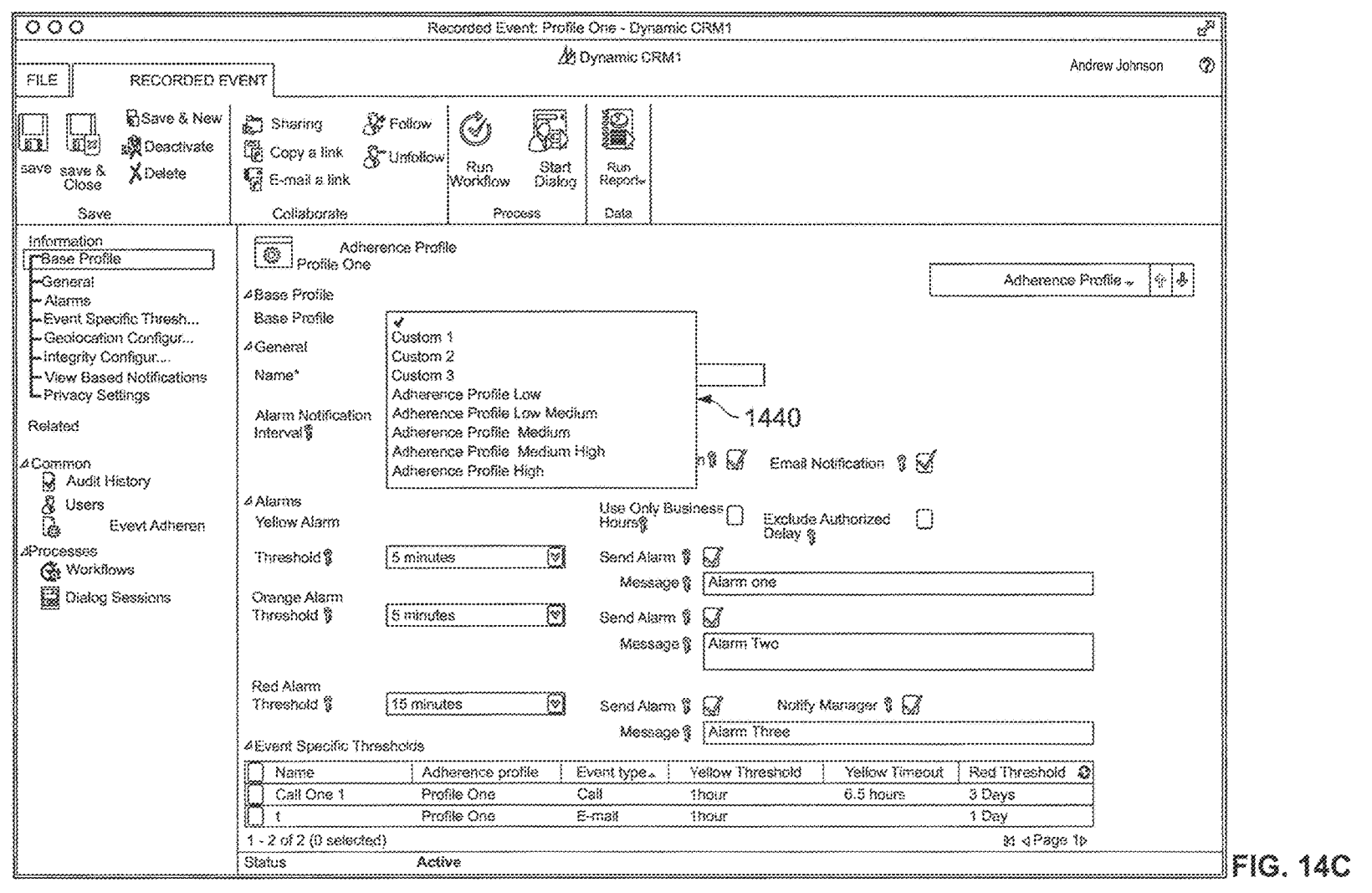

Systems and methods herein may also be configured with mechanism for notification management. FIG. 14C illustrates an exemplary user interface showing adherence policy features and functionality. In some implementations, systems may be configured with 5 default adherence profiles, though systems are also configurable to customize those 5 policy adherence profiles or add an unlimited number of additional custom policy adherence profiles, at 1440. An aspect of such policy adherence profiles is to define the quantity and types of alerts that are escalated to the manager. A policy adherence profile is a defined set of configurations of the policy definition, escalation and notification processes, which determine the quantity and variety and velocity of notifications that will be sent to the manager. Each of these policy adherence profiles elicit different triggers for alerts and different frequencies for notifications and alarms. A policy adherence profile can include all of the configuration options referenced herein and can be applied in defined circumstances including by named employee, by named prospect or customer, by event type, by opportunity type/size, by total historical customer value, by immediate and long-term opportunity value and many other parameters.

In the illustrative (default) implementation, a first default policy adherence profile essentially turns off the alarms and notifications. The user can view dashboards at his leisure to verify his assumptions about his progress. The system then acts as a tool that is used by the user to increase awareness and help in the sales process but it does not continually alert the user or the manager of the tasks that need attention. Here the system is restricted to being a tool to advise users of events rather than a method to monitor and to control their compliance with policies on how those events should be followed up on. The manager will nevertheless be capable of accessing data generated or aggregated by the system as well as access the tools based on that data. The second default policy adherence profile turns off the notifications to the manager but leaves the rest of the system processes for adoption enforcement and facilitation, integrity management and productivity analysis in place. Here the manager will periodically rely on reports to understand and evaluate user adoption, integrity and productivity but will not manage user activity on an event-by-event basis. Each of the remaining profiles sequentially increases the number of triggers for manager and/or user notifications; reduces or increases the time duration interval for a notification to be initiated; and reduces or increases the frequency of user and manager notifications. The last profile has the greatest number of alarm and notification triggers. Users and managers are prompted at shorter intervals throughout the day as to how many tasks require completion. Managers receive updates throughout the day providing many more details about the user activities, adherence delays and generated integrity issues. Here the application is used primarily as a tool to consistently manage users activities and compliance and enforce company policies regarding every event.

An administrator or manager can apply each of the 5 policy adherence profile levels in their default state or they can be modified for a particular circumstance as noted above or for all instances in which the profile has been applied. As the manager uses the system and becomes more aware of which notifications he wishes to receive and how often he wishes to receive the relevant notifications, the manager can modify which modified or unmodified policy adherence profiles should apply in each circumstance. The adherence profile definition can also leverage and be based on the data views available in the SFA/CRM. These data views provide a flexible and powerful method to further define the criteria and conditions that will trigger notifications and alarms. (For example, a manager can choose to use a system data view to filter all the opportunities with an estimated closing date for the current quarter and an estimated deal value that is greater than one million dollars in order to have greater insight and enforce alarms and notifications on those specific opportunities).

Figure 15:
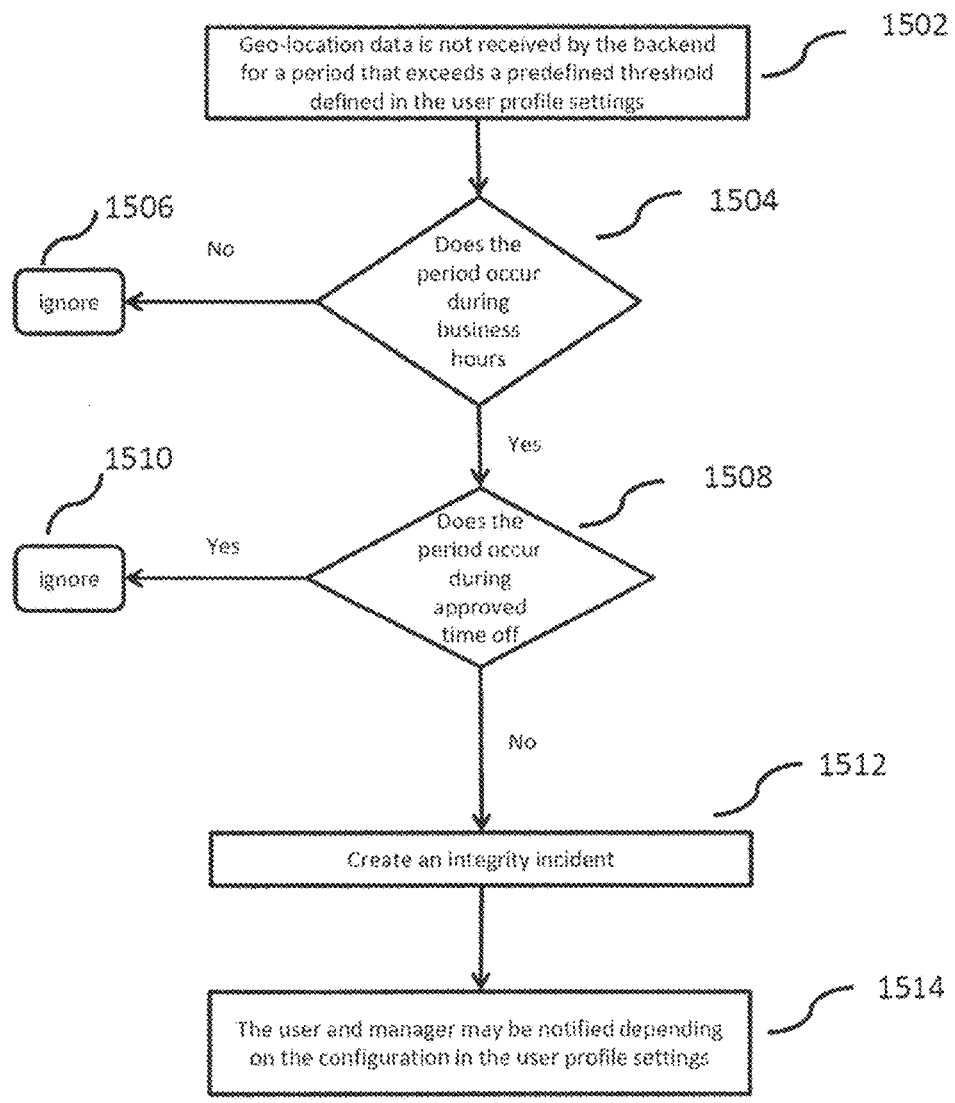
FIG. 15 is a flowchart of illustrative privacy management processing consistent with certain aspects related to the innovations herein.

Systems and methods herein may also include privacy management mechanisms. Here, for example, implementations may have a mechanism to identify when a geolocation device has gone silent. There are many possible reasons that this may occur: no cellular service, travel on an airplane or if a user opts to disable geolocation tracking. Referring to the exemplary process regarding such situations shown in FIG. 15, at 1502, the server detects that a user's geolocation device has stopped transmitting for a period that exceeds a predefine threshold. At 1504, the system evaluates if this incident happened during business hours for example between 9 am and 5 pm. At 1506, if not during business hours this incident is ignored. At 1508, the system evaluates if this incident happened during approved time off, for example a sick day. At 1510, if the incident occurred during an approved time off this incident is ignored. At 1512, if the incident occurred during business hours and not during an approved time off than an incident is created. At 1514, depending on the user profile a notification may be sent to the user and/or his manager.

FIGS. 16A-16F are flowcharts and illustrative user interface implementations showing time allocation and productivity analysis processing consistent with certain aspects related to the innovations herein. The User interface can produce a visual representation of time allocation and user productivity analysis. This can be represented as a summary or broken out by user.

Figure 16A:
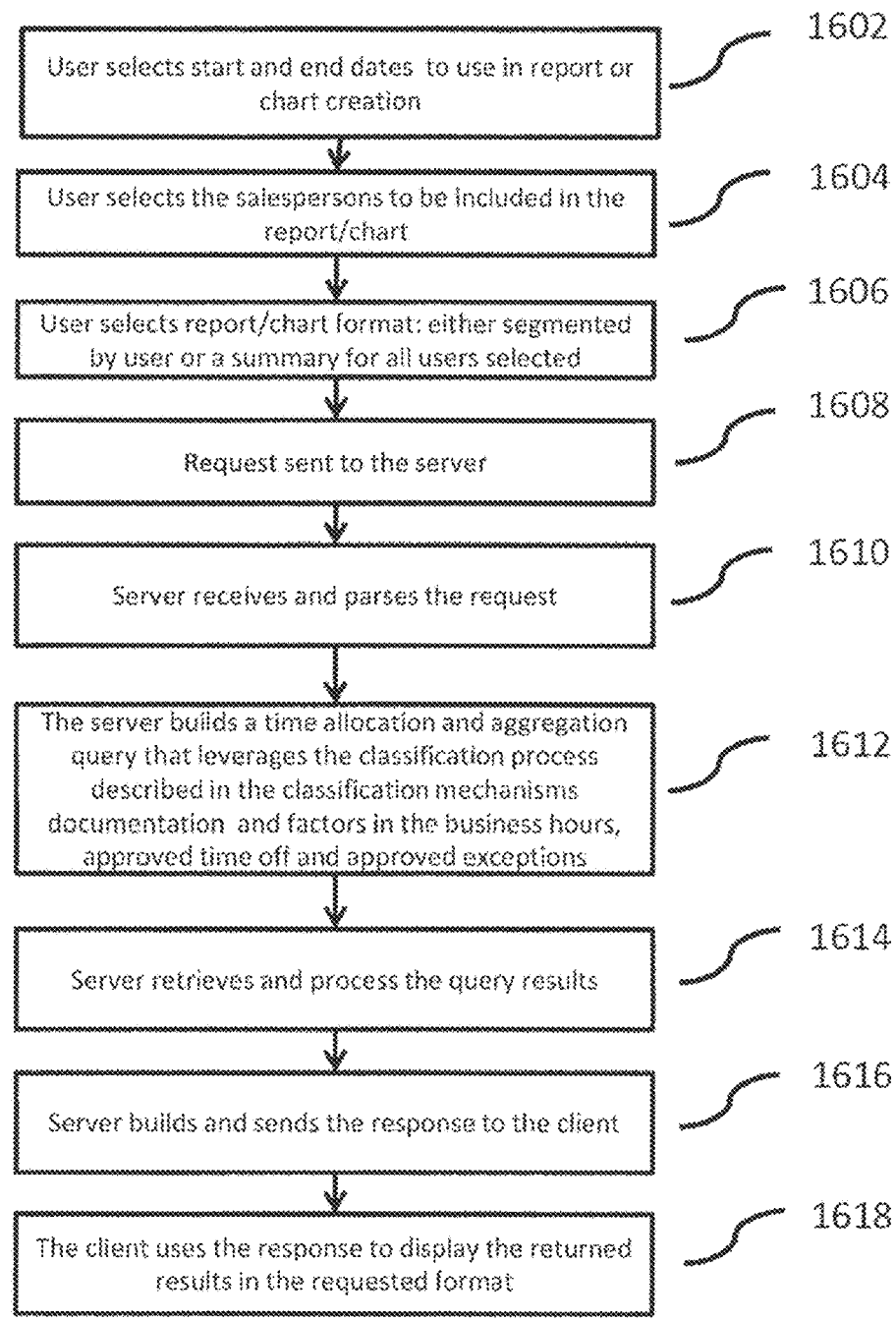
Figure 16B:
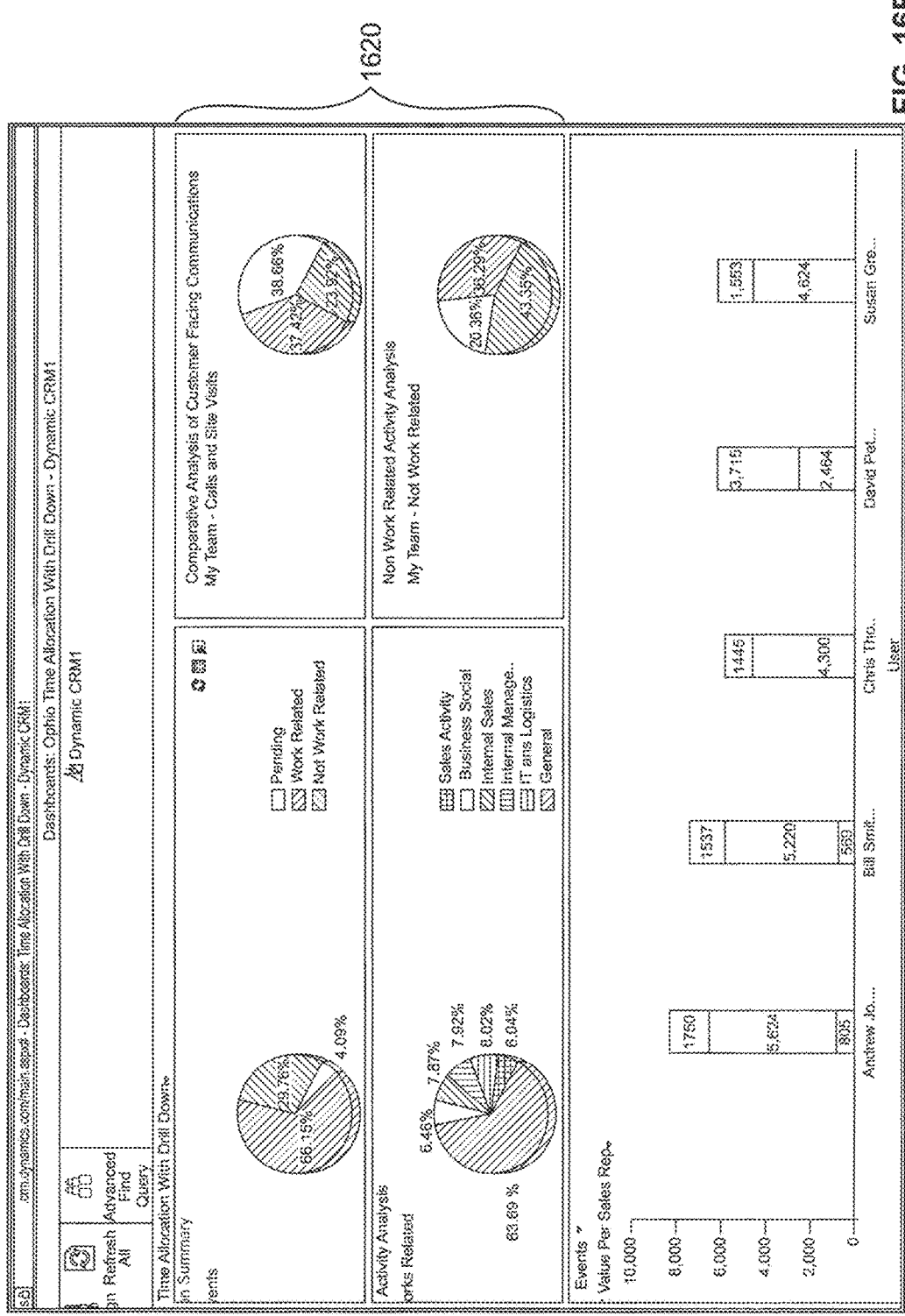

Referring to FIG. 16A, at 1602, in the user interface or mobile client the user must enter a valid start and end date to include in the report or chart. At 1604, the user may select which users or groups of users to include in the report or chart. At 1606, the user selects whether to view the report as a summary or broken down in a number of ways including but not limited to: by user, by time, by customer facing activity, by work related or not work related activities. Here, see FIG. 16B. At 1608, the client sends a request to the server. At 1610, the Server receives and parses the request. At 1612, the server builds a query that will return the results that show how the user has spent his time. This "time allocation and aggregation query" leverages the classification process (described in step 2 and related flowcharts and figures of this document) the query factors in the business hours, approved time off and approved exceptions. At 1614, the server retrieves and processes the query results. At 1616, the server builds a response and sends it to the client. At 1618, the client receives the response from the server and displays the results in the requested format (ex. Charts, reports, etc. See FIGS. 16B and 16C.

Figure 16D:
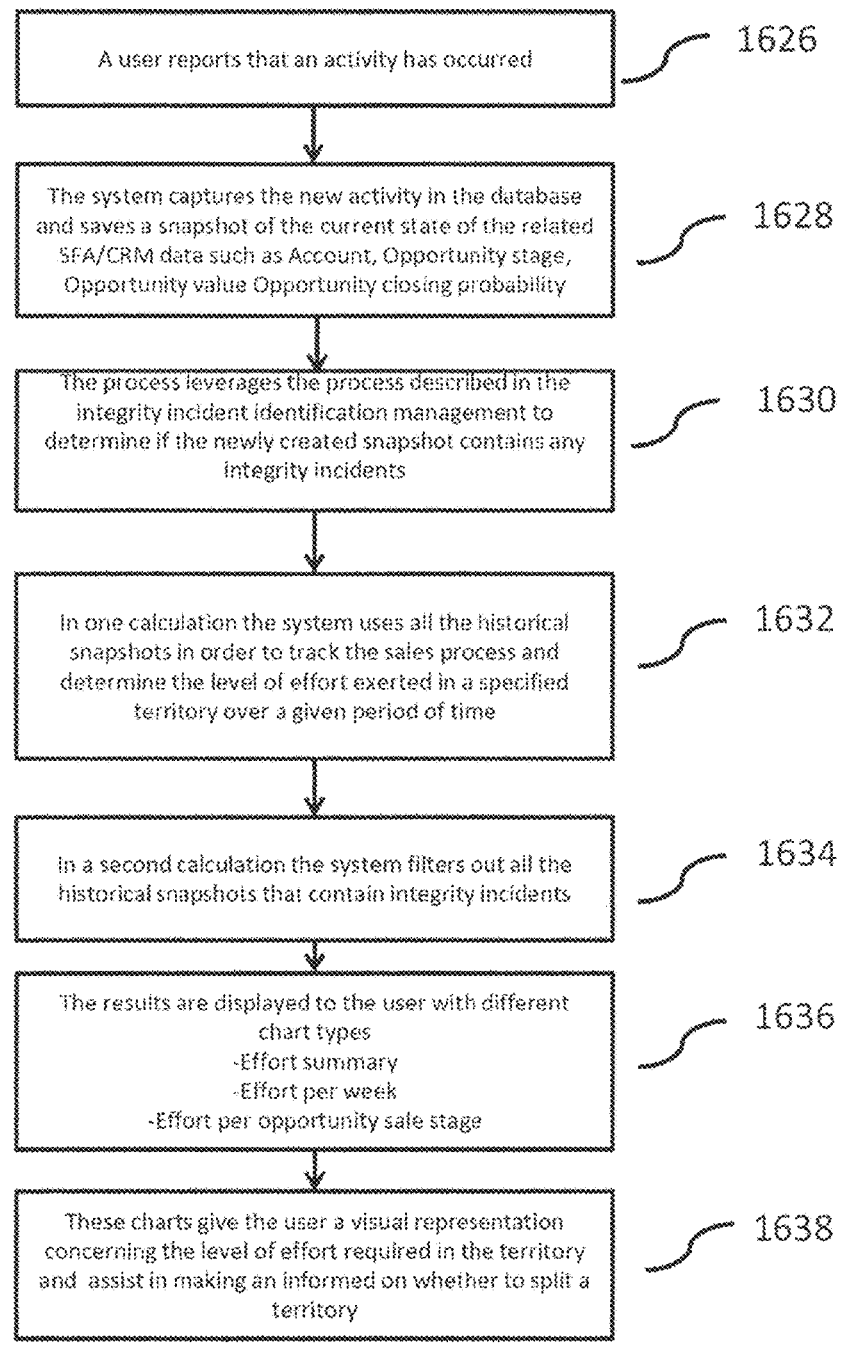
Figure 16E:
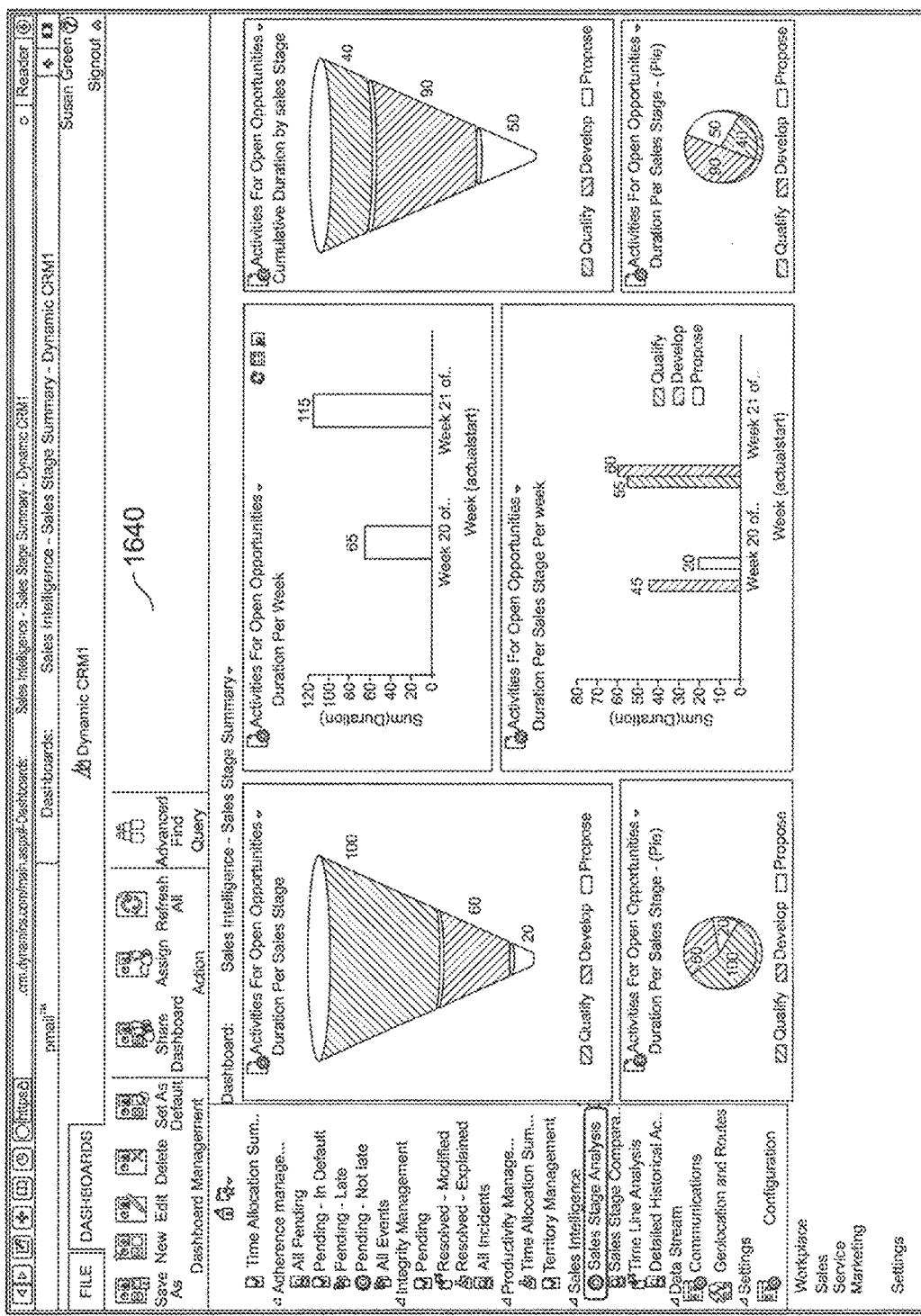
Figure 16F:
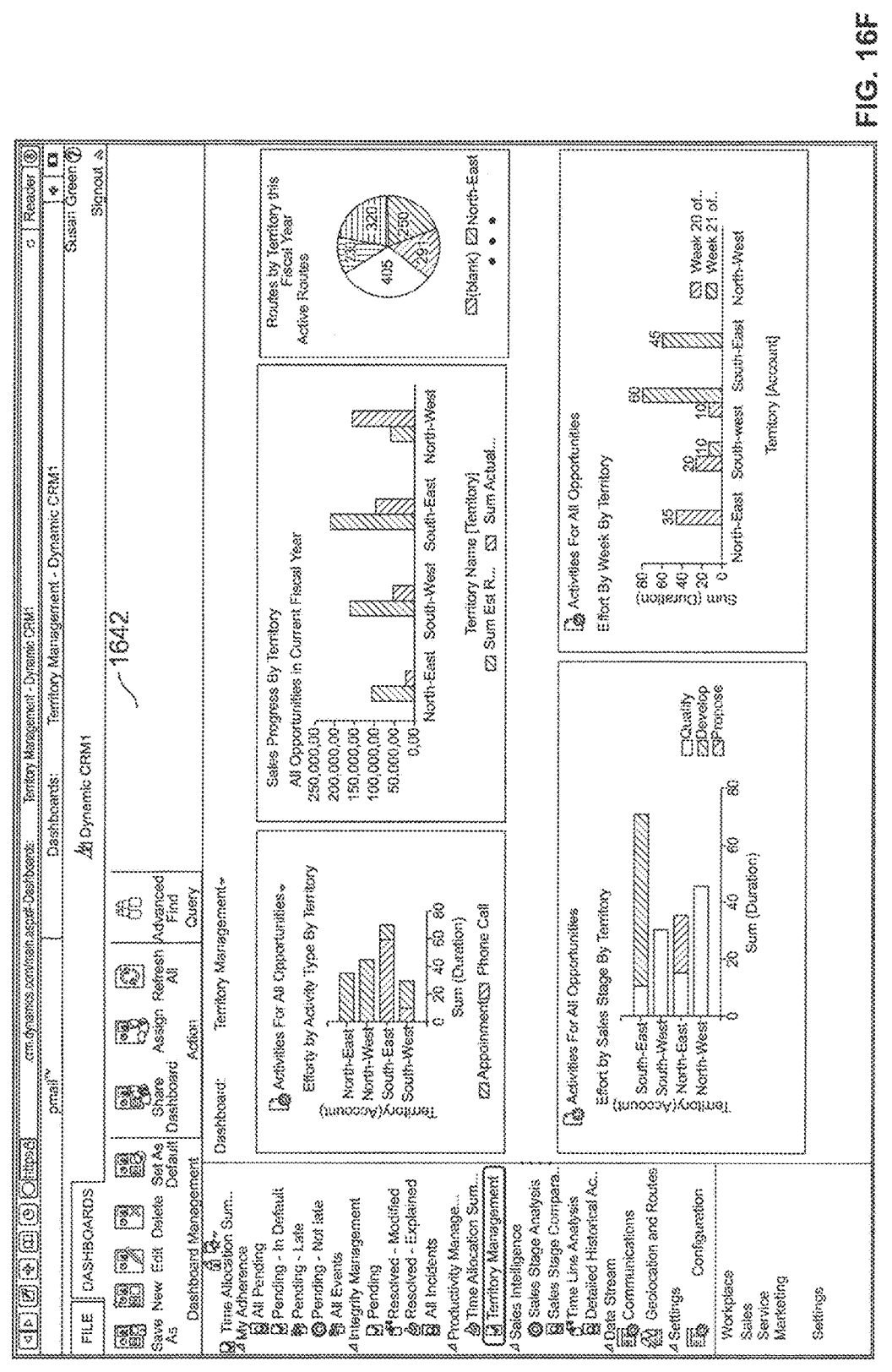

Referring to FIG. 16D, in order to bring objectivity to the process of territory management for sales teams, the system tracks the effort required by users to make quota. At 1626, a user can report that an activity has occurred through the User interface or mobile application. At 1628, the system captures the new activity in the database and saves a snapshot of the current state of the related SFA/CRM data such as Account, Opportunity stage, Opportunity value and Opportunity closing probability. This snapshot is saved in a database for later comparison to identify trends and activities taken or not taken by the users. At 1630, this process leverages the "integrity incident identification management" process in Step 5 to determine if the newly created snapshot contains any integrity incidents. Integrity incidents are observed when user reported data is in conflict with machine reported data. At 1632, the system presents the user with multiple graphical charts in order to provide a more accurate view to the data and level of effort required by a salesperson to reach quota. In the first calculation the system uses all the historical snapshots in order to track the sales process and determine the level of effort exerted in a specified territory over a given period of time. At 1634, in the second calculation the system filters out all the historical snapshots that contain integrity incidents, the two charts are placed side by side in order to present the user a clear picture of how much the integrity incidents have affected productivity, time allocation and sales. At 1636, the results are displayed to the user with different chart types such as Effort Summary, Effort per Week and Effort per Opportunity Sale Stage in order to present a fuller view of the user's efforts and how they are affected by different variables. See FIGS. 16E and 16F. At 1638, once the user has verifiable data that can objectively assess the level of effort a better decision can be made whether or not to split the territory. These charts give the user a visual representation of the aforementioned verifiable objective data and the level of effort required in the territory.

Various innovations contained herein in the area of forecast analysis are different from all existing alternatives in one or more of three key respects. First, analysis herein relies on machine data. Second, it does not use any user-entered data other than the data classification mechanisms outlined above (any subjective perceptions of the user are excluded). Third, the approach to analyze and remove opportunities from the sales pipeline rather than finding the ones to include in it. As such, it functions more as a 'last step filter' of the sales pipeline. An approach of innovations herein is to introduces a fact-based dimension to sales pipeline analysis that reviews the opportunities placed in the pipeline by salesperson or manager instinct or by other analytics products. Since user-defined events are generally incomplete and often inaccurate, this approach is far more effective when the data is machine-generated. This fact-based method tracks the relevant events for each opportunity at stage in the sales process. Examples of fact based dimensions may be: Incoming Call for Sales Stage 1, Incoming Calls for Sales Stage 1, On Site Visits for Sales Stage 1 and Emails for Sales Stage 3. The set of all the possible fact-based dimensions defines the canonical vector base. The canonical vector base permits to express all the efforts in term of duration in time for all the stages of a given opportunities. The set is said to be canonical because it is a complete and minimal. The canonical vector base is used to represent all the activities, based on machine data recording, for a given opportunity. For example, giving the following subset of the fact based dimensions: Incoming Call Stage 1, Incoming Call Stage 2, Outgoing Call Stage 1, Outgoing Call Stage 2 the expression (30,20,15,43) represents an activity where the system has tracked a total of 30 minutes of Incoming call at sales stage 1, 20 minutes of Incoming calls at sales stage 2, 15 minutes of Outgoing Calls at Sales Stage 1 and 43 minutes of Outgoing Calls for Sales Stage 2.

The innovations herein may include algorithms that uses the canonical vector base to build a multi-dimensional decision matrix. The matrix represents a set of closed opportunities for which the ultimate historical results in term of loss or won outcomes are known. A given matrix will include only opportunities that the system determines to be similar from a given perspective, which is correlated to a customizable set of data attributes. Concretely, this algorithm introduces the concept of Context Dimension. A Context Dimension is defined by conventional SFA/CRM attributes used to describe opportunities including but not limited product type, customer size, opportunity size, seasonality, etc. For every attributes the algorithm defines certain a class of measure. For example, opportunities that have an estimated value that between 900K dollars and one millions dollars can be considered as the same class of estimated value. A Context dimension is then expressed in term of series of attribute classes. To achieve consistency this decision matrix will include opportunities that have the same value for the context dimensions. In other words, the decisions matrix includes opportunities that have certain similar attributes. This multi-dimensional decision matrix can be thought of as means to give a spatial representation of the effort that has been exerted for every opportunity of in a given set of selected opportunities. Once the similar opportunities are entered in the decision matrix, the algorithm determines proximities of loss and proximities of win. A proximity of a win is characterized by the presence of multiple "won opportunities" that are very close to each other. In contrast. A proximity of a loss is characterized by the presence of multiple lost opportunities that are very close to each other.

The algorithm introduces two more concepts: distance between opportunities and distances between an opportunity and a given proximity.

Figure 17:
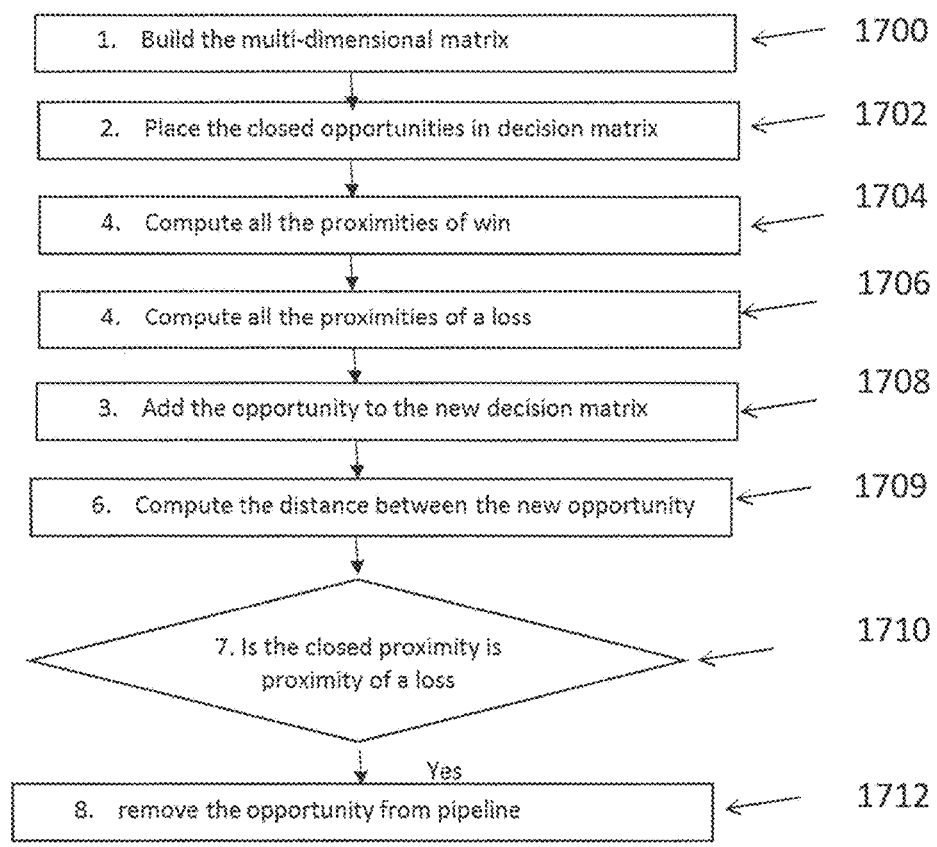
FIG. 17 is a flowchart of an illustrative pipeline filter process consistent with certain aspects related to the innovations herein.

The distance between two opportunities is measured as the square root of the sum of all the square value of the difference of efforts on each fact based dimensions. The distance between a given opportunity and a given proximity is the mean average of the distances of the given opportunity to all the opportunities that belong to the given proximity. Referring to FIG. 17, an exemplary algorithm may executes the following steps to determine if an opportunity should be removed from the pipeline or not: building the multi-dimensional matrix 1700, placing the closed opportunities in decision matrix 1702, computing all the proximities of a win 1704, computing all the proximities of a loss 1706, adding the opportunity to the new decision matrix 1708, computing the distance between the new opportunity and all the proximities 1709, checking if the closed proximity is a proximity of a loss 1710, and if the closed proximity is classified as a proximity of a loss then it removes the opportunity from the pipeline 1712.

FIGS. 18A-18F are illustrations of an implementation of exemplary classification processing. According to implementations herein, captured event data may be automatically classified and filtered based on user-defined parameters where the captured data events include telephone calls, in-person meetings, emails, geolocation records and other recorded and aggregated electronic communication. For example, phone calls from a husband or wife, children, friends, etc. will be automatically entered as "Personal". This saves the user time by reducing the number of "pending events" that would otherwise require user input for classification and avoids the need for repetitive data entry.

Various functionality and computer processing is provided herein to specify that future events with the common attributes should be classified automatically based on prior-defined processing of similar events (to automatically add context to future events and automatically identify them as "work related" or "Not Work Related", etc.) without the need for user processing, and which reduce the time-commitment required for user processing of future events. Here users can specify that certain future events associated with identifying information such as a common phone number, a common email address or a common location (obtained via geolocation) should be automatically classified without user intervention and automatically omitted from the list of events requiring processing by the user. Examples of events one might wish to auto-classify include inbound and outbound calls from one's spouse or other family members, geolocations of places at which no work takes place (such as the homes of friends and family members, the schools that the user's children attend, the user's dentist and doctor, etc.), SMSs or emails to or from friends and relatives, and the like.

Figure 18A:
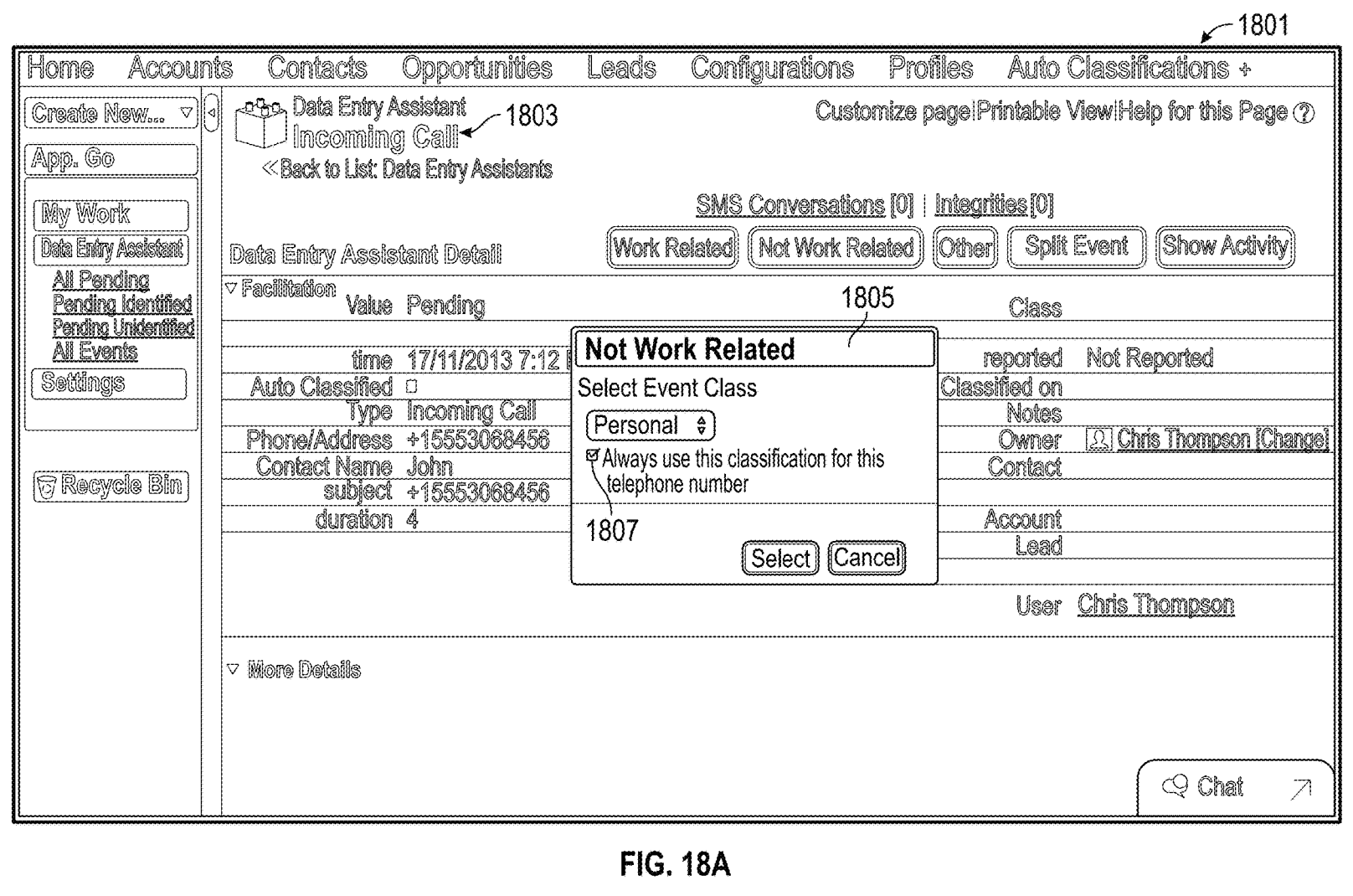

In FIG. 18A, a GUI 1801 displays that event data 1803 such as an incoming call. A classification notification 1805 is displayed prompting the user to select an event class such as work or personal. A checkbox 1807 is also provided asking whether events related to the subject telephone number should always be automatically classified the same way in the future. If the checkbox 1807 is selected to confirm automatic classification of that event, the associated information is added to an automatic classification database table. The automatic classification database table is used to automatically assign the same classification for future matching events. When a new event is captured and pending classification, cross-reference is made for that event against the list to perform automatic classification without user intervention.

The structure of the database table 1833 is provided in FIG. 18F which shows categories including Phone Number/Address that defines the telephone number or the physical address that the user wants to be automatically recognized by the system in the future, and the classification to be automatically associated with that Phone Number or address including the class type ("Work related", "Not work related" or "Other"), and sub-classification class chosen by the user from the library of pre-defined and user defined sub-classes (for example, "Sales activity", "Business social" . . . ), as well as other data such as contact, lead and account that are stored with the captured event or entered by the user during the classification process.

The system uses this database table to automatically assign the same classification for future matching events. When a new event is captured, the system cross-references the phone number or the location of the event with the database table and will automatically classify it, if it finds a match, using the value and class information found in the database, and add the additional contact, lead and account information.

Figure 18B:
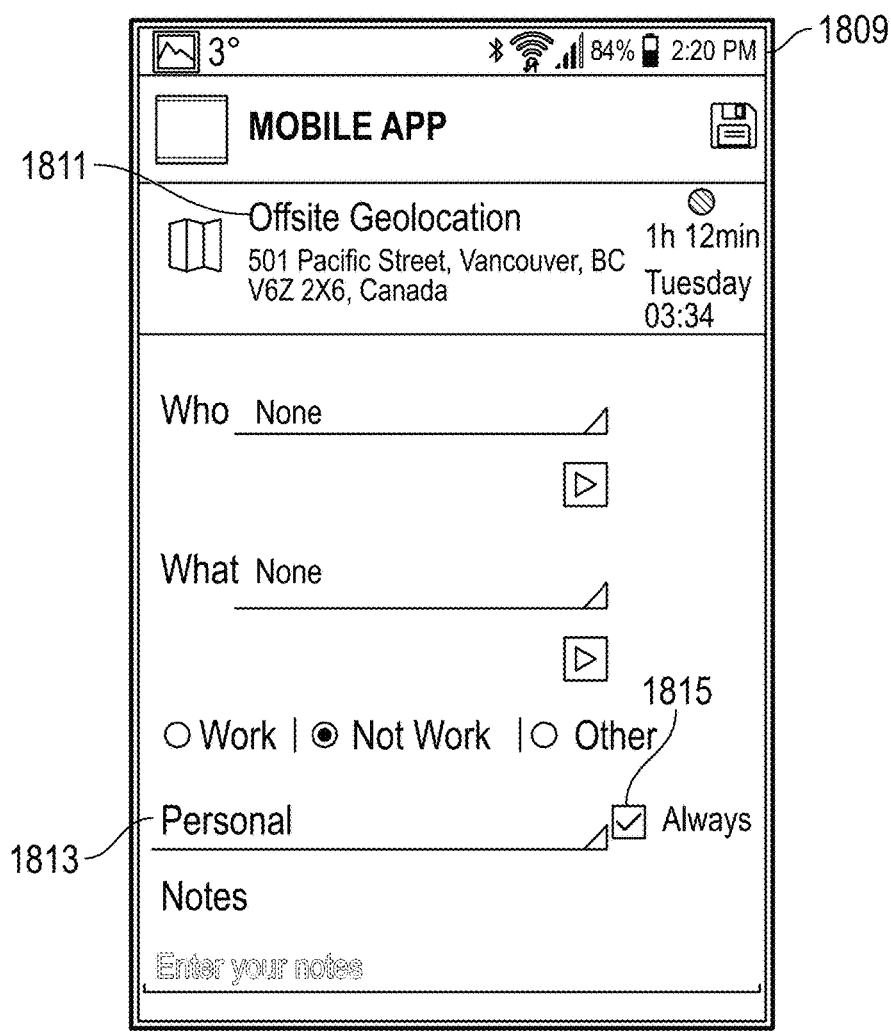

FIG. 18B illustrates a mobile application GUI 1809 displaying event data 1811 such as a geolocation. A classification notification 1813 is displayed prompting the user to select an event class such as work or personal. A checkbox 1815 may also be provided asking whether this geolocation event should be automatically classified in the future with the same classification attributes.

Figure 18C:
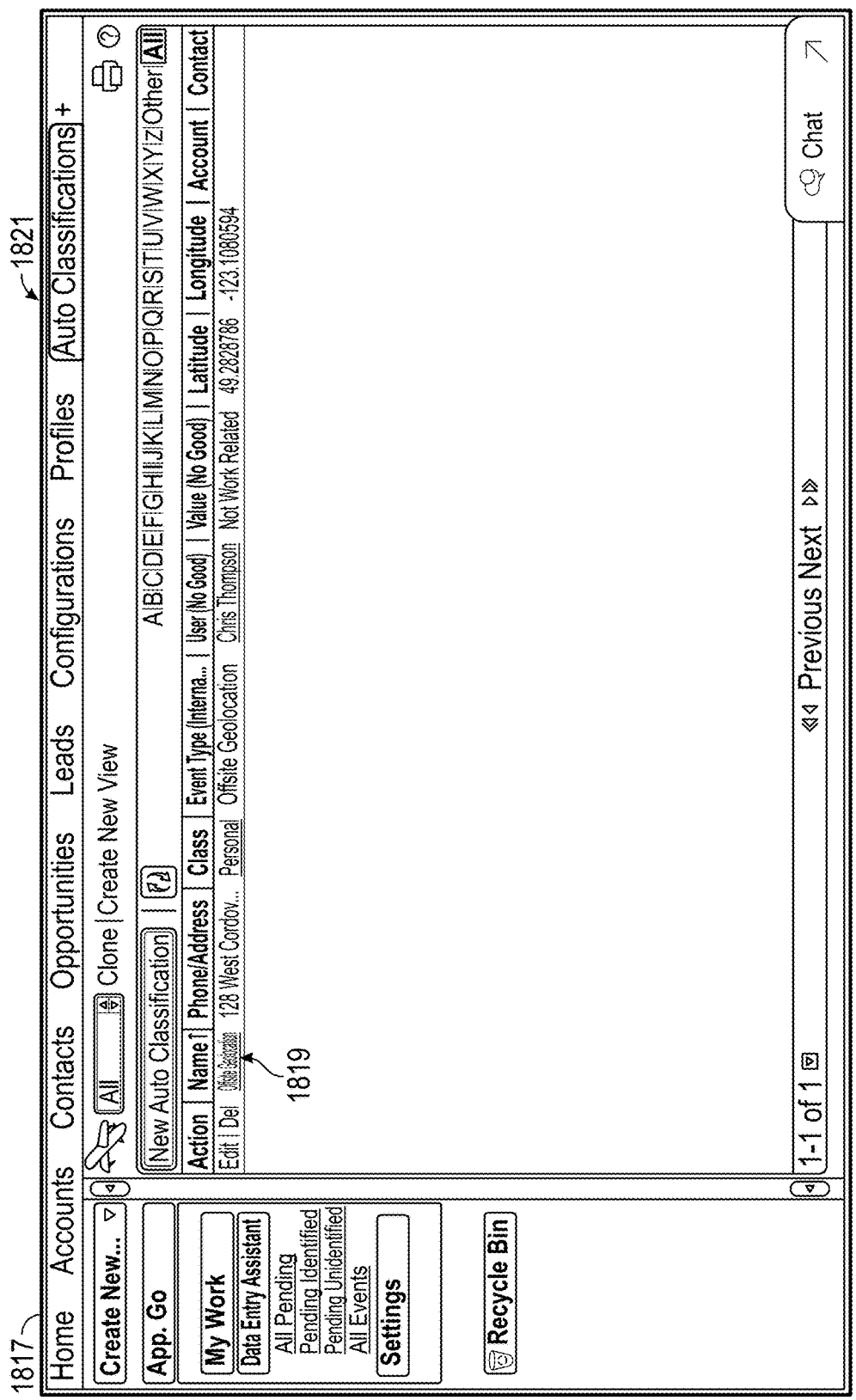

In FIG. 18C, the GUI 1817 provides the auto-classification list 1819 in the "Auto-Classifications" tab 1821 and can delete or modify existing auto-classification directives and also add new auto-classification directives directly to that list as an alternative method to using the "always auto-classify" option available when processing a pending event as described above in FIGS. 18A-18B.

Figure 18D:
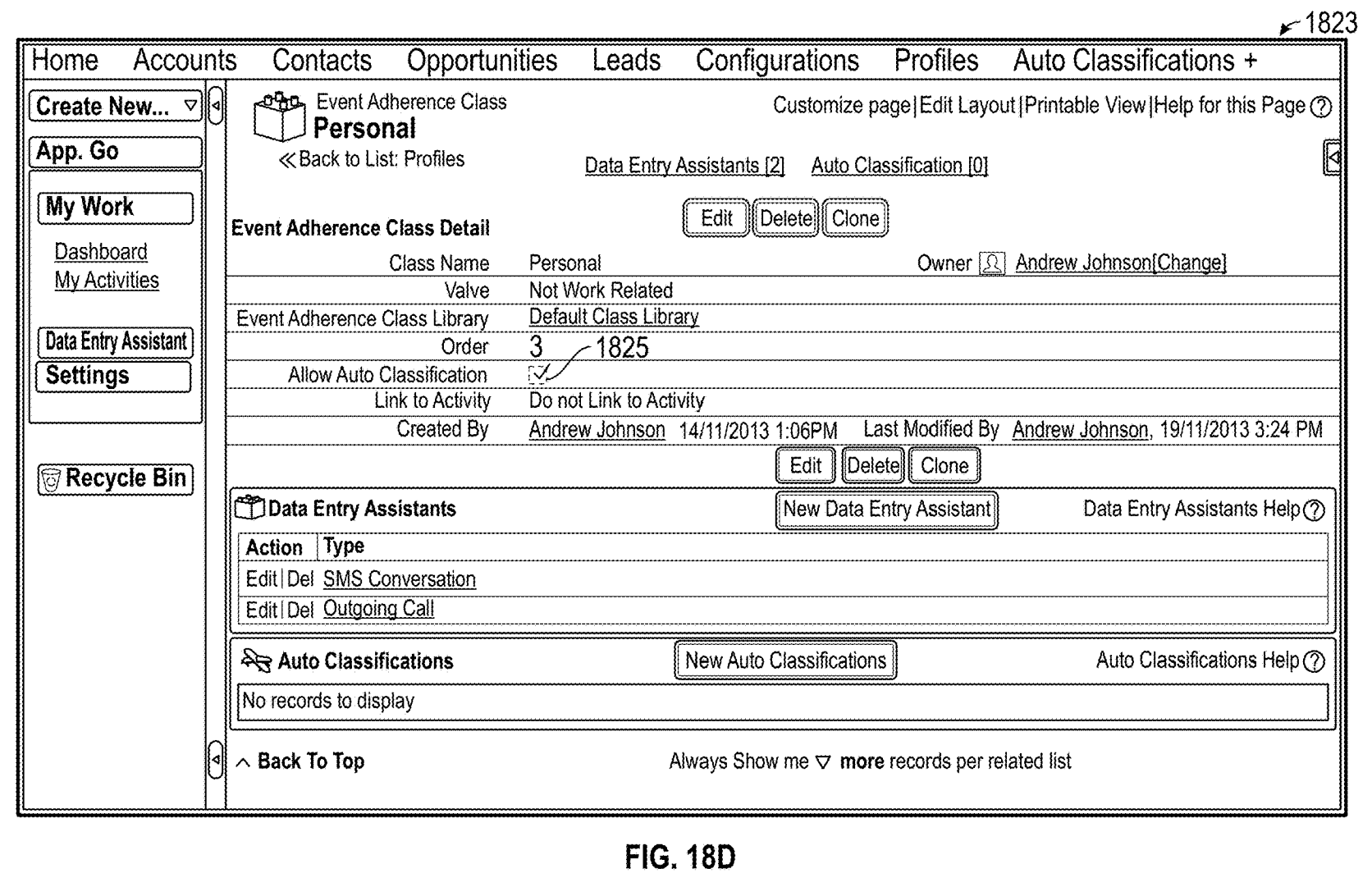

Permission to auto-classify events may be restricted based on administrator policies and inputs. Upon defining an event class, a determination is performed whether or not user(s) will be allowed to auto-classify that event class. For example, users may be permitted to auto-classify "personal" events but not "sales-related" events. FIG. 18D illustrates a GUI 1823 which enables an administrator or manager to permit or prevent auto-classification for the personal event class 1825.

FIG. 18E illustrates a GUI 1827 providing a plurality of defined event classes in a "class library" where "Personal" event class 1829 is the only event class that can be auto-classified 1831 as it is the only event class with the "Allow Auto-classification" option selected.

In another implementation of the invention, data event batch processing is provided where multiple data events are classified simultaneously in order to assign common notations and attributes for separate data events to their associated "activities," "tasks" or "events" in a sales force automation or other system, thereby reducing repetitive data entry for notations and attributes common to such events. For example, a sales representative may repeatedly call a customer for the same reason (late payment, response to an important offer, etc.). Data event batch processing saves time and increases efficiency by processing the classification and entering of notation only once for a plurality of events.

In one implementation, a plurality of unclassified pending data events are selected for batch processing. A type of classification is then selected along with note entry applied to each of the selected data events. The system will then automatically create individual records for each event and all "batch processed" event records will have the same classification and user-entered notes.

Further details regarding the technical processing of the innovations are set forth in the attached appendices, such as, here (Classification/Auto Classification), in Appendix A. In some implementations, auto classification allows for events to be classified without user input. The auto classification process may be triggered by either of the following events: a new recorded event that has been reported or a new auto classification entry that has been added or modified. In some implementations, the auto classification process may execute as follows:

```
Wait for a new Auto classification event then
    If a new Recorded Event: event has been report then
        Call NewEventAutoClassificationHandler(event)
    Else If a new Auto Classification Entry: entry has been
added or modified
then
        Call AutoClassificationEntryHandler(entry)
    End
End
```

If the event address, which may include a call number, email address, location, etc. is unknown, then the auto classification process may end, as follows:

```
Function NewEventAutoClassificationHandler(RecordedEvent_c
recorded_event)
Begin
    If event.address = = null then
        return
    End
```

A list of the auto classification records that match the event address, which may include email, phone number, location, etc., may be queried as follows:

```
List<Auto_Classification_c> records = [SELECT Id, Class_c, Value_c,
Address_c, Who_c, What _c FROM Auto_Classification_c WHERE
((OwnerId = :ophio_recordedevent.OwnerId) AND (Address_c != null)
AND (address_c like :phonenumber) AND
(Class_r.Allow_Auto_Classification_c = true) AND
((Class_r.Select_Event_Type_c = false) OR (Class_r.Event_Type_c
excludes ('Call')))];
```

Also, if the system does not find any auto classification entry that matches the event address, then the auto classification process is aborted as well, as follows:

```
If records.size <= 0 then
    return
End
```

However, if there are matching auto classification entries, then auto classification is applied to the recorded event by setting the appropriate classification fields to the values specified in the auto classification entry. In some implementations, auto classification may be executed as follows:

```
Call ApplyAutoClassification(recorded_event, records[0]);
End
Function ApplyAutoClassification(Recorded_Event_c event,
Auto_Classification_c entry)
Begin
    event.value_c = entry.Value_c;
    event.Reported_c = 'Reported';
    If (event.ReportedDate_c == null) then
        event.ReportedDate_c = DateTime.Now( );
    End
    eventAuto_Classified_c = true;
    event.ClassId_c = entry.Class_c;
    event.Who_c = entry.Who_c;
    event.What_c = entry.What_c;
    event.LinkType_c = 'None';
    event.ActivityId_c = null;
End
```

In some implementations, a determination may be performed to determine of whether the auto classification rule applies to Media (calls and/or SMS) or other types of events, such as location, email, etc. First, all the pending recorded-events for which the new rule applies are retrieved. Calls and SMS records are loaded or else recorded events that are neither calls nor SMS records are loaded. The process then may be looped through all the events to apply the auto classification to all the events. In some implementations, this process may be executed as follows:

```
Function AutoClassificationEntryHandler (AutoClassification_c entry)
Begin
    IsACallType = (entry.Event_Type_c.Contains('SMS') ||
entry.Event_Type_c.Contains('Call'));
```

```
If ( isCallType) then
    records = [SELECT Id FROM RecordedEvent_c WHERE
((OwnerId = :new_record.OwnerId) AND (Value_c = 'Pending') AND
((Address_c != null) AND (Address_c like :entry.phoneNumber)))];
else
    records = [SELECT Id FROM RecordedEvent_c WHERE
((OwnerId = :new_record.OwnerId) AND (Value_c = 'Pending')
AND ((Address_c != null) AND (Address_c = :new_record.Address_c)))];
End
For RecordedEvent_c record : records
    Call ApplyAutoClassification(record, entry)
End
End
```

FIG. 19A illustrates a GUI 1901 for splitting a data event captured as a single event into a plurality of data events for analysis and reporting purposes. For example, multiple consecutive meetings can take place at a single location (for example, a coffee shop or a hotel conference room). By default, geolocation records will only show the entire duration of time spent at that location. Consequently, the time spent continuously at that one geolocation will be recorded as a single event. Data event splitting allows that duration to be split into a plurality of events for record-keeping purposes, so that each part of the split event can be associated with the relevant activity. In on example, a sixty minute geolocation event may actually consist of two distinct thirty-minute meetings that must be classified separately for record-keeping purposes.

Figure 19B:
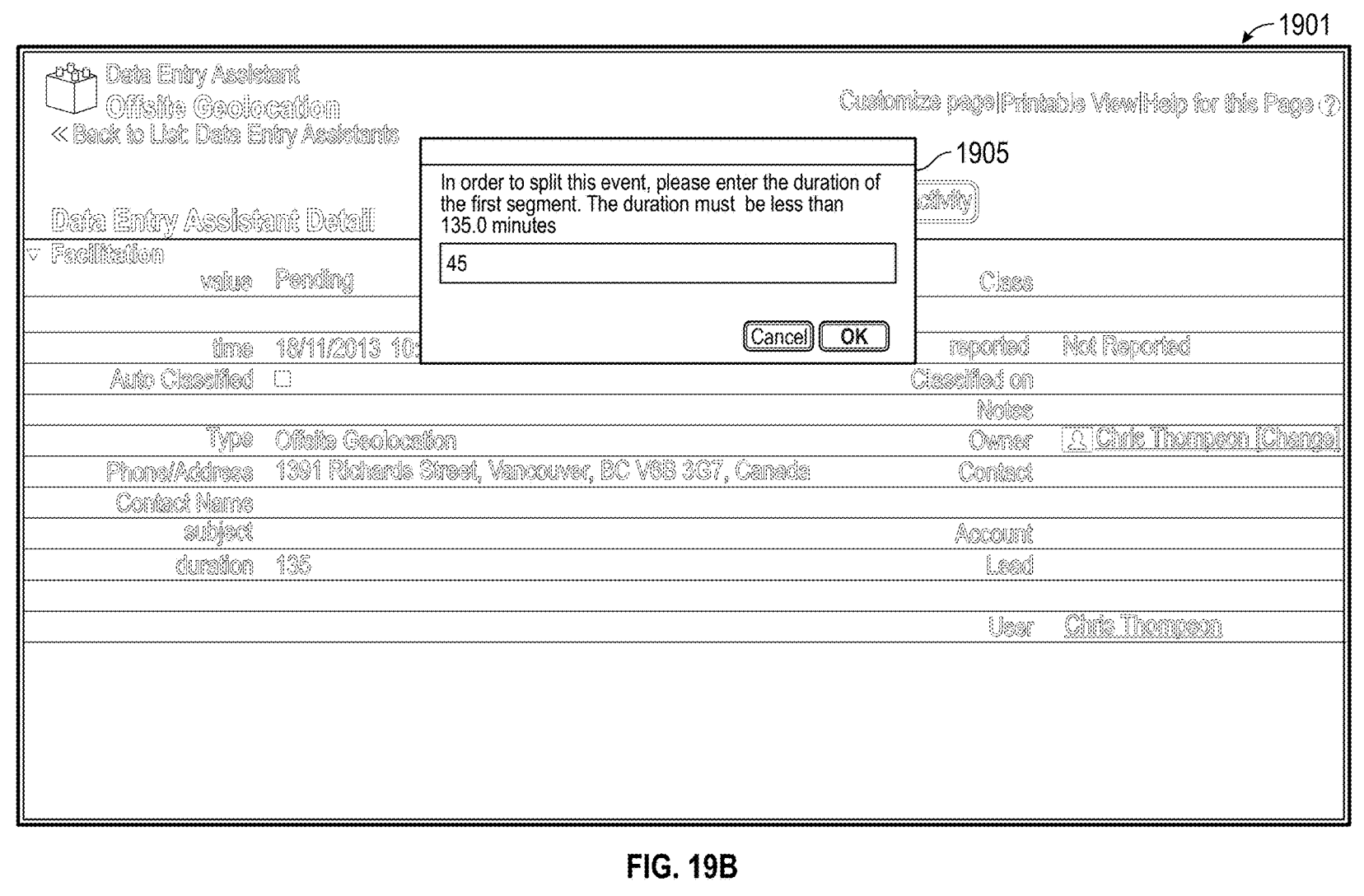
Figure 19C:
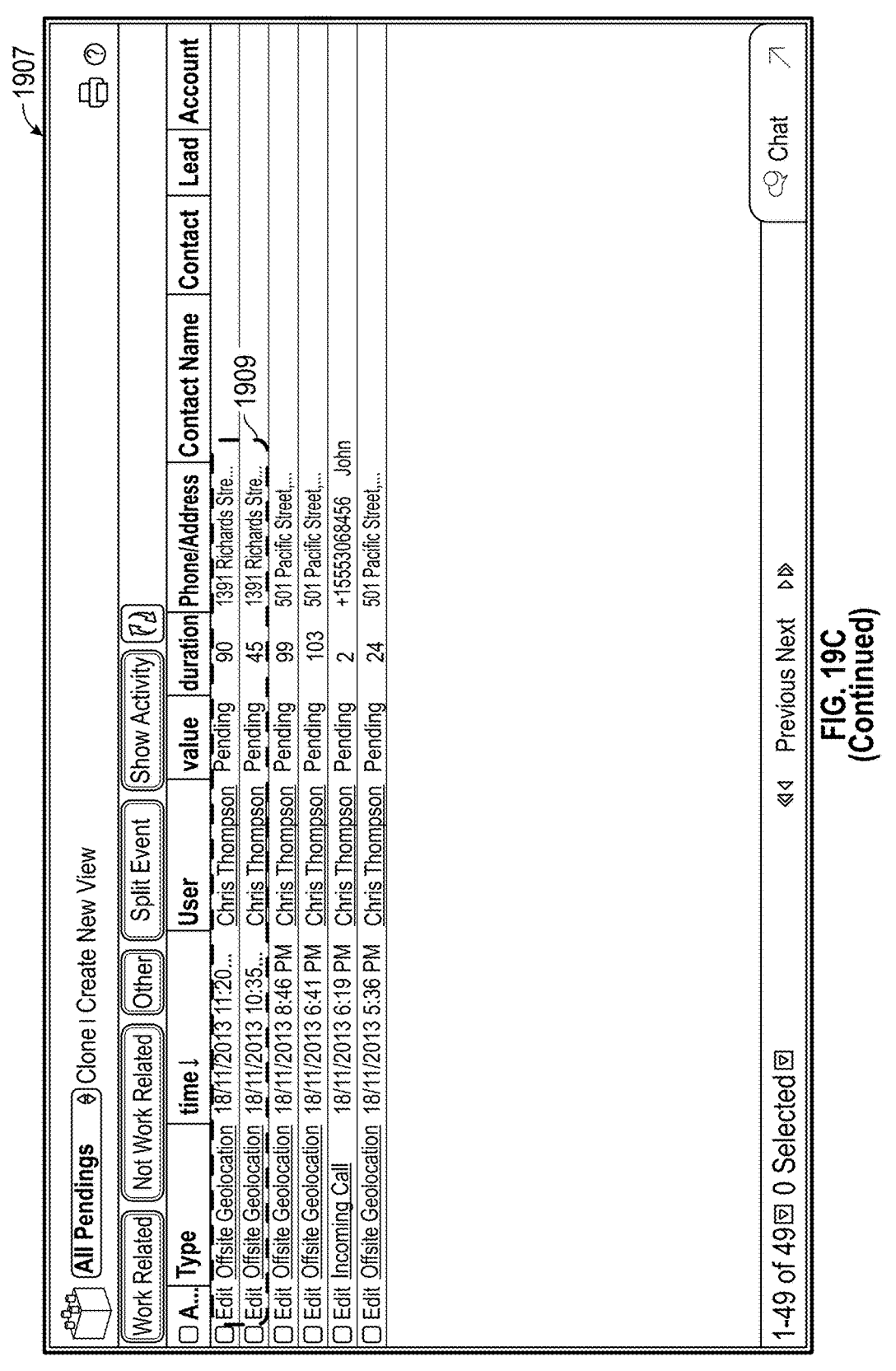

In FIG. 19A, the user selects the "Split Event" function 1903 for the event in the user interface 1901. In FIG. 19B, a user is instructed at 1905 to indicate how the event is to be split. In this case, the user inputs the amount of time allocated for the first split event. The event is then split into separate events that can be processed separately. As with all "pending events", the user may then select the associated classification and enter the associated notes and other data related to each event. The GUI 1907 of FIG. 19C displays the list of events and reflects that the originally captured single event has been replaced and is now displayed as two separate events.

One advantage of this is to enable reporting systems to conform to the practical human perspective that a single data event may actually represent multiple events. While data may appear to be one event from a machine perspective, the innovation allows users to split the event to conform to the human understanding that a single captured data event may in fact be composed of multiple parts that require separate classification.

For example, a user might have had two or more consecutive meetings with two or more distinct leads at the same location (such as a rented conference room or a coffee shop) but only one visual data object would automatically be created because the separate events would have all taken place in the same location. Aspects herein to manually split events allow the user to break the visual data object into multiple visual data objects in order to process them separately and add the appropriate information regarding each meeting. The user may also be provided the pre-defined option to have the split be performed automatically, in which case the event would automatically be split into multiple visual data objects on the list of events awaiting processing by the user, with each of those visual data objects having a distinct start-time and end-time based on the data in the electronic calendar for each of the meetings scheduled to take place at the common location in the time period of the overall geolocation. Another example of automated splitting of events applied to telephone calls would be when an account representative speaks to different people in the same company on the same call where different participants are scheduled in the electronic calendar to participate and exit the call at different times.

Further details regarding the technical processing of the innovations are set forth in the attached appendices, such as, here (Split Events), in Appendix B. In some implementations, a split process is provided to split an event into multiple events. A recorded event (Call or Offsite geolocation) may be split into two child events. The process may first check whether split is enabled for a given recorded event. For instance, the split functionality is disabled if the event duration is less than 1 minute, the event is a merged event or part of a merged recorded event, the event status is different than pending or the event not of type call or offsite geolocation. Otherwise the split is enabled. In some implementations, this process may be executed as follows:

```
Function CanSplit (RecordedEvent_c recorded_event)
BEGIN
    IF (event duration is less than 1 minute) THEN Disable Split
    IF (event is a merged event or part of a merged recorded event) THEN
Disable Split
    IF (event status is different than pending) THEN Disable Split
    IF (event not of type call or offsite geolocation) THEN Disable Split
    ELSE Enable Split
END
```

In some implementations, to determine a split, a start date and duration for a given recorded event is determined, as follows:

```
Function RetrieveTheEvent2Split (RecordedEvent_c recorded_event)
BEGIN
    Excecute Query (RecordedEvent_c recorded_event = [SELECT Id,
duration_c, parent_c, time_c FROM RecordedEvent_c WHERE (Id =
:ids.EventIds[0]) AND (parent_c = null) AND (Merged_Event_c=false)])
    Return Event2SplitData with Duration and Start time
END
```

In some implementations, the split function includes the steps of using metadata to load all fields of the original recorded event. The loaded recorded event is cloned and the duration, start time, and end time are changed accordingly. If the recorded event is a geolocation, then the split is applied on the geolocation site. The new cloned recorded event is inserted and the original event is updated to create two events out of a given recorded event. This process may be executed as follows:

```
Function DoSplitRecordedEvent ( )
BEGIN
    Use metadata to load all fields of the original recorded event.
    Map<String, Schema.SObjectField> fldObjMap =
schema.SObjectType.RecordedEvent_c.fields.getMap( );
    Clone the loaded recorded event
    Change the duration, start time, end time accordingly
    IF (the recorded event is a geolocation) THEN apply the split action
on the geosite (the object describing the geo-coordinate, address, etc. ...)
    Insert the new cloned recorded event and update the original event.
END
```

Conversely, another implementation of the present invention provides a process to merge multiple data events into at least one data event for reporting and analysis purposes. In cases where the same event may occur over different periods of time and/or geolocation, but involve the same parties and/or subject matter, merging of multiple events into a single event can provide more accurate and streamlined reporting. While data may appear to be separate events from a machine perspective, the innovation allows users to merge the events to conform to the human understanding that the different data events are in fact simply components of a single event.

For example, a conversation may be temporarily interrupted due to a technical difficulty such as a dropped call, despite the fact that the parties view that series of calls as a single conversation. Similarly, a meeting may begin in an office conference room but may be relocated to a coffee shop or an office in another building if it runs long, yet the parties would view the interactions at those locations to be a part of a single meeting. Call records or geolocation records, however, would treat separate calls and/or separate locations as separate data events. The merge events function allows the separate events to be treated as single events for reporting purposes and in order for records to better correspond to how human beings would naturally interpret those data events.

Figure 22A:
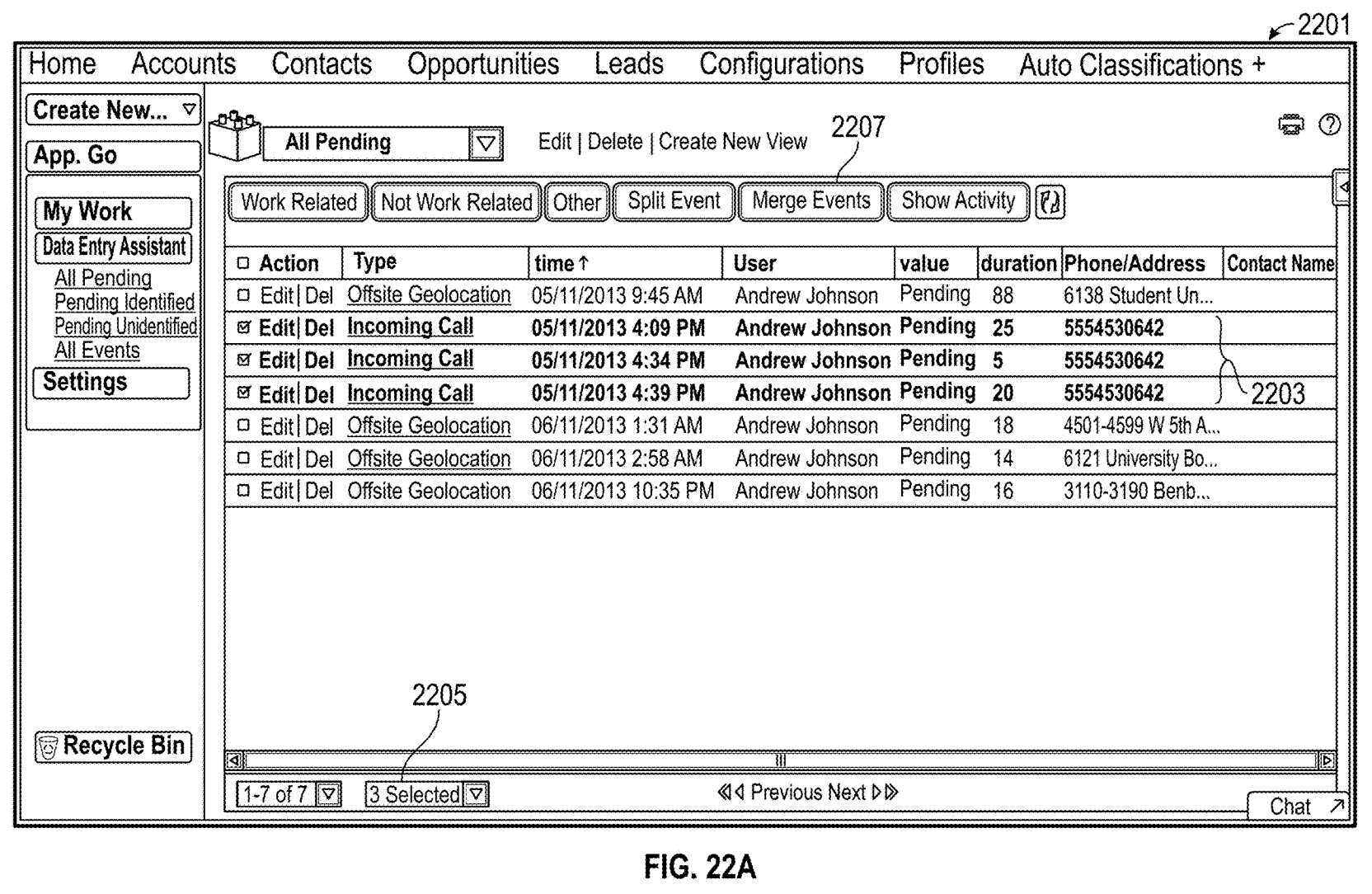
Figure 22B:

FIGS. 22A-22C illustrate a GUI 2201 for merging a plurality of captured data events and re-defining them as a single data event for analysis and reporting purposes. To merge events, a user in FIG. 22A selects at least two pending data events 2203 awaiting classification. The selection of pending data events eligible for merger may be subject to configurable restrictions, such as limiting the option to data events of the same type (meeting, phone call, emails, . . . ) and/or contiguous time periods with a configurable maximum amount of time separating the two events. For instance, an amount of time between two data events may be set to not exceed a certain configurable duration such as 15 minutes apart. Also, an option to restrict event merging beyond the parameters defined above may be configured when events follow each other. For example, when the space between two events is of a longer duration than specified and there has been no activity in the interim due to an outage or lack of mobile cell tower access, the events immediately preceding and following the outage or lack of access could be merged. If the set of events does not comply with the configured restrictions, data events will not be permitted to merge. An indicator 2205 may be provided to notify the user the number of pending data events selected.

Once the user selects the option 2207 to merge multiple pending events, the selected events are then displayed as a single 'pending event' 2209 (FIG. 22B) with a visual identifier that indicates that it is composed of multiple events that have been merged. The merged event retains the attributes where communications are classified as incoming or outgoing based on that attribute of the first event in the merged chronology. FIG. 22C provides a GUI 2211 with details of the now merged event. Data events that had previously been separate pending events 2213 are listed with details for further analysis. A configurable option allows the user to be prompted as to whether to characterize the event as "incoming" or outgoing" or, by default, the first event in the merged series defines that attribute for the merged event. In either case, the "Start Time" is the start time of the first event and the "End Time" is the end time of the last event. The duration attribute for a merged event is the sum of the duration of all data events.

With regard to such merge processing, for example, a meeting with a client might start in an office, move into a conference room in another building and end with a meal in a restaurant. Merging such events to reflect the real-world actuality of a single meeting is much more efficient from a user processing and workflow perspective than processing each part of the meeting as separate events.

Further details regarding the technical processing of the innovations are set forth in the attached appendices, such as, here (Merging Event), in Appendix E. In some implementations, for example, a merge process is provided to combine events into a single event. First, it is determined whether the list of events can be merged. If so, then the events are merged. The event merging process may execute as follows:

```
Function MergeEvents(List<Recorded_Event_c> events)
Begin
    If CanMergeEvents(events) then
        GetMergedEventsInfo(events, record)
    End
End
Function CanMergeEvents (List<Recorded_Event_c> events)
Begin
```

In some implementations, merge is performed only on recorded events that are pending that are not children of another event. However, recorded events that are themselves a result of a previous merge and still pending may be used in a new merge, but not their children. This process may execute as follows:

```
For RecordedEvent_c evt : events
  Begin
    If ((evt.Parent_c != null) or (evt.value_c != 'Pending')) then
        Return False
    End
```

Next, while looping through the events, the recorded events are sorted to be merged in two sets, which may include a first set of simple recorded events and a second set of events that themselves are a result of previous merge. This process may execute as follows:

```
If evt.Merged_Event_c Then
    merged_ids.add(evt.Id)
Else
    not_merged_ids.add(evt.Id)
End
```

In some implementations, if combined lists of recorded events are empty or contain only one element the process indicates that there is nothing to merge. This process may execute as follows:

```
If ((merged_ids.size( ) + not_merged_ids.size( ) <= 1 Then
    Return False
End
    return True
End
```

In some implementations, the recorded events to be merged are sorted into two sets such as a first set of simple recorded events that are not themselves a merged event and a second set of events that are themselves a result of previous merge.

```
Function MergeEvents(List<Recorded_Event_c> events)
Begin
    For RecordedEvent_c evt : events
```

-continued

```
        If evt.Merged_Event_c Then
            merged_ids.add(evt.Id)
        Else
            not_merged_ids.add(evt.Id)
        End
    End
```

In some implementations of a merge, the algorithm uses the original events and not the parents. So, the algorithm loads all the children of all the parent events that belong to the list of events that are subject of the current merge operation, substitutes the parents with the child events, and orders the resulting set based on time. All the events are looped to build a consolidated event (a merge event). The duration of the new event is then computed using the original events. All the parent events are deleted as they will be replaced by the new merged event. The new merged event is added to the database. The parent of all the events that are the subject of the current merge are set to the newly created event. This process may execute as follows:

```
list<RecordedEvent_c> recorded_events = [SELECT Id, val-
ue_c, reported_c, Auto_Classified_c, ClassId_r.Name, address_
c, OwnerId, type_c, geosite_r.AvgLatitude_c, geosite_r.Avg-
Longitude_c, Account_c, Contact_c, Lead_c, ActivityId_c,
Compliance_c, time_c, duration_c, geosite_c, lasteventtime_c,
Contact_r.Name, Lead_r.Name, Account_r. Name, Merged_
Event_c FROM RecordedEvent_c WHERE ((Id IN :not_
merged_ids) OR (Parent_c IN :merged_ids)) order by time_c];
consolidatedEvent = events[0];
For RecordedEvent_c evt : recorded_events
    Begin
        totalDuration = totalDuration + evt.duration
    End
delete(merged_ids)
insert(consolidatedEvent)
updateParent(events events,consolidatedEvent)
End
```

FIGS. 20A-20F are directed to an embodiment of the invention including an event data exception handling feature for assigning temporary exemptions or time extensions from defined policies, including policies related to time-interval thresholds and deadlines, so that performance metrics and reports do not reflect performance failures for sanctioned deviations from defined company policies.

Here, for example, a company policy reflected in the defined elapsed time threshold might be to process event data at the end of each day (or some other defined threshold), but the user might be on an airplane without internet access and would be incapable of complying with the defined policy. In order to avoid having the employee's compliance record tarnished by their inability to comply, the user's manager could proactively or retroactively make an exception to the policy.

Among other processing herein, managers/administrators/users may set time-interval policies and define thresholds for pre-set reminders for users to enter data following relevant data events such as telephone calls and/or site visits, with automated escalation to managers when defined elapsed-time thresholds are exceeded. Once elapsed-time thresholds are exceeded, the failure to perform the task in the allotted time and ultimate elapsed-time to compliance become reporting metrics for managers used in the evaluation of employee performance.

However, there are legitimate cases when a user may not be capable of meeting a time-threshold deadline for data entry due to circumstances beyond their control. For example, a user may be on a cross-continental airplane flight without Internet access, which could prevent the user from following a defined process within the prescribed time interval. The event data exception handling process allows the user to proactively or retroactively request a time extension so that the deviation from defined policies will not have the ordinarily-associated consequences for non-compliance, which could otherwise be detrimental to future performance evaluations. In addition, a manager may provide a pro-active exemption to avoid the problem in advance. Upon a manager's creation or approval of the exemption, the extension is factored into the reporting data. That reporting data remains available both as raw data and as adjusted data that reflects the reality of user circumstances and manager permissions.

Figure 20A:
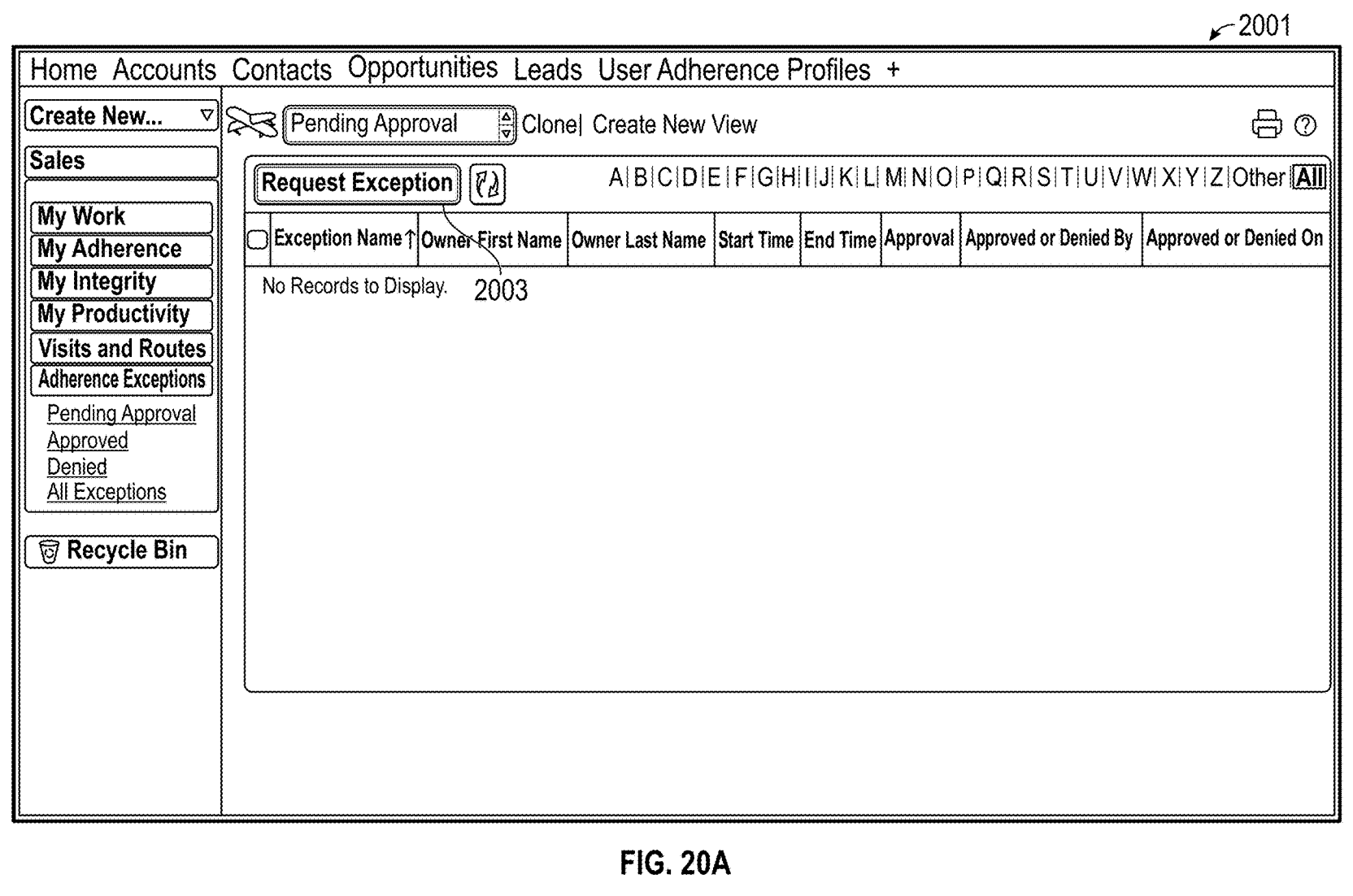
Figure 20B:

FIG. 20A illustrates a GUI 2001 where a user selects Request Exception 2003 for an exception to a time-threshold policy. Next, the user inputs the start time and date and the end time and date of the requested exception 2007 in GUI 2005, as shown in FIG. 20B.

Figure 20C:
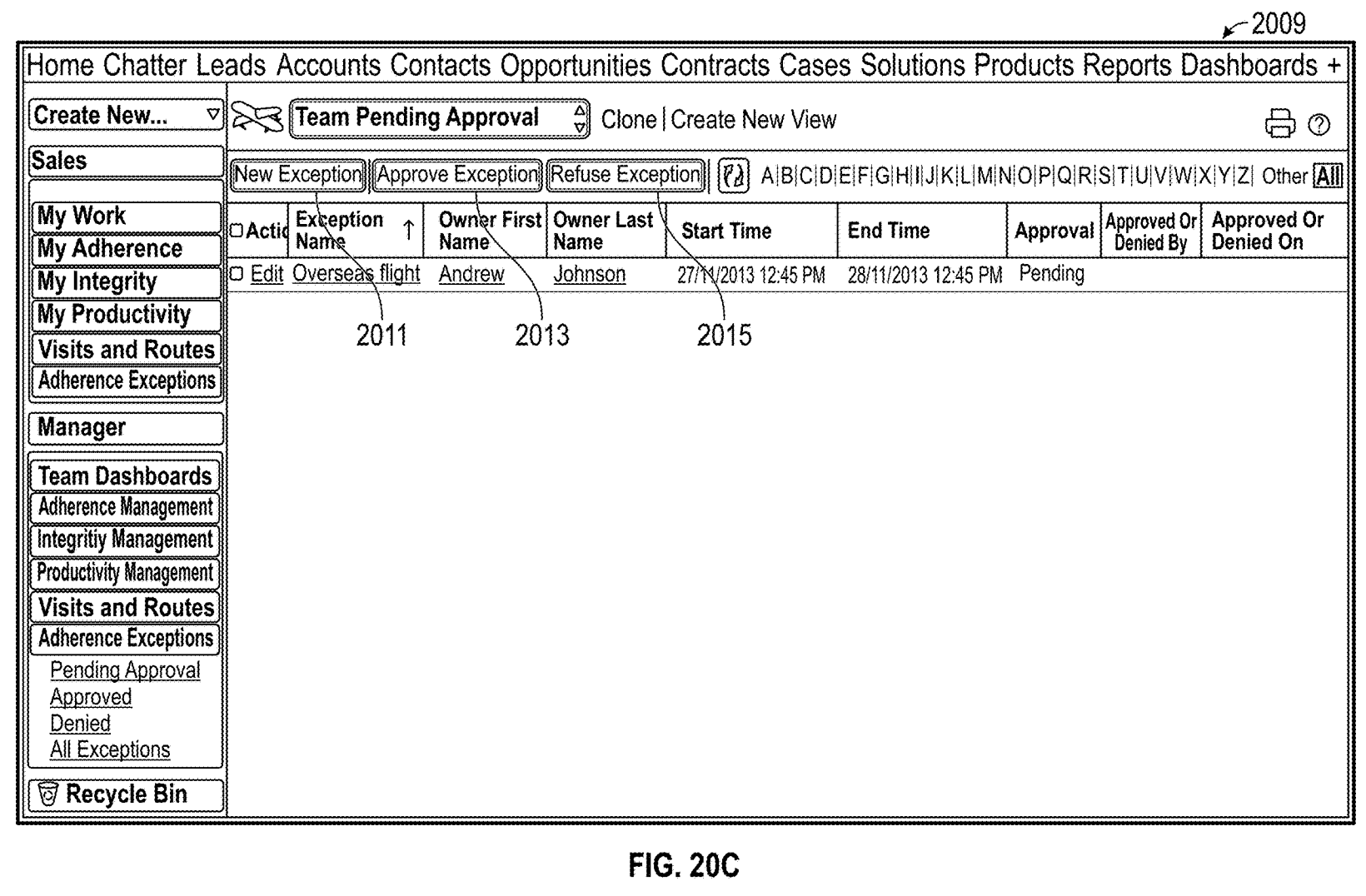

FIG. 20C illustrates GUI 2009 displayed to notify a manager/administrator of the user request and prompts the manager/administrator to either approve 2013 or reject 2015 the exception. An option is also provided to the manager/administrator to proactively create a new exemption 2011. Once an exception is approved or directly created by the manager/administrator, reports and compliance policy adherence mechanisms will not count the defined time period in the calculations of elapsed-time used to track user policy adherence.

Figure 20D:
Figure 20E:
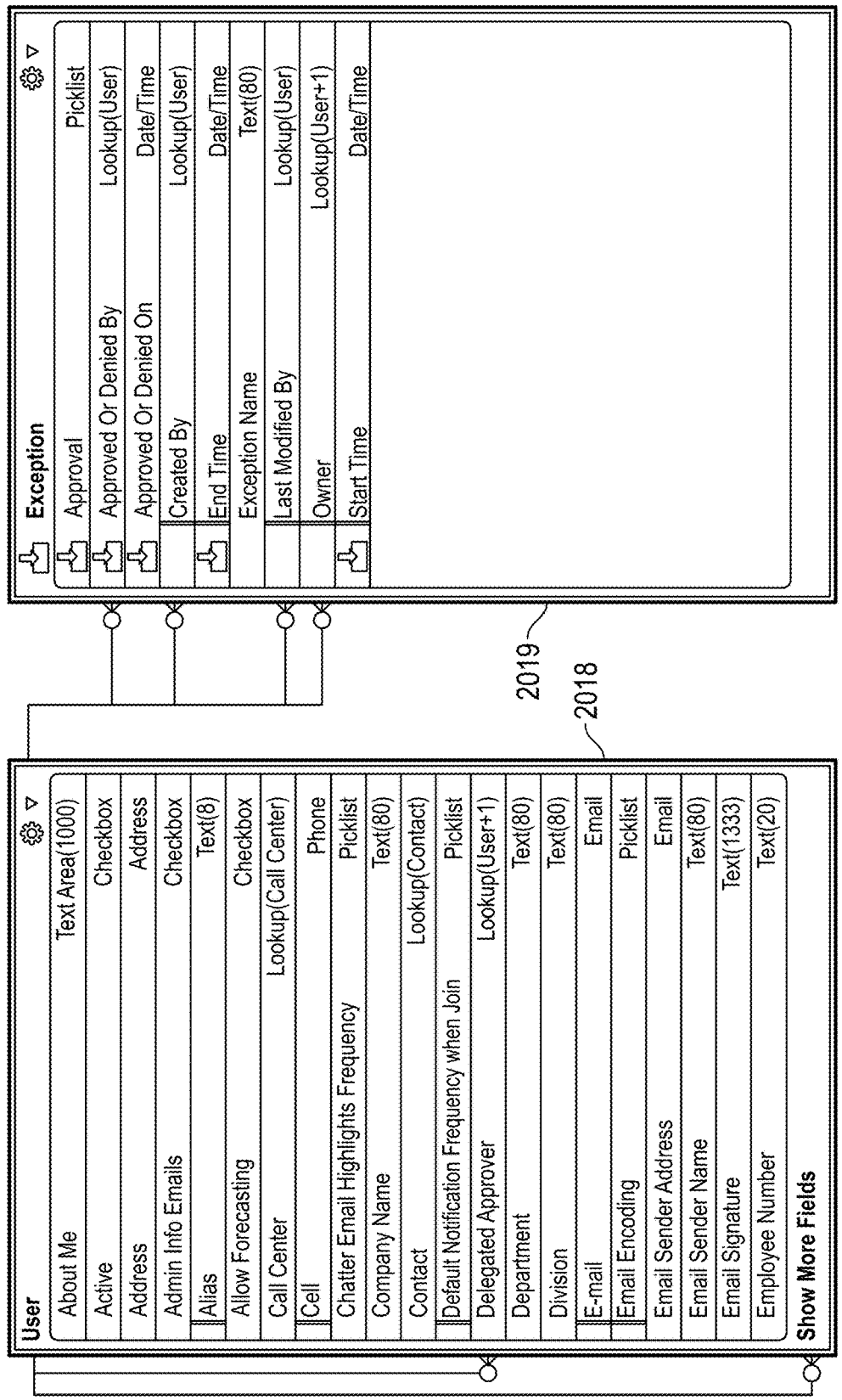

FIG. 20D illustrates an example of a user interface 2017 in which an administrator/manager can view, approve, deny, or create an exemption request. In FIG. 20D, the field of "Approved Or Denied On" reflects the date on which the exception was approved or denied. The field "Approval" reflects the approval status of the exception, which may be "approved", "denied", or "Pending. The approved or created exceptions are reflected in an exception table 2019 (FIG. 20E) in the database. FIG. 20E illustrates the structure of the exception table 2019 and its relationship to a typical user table 2018 of a Sales Force automation or other system. The fields "Exception name", "Start time" and "End time" will contain the data entered by the user. The field "Approval" will be set to "Pending". This field stores the status of the request that can take the three following values: "Pending", "Approved", "Denied".

The manager is notified of the request for an exception and can approve or deny the request. The Manager will have access to the list of requests for which the field "Approval" is equal to "Pending". The illustration also illustrates the method by which a manager may also pro-actively create exceptions 2011. Once an exception is approved or created by manager, the field "Approval" is set to "Approved".

Figure 20F:
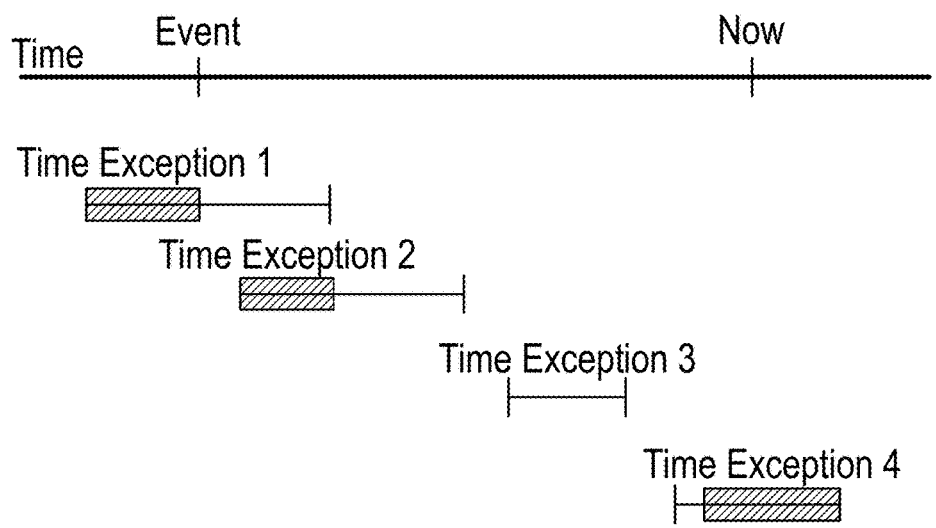

If approved, reports and compliance policy adherence mechanisms will not count the defined time period in the calculations of elapsed-time used to track user policy adherence. For each event, the system loads all Approved Exceptions for which Start time and End time overlap the elapsed time of the Event and sort them chronologically on timeline 2021 by Start time, as illustrated in FIG. 20F.

For each of these exceptions, the portion of time that overlaps the previous exception are discarded (so as not to count overlapping Exception times twice) and the portion of time that does not fall within the elapsed time threshold for the event is also discarded. The result will be an exact Time Exception adjusted for elapsed time that will be used to track user policy adherence.

Further details regarding the technical processing of the innovations are set forth in the attached appendices, such as, here (Time Extensions/Exceptions), in Appendix C. In the appendix, exception and extension may be used interchangeably. In some implementations, a time extension process allows for additional time for a user to process an event. By granting an extension, a threshold time for compliance may be extended based on predetermined criteria. In some implementations, the time extension process may execute as follows to adjust the compliance attribute of a given recorded event:

A time extension request can be one of the following:
Create a new time extension,
Modify an existing time extension record,
Approve a time extension by the manager, or
Refuse a time extension by the manager In some implementations, a time extension request is first validated. The request for time extension is denied if, for example, the request is to create a time extension for more than 30 days or any configurable amount of time, the request is to approve or refuse a time extension that is not from the manager, and the request is to modify a time extension that it is not from the owner or the manager.

If the request is to approve or refuse a time extension, then the time extension undergoes the refusal or approval process. If the request is to create or modify a time extension, then the time extension is created or modified and the time extension undergoes an auto approval checking process. In some implementations, the process may execute as follows:

```
Function ValidateTimeExtensionRequest ( )
BEGIN
    IF (The time extension is for more than 30 days)
    THEN Reject Request
    IF (The request is to approve or refuse a time extension and
it is not from the manager)
    THEN Reject Request
    IF (The request is to modify a time extension and it is not
from the owner or the manager)
    THEN Reject Request
    IF (The request is to approve or refuse a time extension)
    THEN approveOrRefuseTimeExtension(request)
    IF ( Request is create new or modify a time extension) THEN
        CreateOrModifyTimeExtension(request)
        CheckAutoApproveTimeExtension(Request) END
```

In some implementations, a time extension is checked to determine if it meets the auto approve criteria as defined by the user manager or the administrator. If criteria are met, the time extension is granted and the user's recorded events compliance statuses are updated accordingly. In some implementations, the process may execute as follows:

```
Function CheckAutoApproveTimeExtensionRequest (TimeExtensionRequest request)
    BEGIN
        Load user profile to retrieve the auto approve criteria.
        IF (the requested time extension meet the predefined criteria)
        THEN ProcessTimeExtensionRequest(request.timeExtension)
    END
```

In some implementations, when a time extension is approved or auto approved, the system will adjust the adherence (compliance) status for the affected user recorded events.

The process may execute as follows:

```
Function ProcessTimeExtensionRequest(Time_Extension extension )
    BEGIN
        Load user profile to retrieve the compliance thresholds.
        Adjust adherence status by calling AdjustAdherenceStatus(extension,profile)
        function.
    END
Function AdjustAdherenceStatus (Time_Extension extension, User_Profile
profile)
    BEGIN
        Load all recorded events that are after the start time of the time extension.
        FOREACH (Recorded Event)
        BEGIN
            IF (Recorded event end time < time extension start date) CONTINUE.
            Compute the new elapsed time of the recorded event by subtracting
        the time extension         duration.
            Reset the adherence level by using the new calculated elapsed time.
        END
    END
```

In some implementations, a convenient (utility) process may be provided to load all time extensions for a list of users specified by their IDs. The retrieved time extensions may then be ordered by user ID and start time. In some implementations, the process may execute as follows:

```
Function LoadUsersTimeExtensions(List<Ids> ids)
BEGIN
    Load and order the time extensions by executing the
    following query
        List<Time_Extension> extensions = [SELECT Id, OwnerId,
    StartTime_c, EndTime_c, Status_c FROM Time_Exctension
    WHERE (OwnerId IN :Ids) AND (StartTime_c < :endtime)
    AND (EndTime_c > :starttime) AND ((Status c =
    'Pending') OR (Status_c = 'Approved')) order by OwnerId,
    StartTime_c];
        FOREACH (Extension)
        BEGIN
        Create a new time interval.
        Add the time interval to the list.
        END
```

Figure 21B:
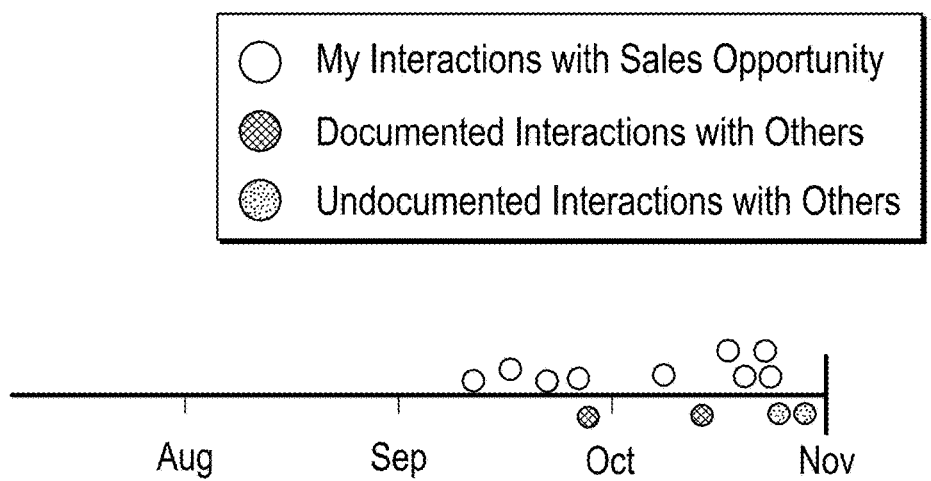

In another implementation of the present invention, as illustrated in FIGS. 21A-21C, a process for improving team coordination is provided by identifying the existence, duration and chronology of telephone, in-person and electronic communications between company employees and other people which may not be documented in the sales force automation and other customer relationship management systems. The analysis and data are visually displayed in order to coordinate communication efforts and provide the user business insight regarding the state of customer relationships.

For example, a user such as a salesperson and other business executives are often unpleasantly surprised to discover that someone else in their organization has communicated with their customer or prospect without creating a note or record to inform them of what happened, particularly when that communication has left the customer or prospect angry or frustrated. As a result, the objectives set for a call or meeting may be more difficult to achieve or unattainable—and if the user had known this they might have chosen either to delay their call or meeting or to omit raising a sensitive subject rather than fail. The implementation discussed below addresses this issue by aggregating external data events and provides a visual display that includes all telephone, in-person and electronic communications between all company employees that interact with customers and the particular customer or sales prospects. The aggregated external data events are then displayed in a manner to provide all interactions and their associated durations in a visual format that distinguishes between documented interactions with the user and both documented and undocumented interactions with other company employees.

A user first enters the parameters for the visual representation including start date and end date, and specifies a contact, account, lead or opportunity A query is then made to the database with the parameters specified by the user and the results are combined to aggregate all relevant data events that may be documented or undocumented in the sales force automation system and/or other systems.

These documented and undocumented events include telephone calls, geolocation data indicating site visits and other meetings, emails, electronic chat sessions and SMS messages. Documented events are those events about which the user or other users have entered notes or information in the sales force automation or other system. Undocumented events are events that do not have associated notes or other information in the sales force automation or other system.

These data events are visually differentiated in the user display to distinguish between communications initiated or received by the user, documented events initiated or received by other users, and undocumented events initiated or received by other users. These events are displayed chronologically in a visual format that will enable a user to quickly determine if others in that user employee's company have had documented or undocumented contact with the person or company that they are dealing with.

FIG. 21A illustrates the database schema for the communications derived from the Data Capture and Aggregation process (beginning in the "Adherence" table below which reflects captured data events). The field "ActivityId" 2100 contains the identifier of the Activity (Task or Event) that has been created using the process of Classification. An undocumented event will have this field empty. This is used to differentiate documented events from undocumented events. The field "User" is used to differentiate events initiated by the user from events initiated by other people in a company.

Retrieved events may then be displayed in chronological order with visual differentiation (FIGS. 21B-21C) among the three following types of interactions generated by user, interactions generated by other company employees that have been documented, interactions generated by other company employees that have not been documented. A user may then click or tap on one of the displayed events to show more details. The ability to automatically include undocumented events to provide insight to users is a process that could not have been possible without the automatic aggregation of data from a population of participating users across diverse devices, networks and technologies, as undocumented events are, by their very nature, undocumented by humans.

Further details regarding the technical processing of the innovations are set forth in the attached appendices, such as, here (Timelines), in Appendix D.

In another implementation of the present invention, a mechanism for recognition of user efforts is provided that includes an automated process for providing management, peer and/or social recognition to employees for productive efforts and outcomes using internal reporting and internal communications systems and/or social media. Productivity analysis is performed based on the captured real-world data events and visual representations of those events as well as the classification process for those events. Productivity data for each user is created and productive activity performance evaluations are based on defined performance bars. Relative comparative rankings are generated between users based both on the quantity of productive efforts and quality of outcomes resulting from productive efforts. The metrics applied will differ based on user role. For example, productivity metrics for salespeople are whatever data sets managers may define but are likely to include volume of "cold calls" and "cold" site visits, volume of new leads generated by phone calls, site visits, emails and social media, volume of leads converted into active opportunities in total and/or by phone calls, emails and/or site visits, volume of opportunities converted into customers, volume of follow-on business with existing customers, percentage of quota attainment, volume of total number of transactions, average monetary value per transaction, largest monetary value for a transaction with a new opportunity or existing customer, number of transactions above a defined monetary value, and other metrics that may be user-defined that leverage reporting data created by processes defined by other claims herein. Recognition based on these metrics include recognition of 'best" performance as well as recognition for being within percentile parameters, for example, the top quartile of performance.

For this implementation, a manager/administrator first defines a performance metric and the percentile ranges worthy of recognition. Next, the manager/administrator selects options of how achievement of defined metrics are to recognized based on the options articulated below. When the requirements for an "achievement worthy of recognition" for any defined metric is met by a user and the user's relative ranking in each of the defined performance metrics is available, the next step in the process is to recognize the achievement in one or more ways that are pre-defined by managers and/or administrators. The first option is to list the achievement in a user profile available to both the user and to managers, both in report format and by awarding visual badges for specific achievements. An additional option is to make the data available for reporting purposes to other systems that may leverage the data for the purposes of calculating bonus compensation or generating other value from the data. Another option is to publish relative rankings and/or to electronically publish the visual badges described above for consumption only by managers and/or by team members within a defined group. An additional option is to provide or permit public recognition for achievements in defined performance metrics via distinct visual badges, each representing different performance metric achievements, electronically in public websites such as linkedin.com, twitter, Facebook and other social media outlets.

This implementation is most validly implemented via automatic aggregation of data from a population of participating users across diverse devices, networks and technologies, as relying on self-reported productivity achievements to distribute rewards without independent verification may be too vulnerable to fraud to be at all practical.

Figure 23A:
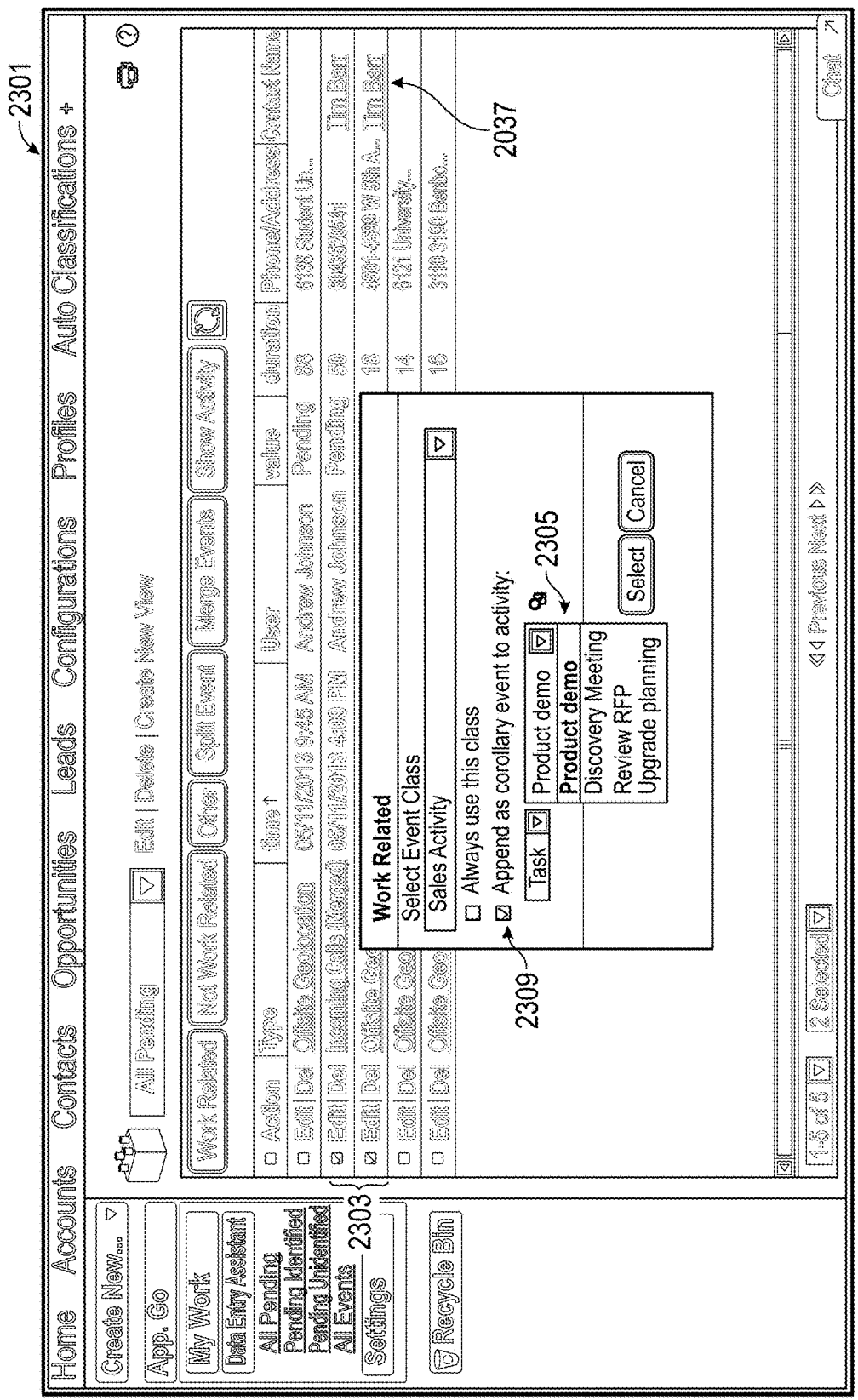

In another implementation of the invention, as illustrated in FIGS. 23A-23B captured corollary events may now be processed as such and appended by the user to an activity for future data analysis. In the example provided in FIG. 23A, a user is provided a GUI 2301 where the user has selected two data events 2303 for classification as "Sales Activity" events that are corollary to a task called "Product Demo" 2305.

Corollary Events are events that are not substantial or meaningful in the context of the management system in which they are logged but which are related to other events which are meaningful in that context and/or to existing companies, leads, opportunities, etc. For example, a visual data object representing a text message saying that a planned participant in an upcoming meeting will be 5 minutes late would be a corollary event to the meeting itself, and as such the user would select the option to append the corollary event to another event 9 the visual data object representing the meaningful activity, which in this example would the actual meeting). The processing of Corollary events has the potential to provide meaningful insight in other contexts such as Big Data Analysis (for macro analysis, for example: in order to provide guidance on the best time of day to call particular classes of prospects for particular classes of products to maximize the odds of a meaningful communication) or to derive insight about performance (for example, recognizing that a prospect called many times without a callback, suggesting a lack of diligence on the part of a company employee or department) or to monitor policy adherence (for example, to verify that employees attempt to call every lead a minimum number of times before giving up or that employees attempt to call every current customer a defined number of times within a defined time period) or the likelihood of success of a sales effort (for example, recognizing that the prospect is calling an employee often, even if they do not actually get through to them, in order to better assess the likelihood of that prospect becoming a customer) or simply to perform data hygiene on the raw data for better analysis of meaningful events.

At present, events that are not substantively related to an activity generally go undocumented in current systems because they are merely corollary events. Examples include failed attempts to reach a contact by telephone, calls to get driving or walking directions or calls to ask what restaurants are nearby or where to the user may park their vehicle. What these examples have in common is that they would not ordinarily be documented because they are not substantively relevant to a meaningful activity. Implementations, here, are designed to bring value to data which would ordinarily be simply discarded by associated these events with meaningful events and providing companies with the ability to analyze the quantity and duration of non-substantive events that take place related to meaningful activities in order to find ways to reduce the number and duration of future corollary events or better understand their own sales processes. For example, upon analysis of corollary data, a company may decide to increase their minimum deal size to take account of the actual average time spent to convert leads into customers. Another example would be to analyze corollary events to determine the day of the week, week of the month, month of the year or best time of day to call a particular class of prospect about a particular class of product in order to maximize odds getting a meaningful result. One example of how this applies to the user who is processing events would be as follows: a visual data object representing a text message saying that a participant in an upcoming meeting will be 5 minutes late could be processed as a corollary event to the meeting itself, and as such the user would select the option to append the corollary event to an event (visual data object) representing a meaningful activity.

In the example of FIG. 23A, the user has selected the two data events 2303 and the Event Class and may then select the activity to which the processed record event should be appended. A user may then select a check box 2309 indicating that the selected task should be appended as a corollary event to the activity. The user may then choose from a drop down menu that will include all the eligible activities for the contact 2307 common to both events that are retrieved from the sales force automation system. The result is that the records of two non-substantive events, including their durations, are associated with and appended to an activity and the specific tasks or SFA event. Note that this process will not change the Date and Time, Subject, Duration, Note or any of the existing data of the activity, task or SFA event, but will only append additional data records of corollary classified events.

In such implementations, configurable restrictions may be defined by a manager/administrator to restrict the set of events that can be appended as corollary events, including but not limited to: mandating whether all selected data events must be pending unclassified events, whether selected events and activity must have taken place on the same day or within a maximum defined time-interval; defining a maximum duration for a corollary event based on the assumption that pending events cannot be corollary if they exceed that duration (for example, to reflect an assumption that phone calls longer than an hour are very unlikely to be corollary); and defining data event classes that can never be appended as corollary (for example, live meetings as captured by geolocation data and reflected as pending events in the classification process).

FIG. 23B illustrates a GUI 2311 that allows a user to view the list of all corollary events 2313 appended to an activity, in this case a task, with the option to unappend/remove any of the corollary events from the list.

These implementations provide new and differentiated value for companies and users. At present, events that are not substantively related to an activity generally go undocumented in current systems because they are merely corollary events. Examples include failed attempts to reach the contact by telephone, calls to get driving or walking directions or calls to ask where to the user may park their vehicle. What these examples have in common is that they would not ordinarily be documented because they are not substantively relevant to an activity. In this implementation, corollary events may now be processed as and appended by the user to an activity, event or task for future data analysis. This implementation is designed to bring value to that data which would ordinarily be discarded, by providing companies with the ability to analyze the quantity and duration of non-substantive events that take place related to activities in order to find ways to reduce the number and duration of future corollary events, with the added value of distinguishing between activities with different data attributes, including but not limited to geographical location, size of company, size of opportunity, hours attributable to specific opportunities and a wide variety of other metrics that users may define. For example, upon analysis of corollary data, a company may decide to increase the minimum deal size to take account of the actual average time spent on an opportunity. Another practical result may be that a company may decide to purchase and distribute GPS systems or an location-based mobile application that would automatically identify the best parking location for a particular appointment.

In implementations, here, the user may classify an event as work related, even though that event is corollary to a substantive event and is not itself substantively meaningful. The user would then select the event class and the activity to which the processed event record should be appended, which would be reflected as an activity, a task or an event in the context of a Sales Force Automation system. The result is that the records of non-substantive events, including their durations, are associated with and appended to records of activities, including tasks or events in the context of a Sales Force Automation system.

Such event related data may be aggregated and stored for use in determining various metrics and/or for later mining and processing. Here, for example, such aggregated data may be utilized in calculating various metrics in the Sales Force Automation system, such as determining or estimating cost(s) associated with non-substantive activities, such as failed attempts at communication, non-substantive communications, time spent waiting at or nearby a meeting place, administrative, housekeeping, or other tasks associated with the activity or transaction in question.

Further details regarding the technical processing of the innovations are set forth in the attached appendices, such as, here (Corollary Event), in Appendix F.

Additionally, the innovations herein may be achieved via implementations with various software, hardware and/or firmware components. With regard to such other components (e.g., software modules, computing/processing components, etc.) and/or computer-readable media associated with or embodying the present inventions, for example, aspects of the innovations herein may be implemented consistent with numerous general purpose or special purpose computing configurations. Various exemplary computing systems, environments, and/or configurations that may enable or be suitable for use with the innovations herein may include, but are not limited to: various software or other components within or embodied on smart phones or other PDA devices or personal computing components, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with the circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of code structures or circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media), though do not encompass transitory media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the present inventions. Accordingly, it is intended that the invention be limited only to the extent required by the applicable rules of law.

The invention claimed is:

1. A method of performing geolocation tracking management for a mobile device of a user of a billing system, a billing management system, a professional services management system, or a sales force management system, the method comprising:

defining of an elapsed time threshold by at least one or more of the user or manager or system administrator for a server application or user device application for deeming whether or not a user has disabled geolocation tracking of a user device or an application on the mobile device that transmits the geolocation coordinates from the user device has ceased transmitting or has been disabled or the network connectivity required for the transmission of geolocation coordinates has been lost, wherein the server application determines whether or not it has not received transmissions of geolocation coordinates from the user device within the prescribed time threshold or a user device application determines whether or not it has transmitted of geolocation coordinates from the user device within the prescribed time threshold;

cross-referencing a server application or database or user device application to determine whether or not the user device has disabled geolocation tracking or transmissions of geolocation tracking data or an application on the mobile device that transmits geolocation coordinates has ceased transmitting or has been disabled in accordance with pre-defined or pre-approved circumstances including one or more of non-business days, personal days or sick days or holidays as declared on ERP or calendar software or via manual data entry, non-work hours based on time of day, geolocation coordinates deemed to be without network access, duration of scheduled air travel and locations where geolocation signal access or network access by the user device are known to be unavailable, or date and time pre-approved by one or more managers or system administrators for disablement of geolocation tracking by the user;

determining that there has been a connectivity incident wherein the user device has lost network connectivity or the user has disabled geolocation tracking of the user device or transmissions of geolocation tracking data from the user device or an application on the mobile device that transmits the geolocation coordinates has ceased transmitting or has been disabled without any corresponding pre-defined circumstances or pre-approved authority;

transmitting, via one or more servers, an electronic notification to the user or the manager via one or more of SMS message, mobile device notification, in-app notification or email that the server application has not received transmissions of geolocation coordinates from the user device within the prescribed time threshold or that the user mobile device has not transmitted geolocation coordinates from the user device within the prescribed time threshold; and documenting that the server application has not received transmissions of geolocation coordinates from the user device within the prescribed time threshold.

2. The method of claim 1, wherein the time threshold includes or disregards the time spent by the user in environments known to be without or unlikely to have one or more of access to geolocation signals or access to network connectivity required for transmissions from the user device to the server wherein locations that are unlikely to have network connectivity required for the transmission of geolocation coordinates from the user device to a server, such as tracked entry into buildings, tunnels, parking garages, airports, duration of scheduled air travel and areas known to lack such network connectivity, are deemed not to be connectivity incidents wherein the server application has not received transmissions of geolocation coordinates from the user device within the prescribed time threshold.

3. The method of claim 1, wherein one or more managers may be alerted or notified that the server application has not received transmissions of geolocation coordinates from the user device within the prescribed time threshold.

4. The method of claim 3, wherein the frequency of notification to one or more users or managers of connectivity incidents where the server has not received transmissions of geolocation coordinates from a user device within the time threshold has been defined by one or more of a user, a manager or by a system administrator configuring notifications for an individual manager or groups of managers wherein processing is performed regarding frequency of notifications of loss of connectivity incidents on one or more user or manager devices.

5. The method of claim 4, wherein the frequency of notifications to one or more users or managers of connectivity incidents where the server has not received transmissions of geolocation coordinates from a user device within the defined time threshold is configurable by one or more of a manager or a user or a system administrator configuring options for an individual managers or groups of managers, wherein processing is performed regarding frequency of notifications of loss of connectivity incidents on one or more devices.

6. The method of claim 1, wherein the approved circumstances for the server to have not received transmissions of geolocation coordinates from a user device within the prescribed time threshold includes one or more of non-work hours, non-business days, personal days, sick days or holidays as determined or declared via manual entry or via ERP or calendar software, duration of scheduled air travel and locations where geolocation signal access or network access by the user device are known to be unavailable.

7. The method of claim 1, further comprising:
enabling a user to submit an explanation for a loss of connectivity incident which includes one or more of disabled geolocation tracking on the user device or loss of communication with an application on the mobile device that transmits geolocation coordinates to the server indicating that it has ceased transmitting to the server or has been disabled, via one or more of a graphical user interface or email or SMS message or phone call, which may include an Interactive Voice Response "IVR" menu selection on a phone call or a rolling data feed or scrolling feed;

directly or indirectly transmitting by the user of an explanation for the disabled geolocation tracking or for why an application on the mobile device that transmits geolocation coordinates to the server has ceased transmitting to the server or has been disabled wherein the server receives a user explanation of the determined connectivity incident;

directly or indirectly transmitting to one or more manager devices of the user explanation via user interface functionality for the disabled geolocation tracking or for why an application on the mobile device that transmits geolocation coordinates to the server has ceased transmitting or has been disabled;

acceptance or not acceptance of the user explanation by the manager via one or more of a graphical user interface, email, SMS message or phone call, including an IVR menu selection on a phone call.

8. The method of claim 5, wherein the server application performs processing regarding the frequency of notification of connectivity incidents to one or more of a user or manager wherein the server application has not received transmissions of geolocation coordinates from the user device within prescribed time thresholds and notification of such incidents shall not be transmitted to one or more of a user or manager for processing of one or more connectivity incidents or in some implementations for reporting purposes unless predefined criteria for notification based are met, which may include criteria such as elapsed time or frequency of incidents of non-connectivity or non-receipt of geolocation data or a defined maximum frequency of notifications to a user or manager.

9. The method of claim 5, wherein the user device application performs processing regarding frequency of notifications of connectivity incidents to at least one of a user or manager wherein the user device has had its geolocation tracking disabled or an application on the mobile device that transmits the geolocation coordinates has ceased transmitting or has been disabled for a predefined time threshold or the user device has not transmitted geolocation coordinates from the user device to a server within a predefined time threshold; and notification of such incidents shall not be transmitted to one or more of a user or managers for processing of one or more connectivity incidents or in some implementations for reporting purposes unless predefined criteria for notification based are met, which may include criteria such as elapsed time or frequency of incidents of non-connectivity or non-receipt of geolocation data or a defined maximum frequency of notifications to a user or manager.

10. The method of claim 1, wherein the server application determines whether or not geolocation tracking of the user device is disabled based on approved circumstances or an application on the mobile device that transmits the geolocation coordinates has ceased transmitting or has been disabled for a predefined time threshold based on approved circumstances or the user device has not transmitted geolocation coordinates from the user device to a server within a predefined time threshold based on approved circumstances and the server application determines that an unauthorized connectivity incident has taken place suggesting that the user has disabled the geolocation tracking of the user device or disabled the application on the mobile device that transmits the geolocation coordinates to the server.

11. The method of claim 7, wherein the server application transmits notification to at least one of the user or one or more managers of the determined loss of connectivity incident, wherein one or more managers receive a user explanation for the determined loss of connectivity incident; and a manager deems whether or not to accept the user explanation and if accepted thereby deems the user to be compliant via one or more of a user interface including a selection or an SMS message or an email or a phone call which may include an Interactive Voice Response "IVR" menu selection on a phone call or a selection of an option related to a rolling data feed or scrolling feed.

12. The method of claim 7, wherein disablement of geolocation tracking or transmission of geolocation coordinates of the user device by the user shall not be treated as a connectivity incident for reporting purposes upon acceptance by a manager of a user explanation, thereby deeming that the connectivity incident wherein the server application has not received transmissions of geolocation coordinates from the user device within the prescribed time threshold shall not be treated as a connectivity incident for one or more of incident tracking or productivity analysis or user evaluation or user compliance reporting purposes.

13. The method of claim 3, wherein the frequency of notification to one or more managers of connectivity incidents where the server has not received transmissions of geolocation coordinates from a user device within the prescribed time threshold is configurable by each individual manager based on individual preferences; wherein processing is performed regarding frequency of notifications of connectivity incidents.

14. The method of claim 1, further comprising alerting a user that geolocation tracking of a user device has been disabled or an application on the mobile device that transmits the geolocation coordinates has ceased transmitting or has been disabled or that the network connectivity required for the transmission of geolocation coordinates has been lost, wherein the server application determines whether or not it has not received transmissions of geolocation coordinates from the user device within the prescribed time threshold or a user device application determines whether or not it has transmitted of geolocation coordinates from the user device within the prescribed time threshold via one or more of a notification in a graphical user interface or a rolling data feed or scrolling feed in a graphical user interface or an email or an SMS message or a phone call.

15. The method of claim 1, further comprising:
defining of an elapsed time threshold at least one of a user or a manager or system administrator for a server application or a user device application for deeming whether or not a user has disabled geolocation tracking of a user device or whether an application on the mobile device that transmits the geolocation coordinates of the user device has ceased transmitting or has been disabled or whether or not the network connectivity required for the transmission of geolocation coordinates has been lost, wherein the server application determines whether or not it has not received transmissions of geolocation coordinates from the user device within the prescribed time threshold or a user device application determines whether or not it has transmitted of geolocation coordinates from the user device within the prescribed time threshold;

cross-referencing a server application or database or user device application to determine whether or not the user device has disabled geolocation tracking or transmissions of geolocation tracking data or an application on the mobile device that transmits geolocation coordinates has ceased transmitting or has been disabled in accordance with pre-defined or pre-approved circumstances including one or more of non-business days, personal days sick days or holidays as declared on ERP or calendar software, non-work hours based on time of day, geolocation coordinates deemed to be without network access, or date and time pre-approved by one or more managers or system administrators for disablement of geolocation tracking by the user;

determining that there has been a loss of connectivity incident wherein the user device has lost network connectivity or the user has disabled geolocation tracking of the user device or transmissions of geolocation tracking data from the user device or an application on the mobile device that transmits the geolocation coordinates has ceased transmitting or has been disabled without any corresponding pre-defined circumstances or pre-approved authority;

notifying the user via one or more of text message, mobile device notification, in-app notification, email or phone call that the server application has not received transmissions of geolocation coordinates from the user device within the prescribed time threshold or that the user mobile device has not transmitted geolocation coordinates from the user device within the prescribed time threshold;

enabling a user to submit an explanation for a loss of connectivity incident which includes one or more of disabled geolocation tracking on the user device or loss of communication with an application on the mobile device that transmits geolocation coordinates to the server indicating that it has ceased transmitting to the server or has been disabled, via one or more of a graphical user interface or email or SMS message or phone call, which may include an Interactive Voice Response "IVR" menu selection on a phone call or submitting it for display in a rolling data feed or scrolling feed;

directly or indirectly transmitting by the user of an explanation for the disabled geolocation tracking or for why an application on the mobile device that transmits geolocation coordinates to the server has ceased transmitting to the server or has been disabled wherein the server receives a user explanation for the loss of connectivity incident;

directly or indirectly transmitting to one or more manager devices of the user explanation from the user via user interface functionality for the disabled geolocation tracking or for why an application on the mobile device that transmits geolocation coordinates to the server has ceased transmitting or has been disabled;

acceptance or not acceptance of the user explanation by the manager via one or more of a graphical user interface, email, SMS message or phone call, including an IVR menu selection on a phone call or via selection in a rolling data feed or scrolling feed;

disregarding the loss of connectivity incident for one or more of incident tracking or productivity analysis or user evaluation or user compliance reporting based on the acceptance of a user explanation by a manager.

16. The method of claim 1
enabling a user to proactively seek approval for a time period wherein a user plans to disable geolocation tracking of a user device or disable an application on the mobile device that transmits the geolocation coordinates of the user device or prevent it from transmitting geolocation coordinates or disable the network connectivity required for the transmission of geolocation coordinates without creating a future loss of connectivity incident for reporting purposes by initiating a time extension request related to the defined elapsed time threshold for deeming whether or not a user has disabled geolocation tracking of a user device or an application on the mobile device that transmits the geolocation coordinates has ceased transmitting or has been disabled or the network connectivity required for the transmission of geolocation coordinates has been lost, the method comprising:
sending a request by the user to a manager for a time extension of the predefined elapsed time threshold for a defined period wherein the request includes the user identity, the reason for the request and the desired start-time and end-time of the requested time extension;
receiving an approval or denial of the time extension request by a manager;
generating the time extension in response to receiving an approval from a manager wherein any related lack of transmission of geolocation data will not be deemed as non-compliant and will be disregarded or will not be deemed to be a loss of connectivity incident for one or more of incident tracking or productivity analysis or user evaluation or user compliance reporting.

17. The method of claim 16 wherein the time extension is entered directly by the manager including:
allowing the manager to enter directly the time extension for the user;
automatically generating the time extension.

18. The method of claim 16 wherein the time extension can be automatically approved when it corresponds to the scheduled days-off of the user including:
determining that the time extension corresponds to the user's scheduled days off;
automatically generating the time extension by the system without requiring manager's approval.

19. The method of claim 16 wherein the manager has the option to modify the time extension before approving it including:
enabling the manager to edit the time extension attributes;
allowing the manager to modify the start-time or end-time of the time extension request;
approving the modified time extension request;
sending notification to the user of the modified time extension request;
generating the time extension.

* * * * *